(12) United States Patent
Vorbach et al.

(10) Patent No.: US 6,990,555 B2
(45) Date of Patent: Jan. 24, 2006

(54) METHOD OF HIERARCHICAL CACHING OF CONFIGURATION DATA HAVING DATAFLOW PROCESSORS AND MODULES HAVING TWO- OR MULTIDIMENSIONAL PROGRAMMABLE CELL STRUCTURE (FPGAS, DPGAS, ETC.)

(75) Inventors: Martin Vorbach, Karlsruhe (DE); Robert Münch, Karlsruhe (DE)

(73) Assignee: PACT XPP Technologies AG, Munich (DE)

( * ) Notice: Subject to any disclaimer, the term of this patent is extended or adjusted under 35 U.S.C. 154(b) by 0 days.

(21) Appl. No.: 10/764,159

(22) Filed: Jan. 24, 2004

(65) Prior Publication Data

US 2004/0153608 A1 Aug. 5, 2004
US 2005/0257009 A9 Aug. 5, 2004

Related U.S. Application Data

(63) Continuation of application No. 10/191,926, filed on Jul. 9, 2002, now Pat. No. 6,687,788, which is a continuation of application No. 09/623,052, filed on Jan. 9, 2001, now Pat. No. 6,480,937.

(51) Int. Cl.
*G06F 12/00* (2006.01)

(52) U.S. Cl. .................. 711/122; 711/125; 711/141; 711/145

(58) Field of Classification Search ................ 711/122, 711/125, 141, 145
See application file for complete search history.

(56) References Cited

U.S. PATENT DOCUMENTS

| | | | |
|---|---|---|---|
| 2,067,477 A | 1/1937 | Cooper | 74/466 |
| 3,242,998 A | 3/1966 | Gubbins | 173/217 |
| 3,681,578 A | 8/1972 | Stevens | 714/11 |
| 3,757,608 A | 9/1973 | Willner | 475/347 |
| 3,855,577 A | 12/1974 | Vandierendonck | 713/324 |

(Continued)

FOREIGN PATENT DOCUMENTS

| | | |
|---|---|---|
| DE | 42 21 278 | 1/1994 |
| DE | 44 16 881 | 11/1994 |
| DE | 38 55 673 | 11/1997 |
| DE | 196 51 075 | 6/1998 |
| DE | 196 54 593 | 7/1998 |
| DE | 196 54 595 | 7/1998 |
| DE | 196 54 846 | 7/1998 |

(Continued)

OTHER PUBLICATIONS

Koch, A. et al, "Practical Experiences with the SPARXIL Co-Processor", 1998, IEEE, pp. 394–398.

Kung, "Deadlock Avoidance for Systolic Communication", 1988 Conference Proceedings of 15th Annual International Symposium on Computer Architecture, May 30, 1988, pp. 252–260.

(Continued)

*Primary Examiner*—Stephen C. Elmore
(74) *Attorney, Agent, or Firm*—Kenyon & Kenyon

(57) ABSTRACT

A method of caching commands in microprocessors having a plurality of arithmetic units and in modules having a two- or multidimensional cell arrangement is provided. The method includes combining a plurality of cells and arithmetic units to form a plurality of groups, assigning a cache unit to a group, and connecting the cache unit to a higher level unit via a tree structure. The cache unit may send requests for required commands to the higher level cache unit, which may return a command sequence including the required command, if the higher level cache unit holds the first command sequence including the required command in the higher level cache unit's local memory.

1 Claim, 32 Drawing Sheets

U.S. PATENT DOCUMENTS

| | | | |
|---|---|---|---|
| 4,498,172 A | 2/1985 | Bhavsar | 714/732 |
| 4,566,102 A | 1/1986 | Hefner | 714/7 |
| 4,591,979 A | 5/1986 | Iwashita | 712/25 |
| 4,663,706 A | 5/1987 | Allen et al. | 709/234 |
| 4,682,284 A | 7/1987 | Schrofer | 710/55 |
| 4,706,216 A | 11/1987 | Carter | 365/94 |
| 4,720,780 A | 1/1988 | Dolecek | 712/18 |
| 4,739,474 A | 4/1988 | Holsztynski | 712/14 |
| 4,761,755 A | 8/1988 | Ardini et al. | 712/27 |
| 4,811,214 A | 3/1989 | Nosenchuck et al. | 712/11 |
| 4,852,043 A | 7/1989 | Guest | 710/300 |
| 4,852,048 A | 7/1989 | Morton | 712/11 |
| 4,860,201 A | 8/1989 | Stolfo et al. | 712/11 |
| 4,870,302 A | 9/1989 | Freeman | 326/41 |
| 4,891,810 A | 1/1990 | de Corlieu et al. | 714/11 |
| 4,901,268 A | 2/1990 | Judd | 708/513 |
| 4,910,665 A | 3/1990 | Mattheyses et al. | 712/15 |
| 4,967,340 A | 10/1990 | Dawes | 712/19 |
| 5,014,193 A | 5/1991 | Garner et al. | 710/10 |
| 5,015,884 A | 5/1991 | Agrawal et al. | 326/39 |
| 5,021,947 A | 6/1991 | Campbell et al. | 712/25 |
| 5,023,775 A | 6/1991 | Poret | 326/40 |
| 5,043,978 A | 8/1991 | Nagler et al. | 370/380 |
| 5,047,924 A | 9/1991 | Fujioka et al. | 713/501 |
| 5,065,308 A | 11/1991 | Evans | 714/11 |
| 5,072,178 A | 12/1991 | Matsumoto | 714/724 |
| 5,081,375 A | 1/1992 | Pickett et al. | 326/41 |
| 5,109,503 A | 4/1992 | Cruickshank et al. | 703/24 |
| 5,113,498 A | 5/1992 | Evan et al. | 710/8 |
| 5,115,510 A | 5/1992 | Okamoto et al. | 712/26 |
| 5,123,109 A | 6/1992 | Hillis | 712/22 |
| 5,125,801 A | 6/1992 | Nabity et al. | 417/44.1 |
| 5,128,559 A | 7/1992 | Steele | 326/38 |
| 5,142,469 A | 8/1992 | Weisenborn | 700/17 |
| 5,144,166 A | 9/1992 | Camarota et al. | 326/41 |
| 5,193,202 A | 3/1993 | Jackson et al. | 718/100 |
| 5,203,005 A | 4/1993 | Horst | 712/15 |
| 5,204,935 A | 4/1993 | Mihara et al. | 706/4 |
| 5,208,491 A | 5/1993 | Ebeling et al. | 326/41 |
| 5,226,122 A | 7/1993 | Thayer et al. | 712/220 |
| RE34,363 E | 8/1993 | Freeman | 326/38 |
| 5,233,539 A | 8/1993 | Agrawal et al. | 716/16 |
| 5,247,689 A | 9/1993 | Ewert | 710/317 |
| 5,274,593 A | 12/1993 | Proebsting | 365/200 |
| 5,287,472 A | 2/1994 | Horst | 365/189 |
| 5,294,119 A | 3/1994 | Vincent et al. | 473/318 |
| 5,301,284 A | 4/1994 | Estes et al. | 711/203 |
| 5,301,344 A | 4/1994 | Kolchinsky | 712/32 |
| 5,303,172 A | 4/1994 | Magar et al. | 708/406 |
| 5,336,950 A | 8/1994 | Popli et al. | 326/39 |
| 5,347,639 A | 9/1994 | Rechtschaffen et al. | 712/203 |
| 5,349,193 A | 9/1994 | Mott et al. | 250/370.06 |
| 5,353,432 A | 10/1994 | Richek et al. | 710/10 |
| 5,361,373 A | 11/1994 | Gilson | 712/1 |
| 5,379,444 A | 1/1995 | Mumme | 712/11 |
| 5,410,723 A | 4/1995 | Schmidt et al. | 712/18 |
| 5,418,952 A | 5/1995 | Morley et al. | 712/14 |
| 5,421,019 A | 5/1995 | Holsztynski et al. | 712/14 |
| 5,422,823 A | 6/1995 | Agrawal et al. | 716/16 |
| 5,425,036 A | 6/1995 | Liu et al. | 371/23 |
| 5,426,378 A | 6/1995 | Ong | 326/39 |
| 5,428,526 A | 6/1995 | Flood et al. | 700/12 |
| 5,430,687 A | 7/1995 | Hung et al. | 365/230.08 |
| 5,440,245 A | 8/1995 | Galbraith et al. | 326/38 |
| 5,440,538 A | 8/1995 | Olsen | 370/228 |
| 5,442,790 A | 8/1995 | Nosenchuck | 717/155 |
| 5,444,394 A | 8/1995 | Watson et al. | 326/45 |
| 5,448,186 A | 9/1995 | Kawata | 326/41 |
| 5,455,525 A | 10/1995 | Ho et al. | 326/41 |
| 5,457,644 A | 10/1995 | McCollum | 708/230 |
| 5,465,375 A | 11/1995 | Thepaut et al. | 712/15 |
| 5,473,266 A | 12/1995 | Ahanin et al. | 326/41 |
| 5,473,267 A | 12/1995 | Stansfield | 326/41 |
| 5,475,583 A | 12/1995 | Bock et al. | 700/12 |
| 5,475,803 A | 12/1995 | Stearns et al. | 345/648 |
| 5,475,856 A | 12/1995 | Kogge | 712/20 |
| 5,483,620 A | 1/1996 | Pechanek et al. | 706/41 |
| 5,485,103 A | 1/1996 | Pedersen et al. | 326/41 |
| 5,485,104 A | 1/1996 | Agrawal et al. | 326/38 |
| 5,489,857 A | 2/1996 | Agrawal et al. | 326/41 |
| 5,491,353 A | 2/1996 | Kean | 257/208 |
| 5,493,239 A | 2/1996 | Zlotnick | 326/38 |
| 5,497,498 A | 3/1996 | Taylor | 710/104 |
| 5,506,998 A | 4/1996 | Kato et al. | 712/29 |
| 5,510,730 A | 4/1996 | El Gamal et al. | 326/41 |
| 5,511,173 A | 4/1996 | Yamaura et al. | 712/248 |
| 5,513,366 A | 4/1996 | Agarwal et al. | 712/22 |
| 5,521,837 A | 5/1996 | Frankle et al. | 716/10 |
| 5,522,083 A | 5/1996 | Gove et al. | 712/22 |
| 5,530,873 A | 6/1996 | Takano | 710/260 |
| 5,530,946 A | 6/1996 | Bouvier et al. | 714/23 |
| 5,532,693 A | 7/1996 | Winters et al. | 341/51 |
| 5,532,957 A | 7/1996 | Malhi | 365/154 |
| 5,535,406 A | 7/1996 | Kolchinsky | 712/10 |
| 5,537,057 A | 7/1996 | Leong et al. | 326/41 |
| 5,537,601 A | 7/1996 | Kimura et al. | 712/35 |
| 5,541,530 A | 7/1996 | Cliff et al. | 326/41 |
| 5,544,336 A | 8/1996 | Kato et al. | 710/316 |
| 5,548,773 A | 8/1996 | Kemeny et al. | 712/11 |
| 5,555,434 A | 9/1996 | Carlstedt | 712/38 |
| 5,559,450 A | 9/1996 | Ngai et al. | 326/40 |
| 5,561,738 A | 10/1996 | Kinerk et al. | 706/4 |
| 5,570,040 A | 10/1996 | Lytle et al. | 326/41 |
| 5,574,930 A | 11/1996 | Halverson, Jr. et al. | 712/34 |
| 5,583,450 A | 12/1996 | Trimberger et al. | 326/41 |
| 5,586,044 A | 12/1996 | Agrawal et al. | 716/16 |
| 5,587,921 A | 12/1996 | Agrawal et al. | 716/16 |
| 5,588,152 A | 12/1996 | Dapp et al. | 712/16 |
| 5,590,345 A | 12/1996 | Barker et al. | 712/11 |
| 5,590,348 A | 12/1996 | Phillips et al. | 712/223 |
| 5,596,742 A | 1/1997 | Agarwal et al. | 716/16 |
| 5,600,265 A | 2/1997 | El Gamal et al. | 326/41 |
| 5,600,845 A | 2/1997 | Gilson | 712/39 |
| 5,611,049 A | 3/1997 | Pitts | 707/8 |
| 5,617,547 A | 4/1997 | Feeney et al. | 710/316 |
| 5,625,806 A | 4/1997 | Kromer | 713/501 |
| 5,634,131 A | 5/1997 | Matter et al. | 713/322 |
| 5,649,176 A | 7/1997 | Selvidge et al. | 713/400 |
| 5,649,179 A | 7/1997 | Steenstra et al. | 712/248 |
| 5,652,894 A | 7/1997 | Hu et al. | 713/322 |
| 5,655,069 A | 8/1997 | Ogawara et al. | 714/10 |
| 5,655,124 A | 8/1997 | Lin | 713/322 |
| 5,657,330 A | 8/1997 | Matsumoto | 714/733 |
| 5,659,797 A | 8/1997 | Zandveld et al. | 710/22 |
| 5,675,743 A | 10/1997 | Mavity | 710/100 |
| 5,680,583 A | 10/1997 | Kuijsten | 703/23 |
| 5,713,037 A | 1/1998 | Wilkinson et al. | 702/33 |
| 5,717,943 A | 2/1998 | Barker et al. | 712/20 |
| 5,732,209 A | 3/1998 | Vigil et al. | 714/30 |
| 5,734,921 A | 3/1998 | Dapp et al. | 712/10 |
| 5,742,180 A | 4/1998 | DeHon et al. | 326/40 |
| 5,748,872 A | 5/1998 | Norman | 714/11 |
| 5,754,827 A | 5/1998 | Barbier et al. | 703/14 |
| 5,754,871 A | 5/1998 | Wilkinson et al. | 712/20 |
| 5,760,602 A | 6/1998 | Tan | 326/38 |
| 5,761,484 A | 6/1998 | Agarwal et al. | 716/16 |
| 5,773,994 A | 6/1998 | Jones | 326/41 |
| 5,778,439 A | 7/1998 | Trimberger et al. | 711/153 |
| 5,784,636 A | 7/1998 | Rupp | 712/37 |
| 5,794,059 A | 8/1998 | Barker et al. | 712/10 |
| 5,794,062 A | 8/1998 | Baxter | 712/30 |

| Patent No. | Date | Inventor | Class |
|---|---|---|---|
| 5,801,715 A | 9/1998 | Norman | 345/505 |
| 5,802,290 A | 9/1998 | Casselman | 709/201 |
| 5,828,229 A | 10/1998 | Cliff et al. | 326/40 |
| 5,828,858 A | 10/1998 | Athanas et al. | 710/317 |
| 5,838,165 A | 11/1998 | Chatter | 326/38 |
| 5,844,888 A | 12/1998 | Markkula, Jr. et al. | 370/255 |
| 5,848,238 A | 12/1998 | Shimomura et al. | 714/49 |
| 5,854,918 A | 12/1998 | Baxter | 713/500 |
| 5,859,544 A | 1/1999 | Norman | 326/40 |
| 5,865,239 A | 2/1999 | Carr | 164/98 |
| 5,867,691 A | 2/1999 | Shiraishi | 713/400 |
| 5,867,723 A | 2/1999 | Chin et al. | 712/11 |
| 5,884,075 A | 3/1999 | Hester et al. | 713/100 |
| 5,887,162 A | 3/1999 | Williams et al. | 713/1 |
| 5,889,982 A | 3/1999 | Rodgers et al. | 712/229 |
| 5,892,370 A | 4/1999 | Eaton et al. | 326/39 |
| 5,892,961 A | 4/1999 | Trimberger | 712/10 |
| 5,901,279 A | 5/1999 | Davis, III | 714/3 |
| 5,915,123 A | 6/1999 | Mirsky et al. | 712/16 |
| 5,924,119 A | 7/1999 | Sindhu et al. | 711/141 |
| 5,927,423 A | 7/1999 | Wada et al. | 180/209 |
| 5,936,424 A | 8/1999 | Young et al. | 326/39 |
| 5,943,242 A | 8/1999 | Vorbach et al. | 716/17 |
| 5,956,518 A | 9/1999 | DeHon et al. | 712/15 |
| 5,966,534 A | 10/1999 | Cooke et al. | 717/155 |
| 5,970,254 A | 10/1999 | Cooke et al. | 712/37 |
| 6,011,407 A | 1/2000 | New | 326/39 |
| 6,014,509 A | 1/2000 | Furtek et al. | 716/16 |
| 6,021,490 A | 2/2000 | Vorbach et al. | 713/100 |
| 6,023,742 A | 2/2000 | Ebeling et al. | 710/107 |
| 6,034,538 A | 3/2000 | Abramovici | 326/38 |
| 6,038,650 A | 3/2000 | Vorbach et al. | 711/219 |
| 6,038,656 A | 3/2000 | Martin et al. | 712/211 |
| 6,047,115 A | 4/2000 | Mohan et al. | 712/211 |
| 6,049,222 A | 4/2000 | Lawman | 326/38 |
| 6,052,773 A | 4/2000 | DeHon et al. | 713/100 |
| 6,054,873 A | 4/2000 | Laramie | 326/39 |
| 6,081,903 A | 6/2000 | Vorbach et al. | 713/100 |
| 6,085,317 A | 7/2000 | Smith | 713/1 |
| 6,088,795 A | 7/2000 | Vorbach et al. | 713/100 |
| 6,092,174 A | 7/2000 | Roussakov | 712/15 |
| 6,105,105 A | 8/2000 | Trimberger | 711/103 |
| 6,108,760 A | 8/2000 | Mirsky et al. | 711/203 |
| 6,119,181 A | 9/2000 | Vorbach et al. | 710/100 |
| 6,122,719 A | 9/2000 | Mirsky et al. | 712/15 |
| 6,125,408 A | 9/2000 | McGee et al. | 710/8 |
| 6,127,908 A | 10/2000 | Bozler et al. | 333/246 |
| 6,172,520 B1 | 1/2001 | Lawman et al. | 326/38 |
| 6,202,182 B1 | 3/2001 | Abramovici et al. | 714/725 |
| 6,219,833 B1 | 4/2001 | Solomon et al. | 717/5 |
| 6,230,307 B1 | 5/2001 | Davis et al. | 716/16 |
| 6,243,808 B1 | 6/2001 | Wang | 712/300 |
| 6,260,179 B1 | 7/2001 | Ohsawa et al. | 716/5 |
| 6,263,430 B1 | 7/2001 | Trimberger et al. | 713/1 |
| 6,279,077 B1 | 8/2001 | Nasserbakht et al. | 711/118 |
| 6,282,627 B1 | 8/2001 | Wong et al. | 712/15 |
| 6,288,566 B1 | 9/2001 | Hanrahan et al. | 326/38 |
| 6,289,440 B1 | 9/2001 | Casselman | 712/227 |
| 6,298,472 B1 | 10/2001 | Phillips et al. | 716/18 |
| 6,311,200 B1 | 10/2001 | Hanrahan et al. | 708/232 |
| 6,321,366 B1 | 11/2001 | Tseng et al. | 716/6 |
| 6,321,373 B1 | 11/2001 | Ekanadham et al. | 717/1 |
| 6,338,106 B1 | 1/2002 | Vorbach et al. | 710/100 |
| 6,341,318 B1 | 1/2002 | Dakhil | 710/23 |
| 6,347,346 B1 | 2/2002 | Taylor | 710/23 |
| 6,349,346 B1 | 2/2002 | Hanrahan et al. | 710/9 |
| 6,370,596 B1 | 4/2002 | Dakhil | 710/15 |
| 6,378,068 B1 | 4/2002 | Foster et al. | 713/1 |
| 6,389,379 B1 | 5/2002 | Lin et al. | 703/14 |
| 6,389,579 B1 | 5/2002 | Phillips et al. | 716/6 |
| 6,392,912 B1 | 5/2002 | Hanrahan et al. | 365/63 |
| 6,405,299 B1 | 6/2002 | Vorbach et al. | 712/11 |
| 6,421,817 B1 | 7/2002 | Mohan et al. | 716/16 |
| 6,425,068 B1 | 7/2002 | Vorbach et al. | 712/18 |
| 6,457,116 B1 | 9/2002 | Mirsky et al. | 712/16 |
| 6,477,643 B1 | 11/2002 | Vorbach et al. | 713/100 |
| 6,480,937 B1 | 11/2002 | Vorbach et al. | 711/122 |
| 6,480,954 B2 | 11/2002 | Trimberger et al. | 713/1 |
| 6,513,077 B2 | 1/2003 | Vorbach et al. | 710/100 |
| 6,519,674 B1 | 2/2003 | Lam et al. | 711/103 |
| 6,526,520 B1 | 2/2003 | Vorbach et al. | 713/600 |
| 6,538,468 B1 | 3/2003 | Moore | 326/40 |
| 6,539,477 B1 | 3/2003 | Seawright | 713/100 |
| 6,542,998 B1 | 4/2003 | Vorbach et al. | 713/400 |
| 6,571,381 B1 | 5/2003 | Vorbach et al. | 716/16 |
| 6,587,939 B1 | 7/2003 | Takano | 712/210 |
| 6,657,457 B1 | 12/2003 | Hanrahan et al. | 326/41 |
| 6,687,788 B2 | 2/2004 | Vorbach et al. | 711/122 |
| 6,697,979 B1 | 2/2004 | Vorbach et al. | 714/724 |
| 6,728,871 B1 | 4/2004 | Vorbach et al. | 712/726 |
| 2002/0038414 A1 | 3/2002 | Taylor et al. | 711/217 |
| 2002/0045952 A1 | 4/2002 | Blemel | 700/2 |
| 2002/0143505 A1 | 10/2002 | Drusinksy | 703/2 |
| 2002/0144229 A1 | 10/2002 | Hanrahan | 716/17 |
| 2002/0165886 A1 | 11/2002 | Lam | 708/209 |
| 2003/0014743 A1 | 1/2003 | Cooke et al. | 717/161 |
| 2003/0046607 A1 | 3/2003 | Vorbach | 714/25 |
| 2003/0052711 A1 | 3/2003 | Taylor et al. | 326/38 |
| 2003/0055861 A1 | 3/2003 | Lai et al. | 708/620 |
| 2003/0056085 A1 | 3/2003 | Vorbach | 712/32 |
| 2003/0056091 A1 | 3/2003 | Greenberg | 713/100 |
| 2003/0056202 A1 | 3/2003 | Vorbach | 713/136 |
| 2003/0093662 A1 | 5/2003 | Vorbach et al. | 713/100 |
| 2003/0097513 A1 | 5/2003 | Vorbach et al. | 375/341 |
| 2003/0123579 A1 | 7/2003 | Safavi et al. | 375/341 |
| 2003/0135686 A1 | 7/2003 | Vorbach et al. | 710/317 |
| 2004/0015899 A1 | 1/2004 | May et al. | 717/140 |
| 2004/0025005 A1 | 2/2004 | Vorbach et al. | 713/600 |
| 2004/0168099 A1 | 8/2004 | Vorbach et al. | 713/600 |

FOREIGN PATENT DOCUMENTS

| | | |
|---|---|---|
| DE | 197 04 044 | 8/1998 |
| DE | 197 04 728 | 8/1998 |
| DE | 197 04 742 | 9/1998 |
| DE | 198 07 872 | 8/1999 |
| DE | 198 61 088 | 2/2000 |
| DE | 199 26 538 | 12/2000 |
| DE | 100 36 627 | 2/2002 |
| DE | 101 29 237 | 4/2002 |
| DE | 102 04 044 | 8/2003 |
| EP | 0 221 360 | 5/1987 |
| EP | 0 428 327 A1 | 5/1991 |
| EP | 0 477 809 | 4/1992 |
| EP | 0 539 596 A1 | 5/1993 |
| EP | 0 628 917 | 12/1994 |
| EP | 0 678 985 | 10/1995 |
| EP | 0707269 A1 | 4/1996 |
| EP | 0 726 532 | 8/1996 |
| EP | 735 685 | 10/1996 |
| EP | 0 835 685 | 10/1996 |
| EP | 0 748 051 A2 | 12/1996 |
| EP | 0 726 532 | 7/1998 |
| EP | 0 926 594 | 6/1999 |
| EP | 1102674 | 7/1999 |
| WO | A90/04835 | 5/1990 |
| WO | 90/11648 | 10/1990 |
| WO | A93/11503 | 6/1993 |
| WO | 94/08399 | 4/1994 |
| WO | 95/00161 | 1/1995 |
| WO | 95/26001 | 9/1995 |
| WO | WO98/26356 | 6/1998 |
| WO | WO98/28697 | 7/1998 |

| WO | WO98/29952 | 7/1998 |
| WO | WO98/31102 | 7/1998 |
| WO | WO98/35299 | 8/1998 |
| WO | WO99/32975 | 7/1999 |
| WO | WO99/40522 | 8/1999 |
| WO | WO99/44120 | 9/1999 |
| WO | WO99/44147 | 9/1999 |
| WO | WO0/17771 | 3/2000 |
| WO | WO00/77652 | 12/2000 |
| WO | WO02/13000 | 2/2002 |
| WO | WO02/21010 | 3/2002 |
| WO | WO02/29600 | 4/2002 |
| WO | WO02/71248 | 9/2002 |
| WO | WO02/71249 | 9/2002 |
| WO | WO02/103532 | 12/2002 |
| WO | WO03/17095 | 2/2003 |
| WO | WO03/23616 | 3/2003 |
| WO | WO03/25781 | 3/2003 |
| WO | WO03/32975 | 4/2003 |
| WO | WO03/36507 | 5/2003 |

OTHER PUBLICATIONS

Ling "WASMII: An MPLD with Data–Driven Control on a Virtual Hardware," Journal of Supercomputing, Kluwer Acdemic Publishers, Dordrecth, Netherlands, 1995, pp. 253–276.

Miller et al., "High–Speed FIFOs Contend with Widely Differeing Data Rates: Dual–port RAM Buffer and Dual–pointer System Provide Rapid, High–density Data Storage and Reduce Overhead", Computer Design, Sep. 1, 1985, pp. 83–86.

Mirsky "MATRIX: A Reconfigurable Computing Architecture with Configurable Instruction Distribution and Deployable Resources," Proceedings of the IEEE Symposium on FPGAs for Custom Computing Machines, 1996, pp. 157–166.

Schmit, H. Et al., Hidden Markov Modeling and Fuzzy Controllers in FPGAs, FPGAs for Custom Computing Machines, 1995; Proceedings, IEEE Symposium on Napa Valley, CA, Apr. 1995, pp. 214–221.

Shirazi et al., "Quantitative analysis of floating point arithmetic on FPGA based custom computing machines," IEEE Symposium on FPGAs For Custom Computing Machines, *IEEE Computer Society Press*, Apr. 19–21, 1995, pp. 155–162.

Simunic, T. Et al., Source Code Optimization and Profiling of Energy Consumption in Embedded Systems, Proceedings of the 13th International Symposium on System Synthesis, Sep. 2000, pp. 193–198.

Tau, et al., "A First Generation DPGA Implementation," *FPD '95*, pp. 138–143.

Tenca et al., "A Variable Long–Precision Arithmetic Unit Design for Reconfigurable Coprocessor Architectures", University of California, Los Angeles, 1998, pp. 216–225.

The XPP White Paper, Release 2.1, PACT—A Technical Perspective, Mar. 27, 2002, pp. 1–27.

TMS320C54X DSP: CPU and Peripherals, Texas Instruments, 1996, pp. 6–26 to 6–46.

TMS320C54x DSP: Mnemonic Instruction Set, Texas Instruments, 1996, p. 4–64.

Villasenor et al., "Express Letters Video Communications Using Rapidly Reconfigurable Hardware," IEEE Transactions on Circuits and Systems for Video Technology, IEEE, Inc. NY, Dec. 1995, pp. 565–567.

Weinhardt et al., "Pipeline Vectorization for Reconfigurable Systems", 1999, IEEE, pp. 52–60.

XLINX, "Logic Cell Array Families: XC4000, XC4000A and XC4000H", product description, pp. 2–7 to 2–15, Additional XC3000, XC31000 and XC3100A Data, pp. 8–16 and 9–14.

Xu et al., "Parallel QR Factorization on a Block Data Flow Architecture" Conference Proceeding Article, Mar. 1, 1992, pp. 332–336 XPO10255276, p. 333, Abstract 2.2, 2.3, 2.4—p. 334.

Ye et al., "A Compiler for a Processor With A Reconfigurable Functional Unit," FPGA 2000 ACM/SIGNA International Symposium on Field Programmable Gate Arrays, Monterey, CA Feb. 9–11, 2000, pp. 95–100.

Zhang, N. Et al., Architectural Evaluation of Flexible Digital Signal Processing for Wireless Receivers, Signals, Systems and Computers, 2000; Conference Record of the Thirty–Fourth Asilomar Conference, Bd.1, Oct. 29, 2000, pp. 78–83.

Ade et al., "Minimum Memory Buffers in DSP Applications," Electronics Letters, vol. 30, No. 6, Mar. 17, 1994, pp. 469–471.

Alippi et al., Determining the Optimum Extended Instruction Set Architecture for Application Specific Reconfigurable VLIW CPUs, IEEE., 2001, pp. 50–56.

Arabi et al., "PLD Integrates Dedicated High–speed Data Buffereing, Complex State Machine, and Fast Decode Array," conference record on WESCON '93, Sep. 28, 1993, pp. 432–436.

Athanas P. "A Functional Reconfigurable Architecture and Compiler for Adoptive Computing", IEEE, pp. 49–55.

Athanas, et al., "An Adaptive Hardware Machine Architecture and Compiler for Dynamic Processor Reconfiguration", IEEE, Laboratory for Engineering Man/Machine Systems Division of Engineering, Box D, Brown University Providence, Rhode Island, 1991, pp. 397–400.

Baumgarte et al., PACT XPP "A Self–reconfigurable Data Processing Architecture," PACT Info. GMBH, Munchen Germany 2001.

Becker et al., "Parallelization in Co–compilation for Configurable Accelerators—a Host/accelerator Partitioning Compilation Method," proceedings of Asia and South Pacific Design Automation Conference, Yokohama, Japan, Feb. 10–13, 1998.

Bittner, R. A. Jr., "Wormhole Run–time Reconfiguration: Conceptualization and VLSI Design of a High Performance Computing Systems," *Dissertation*, Jan. 23, 1997, pp. I–XX, 1–415.

Callahan, T. et al. "The Garp Architechture and C Copiler," Computer, Apr. 2000, pp. 62–69.

Cardoso "Compilation of Java™ Algorithms onto Reconfigurable Computing Systems with Exploitation of Operation–Level Parallelism," Ph.D. Thesis, Universidate Tecnica de Lisboa (UTL), Lisbon, Portugal Oct. 2000 (English Abstract included).

Diniz et al., "Automatic Synthesis of Data Storage and Control Structures for FPGA–based Computing Engines", 2000, IEEE, pp. 91–100.

Donandt, "Improving Response Time of Programmable Logic Controllers by Use of a Boolean Coprocessor", AEG Research Institute Berlin, IEEE, 1989, pp. 4–167–4–169.

Dutt et al., "If Software is King for Systems–on–Silicon, What's New in Compiler", IEEE., 1997, pp. 322–325.

Ferrante J. et al., "The Program Dependence Graph and its Use in Optimization ACM Transactions on Programming Languages and Systems," Jul. 1987, USA, [online] Bd. 9, Nr., 3, pp. 319–349, XP002156651 ISSN: 0164–0935 ACM Digital Library.

Fineberg et al., "Experimental Analysis of a Mixed–Mode Parallel Architecture Using Bitonic Sequence Sorting", vol. 11. No. 3, Mar. 1991, pp. 239–251.

Fornaciari, W. Et al., System–level power evaluation metrics, 1997 Proceedings of the 2nd Annual IEEE International Conference on Innovative Systems in Silicon, New York, NY, Oct. 1997, pp. 323–330.

Gokhale M. B. et al., "Automatic Allocation of Arrays to Memories in FPGA processors with Multiple Memory Banks", Field–Programmable Custom Computing Machines, 1999, IEEE, pp. 63–67.

Hammes et al., "Cameron: High Level Language Compilation for Reconfigurable Systems," Department of Computer Science, Colorado State University, Conference on Parallel Architectures and Compilation Techniques, Oct. 12–16, 1999.

Hauser et al., "Garp: A MIPS Processor with a Reconfigurable Coprocessor", University of California, Berkeley, IEEE, 1997, pp. 12–21.

Hedge, 3D WASP Devices for On–line Signal and Data Processing, 1994, International Conference on Wafer Scale Integration, pp. 11–21.

Hwang L. et al., "Min–cut Replication in Partitioned Networks" IEEE Transactions on Computer–Aided Design of Integrated Circuits and Systems, [online] Bd. 14, Nr. 1, Jan. 1995, pp. 96–106, XP00053228 USA ISSN: 0278–0070 IEEE Xplore.

Iseli et al. "A C++ Compiler for FPGA Custom Execution Units Synthesis," IEEE. 1995, pp. 173–179.

Isshiki et al., "Bit–Serial Pipeline Synthesis for Multi–FPGA Systems with C++ Design Capture," 1996 IEEE, pp. 38–47.

Jacob et al., "Memory Interfacing and Instruction Specification for Reconfigurable Processors", ACM 1999, pp. 145–154.

Jantsch et al., "A Case Study on Hardware/software Partitioning," Royal Institute of Technology, Kista, Sweden, Apr. 10, 1994 IEEE, pp. 111–118.

John et al., "A Dynamically Reconfigurable Interconnect for Array Processors", vol. 6, No. 1, Mar. 1998, IEEE.

K. Wada, et al. "A Performance Evaluation of Tree–Based Coherent Distributed Shared Memory" Proceedings of the Pacific RIM Conference on Communications, Comput and Signal Processing, Victoria, May 19–21, 1993.

Nilsson et al., "The Scalable Tree Protocol—A Cache Coherence Approach for Large–Scale Multiprocessors", IEEE, pp. 498–506, Dec. 1992.

Wu et al., "A New Cache Director Scheme", IEEE, pp. 466–472, Jun. 1996.

Bittner, Ray, A., Jr., Wormhole Run–Time Reconfiguration: Conceptualization and VLSI Design of a High Performance Computing System:, Dissertation, Jan. 23, 1997, pp. i–xx, 1–415.

Athanas, Peter, et al., "IEEE Symposium on FPGAs For Custom Computing Machines," IEE Computer Society Press, Apr. 19–21, 1995 pp. i–vii, 1–222.

M. Morris Mano, "Digital Design," by Prentice Hall, Inc., Englewood Cliffs, New Jersey 07632, 1984, pp. 119–125, 154–161.

M. Salceba, "A Self–Contained Dynamically Reconfigurable Processor Architecture", Sixteenth Australian Computer Science Cinferene, ASCS–16, QLD, Australia, Feb., 1993.

Maxfield, C. "Logic that Mutates While–U–Wait" EDN (Bur. Ed.) (USA), EDN (European Edition), Nov. 7, 1996, Cabners Publishing, USA.

Myers, G., Advances in Computer Architecture Wiley–Interscience Publication, 2nd ed., John Wiley & Sons, Inc. pp. 463–494, 1978.

Norman, Richard S., Hyperchip Business Summary, The Opportunity, Jan. 31, 2000, pp. 1–3.

Villasenor, John, et al., "Configurable Computing Solutions for Automatic Target Recogition," IEEE, 1996 pp. 70–79.

Villasenor, John, et al., "Configurable Computing." Scientific American, vol. 276, No. 6, Jun. 1997, pp. 66–71.

*Hauck, "The Roles of FPGA's in Reprogrammable Systems," IEEE, Apr. 1998, pp. 615–638.

*Wittig et al., "OneChip: An FPGA Processor with Reconfigurable Logic," IEEE, 1996, pp 126–135.

*Cadambi et al., "Managing Pipeline–Reconfigurable FPGAs," ACM, 1998, pp 55–64.

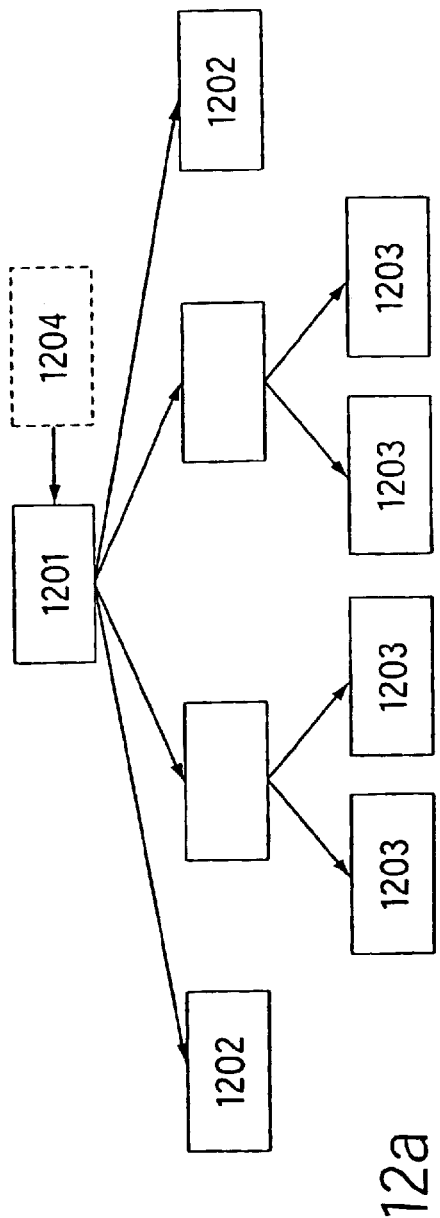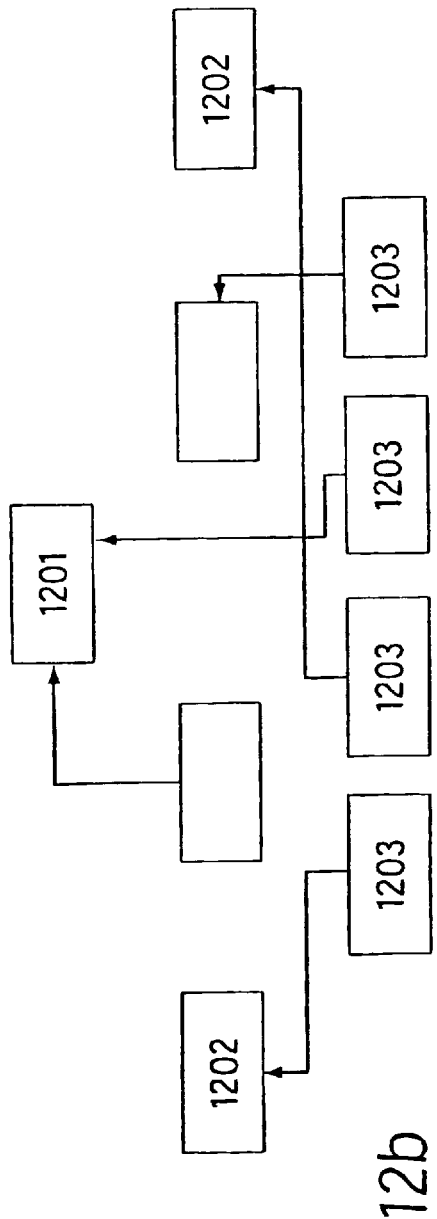
FIG. 12a
FIG. 12b

METHOD OF HIERARCHICAL CACHING OF CONFIGURATION DATA HAVING DATAFLOW PROCESSORS AND MODULES HAVING TWO- OR MULTIDIMENSIONAL PROGRAMMABLE CELL STRUCTURE (FPGAS, DPGAS, ETC.)

This application is a continuation of U.S. application Ser. No. 10/191,926, filed Jul. 4, 2002, now U.S. Pat. No. 6,687,788, which is a continuation of U.S. application Ser. No. 09/623,052, now U.S. Pat. No. 6,480,937; filed Jan. 9, 2001, each of which is expressly incorporated herein by reference in its entirety.

BACKGROUND INFORMATION

1. Related Art

The related art on which this patent specification is based is described in German Patent Application 196 54 846.2–53 (Method of automatic dynamic reloading of dataflow processors (DFPs) and modules having a two- or multidimensional programmable cell matrix (FPGAs, DPGAs, etc.) and in German Patent Application 196 54 593. 5–53 (Run-time reconfiguration method for programmable modules). A method of configuring and reconfiguring DFPs, as well as FPGAs, DPGAs and similar modules according to the related art in which a separately configured central higher-order microcontroller-like module assumes the task of distribution of configuration data to a plurality of lower-order, mostly passive control units is described in these documents.

2. Disadvantages of the Related Art

By using a central global unit which controls the reconfiguration of parts (e.g. cells (CELs)) of one or more modules, bottlenecks occur when a plurality of different reconfiguration requests are to be handled at the same time. The advantages of the parallelism of the above-described modules are considerably limited by such a central unit, since it represents the typical bottleneck and substantially slows down the processing of data.

Furthermore, assigning the event source to the configuration to be loaded represents a problem because absolute addresses of the configuration memory are used. The reconfiguration unit must therefore contain a type of memory management system which, like in an operating system, also documents which memory area is used by which configuration.

Management of resources (e.g. CELs) represents an additional problem. It must be ensured that each CEL is assigned exactly once to each algorithm started by a reconfiguration request and, specifically, to the one that also uses the remaining surrounding CELs; otherwise deadlocks may occur.

In order to elucidate the problem of reconfiguration again, the following example is given: a matrix of CELs is reconfigured and in the RESET state. Each CEL is capable of indicating whether it is in a reconfigurable state. All CELs in the matrix are ready to be configured; thus they are in a reconfigurable state. A first configuration routine (KR1) is loaded; the matrix is not fully utilized. The configured CELs clear the indication that they are in a configurable state. A second configuration routine (KR2) independent of the first one is loaded in a group of not yet configured CELs. A third configuration cannot be loaded, since this requires CELs of the first and/or second configuration routine (KR3); however these are not in a reconfigurable state as they are being used.

KR3 must be stopped until the required CELs are released, i.e., KR1 and KR2 are terminated.

During the execution of KR1 and KR2, a load request for a fourth configuration routine (KR4) and a fifth configuration routine (KR5) arrives, which cannot all be loaded immediately, because they use CELs that are being used by KR1 and KR2. KR3 and KR4 partially use the same CELs; KR5 uses none of the CELs of KR3 and KR4.

In order to properly reload KR3–KR5, the following requirements must be met:

1. KR3–KR5 should be loaded in the order of the load requests if possible.
2. As many KRs as possible that are independent of one another, i.e., have no common CELs, should be loaded in order to achieve maximum parallelism.
3. The KRs should not block one another, i.e., KR3 is partially loaded but cannot be loaded any further since other CELs are blocked by the partially loaded KR4; while KR4 also cannot be loaded further since again required CELs are blocked by KR3. This results in a typical deadlock situation.
4. The compiler which generated the KRs cannot recognize and cancel the interaction over time of the KRs so that no conflict situation arises.

The ratio between the cost of a circuit to be implemented and an optimum result should be as good as possible, i.e., the object of the invention is to provide a flexible, parallel, deadlock-free configuration that can be executed using moderate time and computing resources at a low cost. In this context the following basic problems must be solved:

if only KR3 were to be loaded, the process would be deadlock free but not optimum since KR5 could also be loaded.

if KR3 is loaded but KR4 is not, and KR5, KR4 must be pre-marked so that it has the highest priority in a subsequent loading sequence, which means high overhead.

Deadlock-free operation is ensured by the following procedure:

IMPROVEMENTS THROUGH AND OBJECT OF THE INVENTION

The basic object of the present invention is a unit, hereinafter referred to as configuration table (CT), which has a hierarchical structure and may occur several times at each level, the number of CTs from the lowest hierarchical level to the highest diminishing so that exactly one CT is present at the highest level. Each CT configures and controls independently from others and in parallel a plurality of configurable elements (CELs). CTs of the higher hierarchical levels can buffer configuration routines for lower-level CTs. If more than one lower-level CT requires the same configuration routine, it is buffered in a higher-level CT and retrieved by the individual CTs, the higher-level CT retrieving the respective configuration routine only once from a global common configuration memory whereby a cache effect is achieved. In addition to configurable modules, the present invention can be used as a cache procedure for instruction and data cache in microprocessors, DFP or the like having a plurality of arithmetic units. Some of the units to be described below may be omitted depending on the application (e.g., FILMO) however, basically nothing is changed in the hierarchical structure. Therefore this application is considered a subset and is not described in detail. One considerable advantage of the method described over conventional cache procedures is that data and/or codes are cached selectively, i.e., using methods adapted accurately to the algorithm.

The present invention also allows large cell structures to be reconfigured in a completely deadlock-free manner.

DESCRIPTION OF THE INVENTION

Instead of integrating, as previously, a central and global unit in one module, with this unit processing all the configuration requests, there is a plurality of hierarchically (tree structure) arranged active units which can assume this task.

A request from the lowest level (the leaves in the hierarchy) is forwarded to the next higher level only if the request could not be processed. These steps are repeated for all the levels present until the highest level is reached.

The highest level is connected to an internal or external higher-level configuration memory which contains all the configuration data required by this program run.

Due to the tree structure of the configuration units a kind of caching of the configuration data is achieved. Accesses to configurations mainly occur locally. In the most unfavorable case, a configuration must be loaded from the higher-level configuration memory if the corresponding data is not available in any of the hierarchically arranged CTs.

Deadlocks are avoided in that a fixed time sequence of the configurations to be loaded is introduced and the configurations are combined to form a list. The status information of the CELs is saved prior to loading and thus remains unchanged during the processing of the entire list of configurations.

Basic Principle of the CT

A configuration table (CT) is an active unit which responds to sync signals, known as triggers. The triggers are generated by a two- or multi-dimensional matrix of electronic components usually for arithmetic or logical units, address generators, arithmetic units, and the like, hereinafter referred to as configurable elements (CEL). The trigger that occurs triggers a certain action within the CT. The task of the CT is to assume the control of a plurality of CELs and to determine their arithmetic and/or logical operations. In particular, CELs must be configured and reconfigured. A CT assumes this task by managing a plurality of possible configuration routines (KR) which in turn each contain a plurality of individual configuration words (KW) and configure a plurality of CELs on the basis of the trigger conditions using one or more KR. Each CEL receives one or more configuration words, which are provided with the address of the CEL to be configured. A KR must be fully and correctly mapped to a plurality of CELs; a plurality of CELs can be combined to form groups; these groups are configured using different but fully executed KRs. All CELs in a group are interconnected so that after a necessary reconfiguration has been determined it is communicated to all the grouped CELs, via a common signal (ReConfig), that each CEL must terminate data processing and go into a reconfigurable state.

Basic Principles of the Deadlock-Free Reconfiguration

In systems that are reconfigurable in runtime the problem arises that the system may enter a state in which two parts wait for each other, thus creating a deadlock situation.

This problem could be avoided by only loading a new configuration always entirely or not at all into the system or by using a type of timeout procedure.

This entails a series of disadvantages (space requirements, running time, etc.) and problems such as:
  procedure if a configuration cannot be loaded.
  managing the order in which the configurations are loaded.
  deteriorated performance, since other configurations that could possibly be loaded into the CELs are not taken into account.

These problems can be eliminated with the method described in the following. The starting point is a DFP system according to the related art.

A trigger signal is transmitted from a CEL to a CT. This CT determines the trigger source and selects a configuration (KR) to be loaded using a lookup table. The incoming trigger signals are blocked, and no further triggers are accepted until the current configuration is completely processed. A configuration contains a plurality of commands which are transmitted to a number of CELs. In a system configurable in runtime it is, however, not guaranteed that each configuration command (KW) can also be executed. Impossibility of execution may be caused, for example, by the fact that the addressed configurable element (CEL) has not yet completed its task and thus cannot accept any new configuration data. In order to avoid performance deterioration, all configuration commands that could not be processed (since the respective CELs were not in a reconfigurable state and rejected the configuration (REJECT)) are written according to the FIFO principle in a configuration command located in a special memory (FILMO) (to be described in detail below) after the last command. Subsequently the next configuration command is executed by the same procedure. This is repeated until the end of a configuration has been reached.

Subsequently, the CT assumes a state in which it accepts trigger signals allowing it to continue to load configurations. In this state, the CT processes the FILMO in regular intervals under the control of a timer.

The configurations to be loaded are prioritized by the fact that the CT runs through the FILMO memory before the configuration to be actually loaded is processed. A FIFO-like structure of the FILMO ensures that KWs which could not be fully processed during previous trigger requests automatically obtain a higher priority with respect to the new to be processed. When the FILMO memory is processed each configurable element (CEL) addressed by a configuration command is tested prior to or during the transmission of a KW to see whether it is in the "reconfigurable" state. If this state is "reconfigurable" (ACCEPT), the data is transmitted and deleted from the FILMO memory. If the state is "not reconfigurable" (REJECT), the data remains in FILMO and is processed again in the next run. The CT processes the next entry in FILMO.

This is repeated until the end of the FILMO is reached. Then the actual configuration activated by the occurrence of the trigger signal is processed. The structure of the FILMO corresponds to the FIFO principle, i.e., the oldest entry is processed first. In order to process the FILMO even when no new KR is loaded, the FILMO is run through in regular intervals under the control of a timer.

The other, uninvolved configurable elements (CEL) continue to work simultaneously during this phase without their function being affected. Thus it may occur that while the CT processes the FILMO, one or more configurable elements (CELs) change to the "reconfigurable" state. Since the CT with the processing may be at any location within the FILMO, the following may occur:

The CT attempts to process a first command whose addressed element to be configured (CEL) is not in the "reconfigurable" state. Therefore, the CT continues with the next command (KW). At the same time one or more configurable elements change to the "reconfigurable" state, among them also the configurable element which could have been written via the first configuration command. The CT processes a second configuration command (KW), which uses the same configurable element (CEL) as the first configuration command, however originates from another configuration. At this time, the configurable element (CEL) is in the "reconfigurable" state and the command can be processed successfully.

This no longer ensures that the configuration which should have been loaded first is actually completed first. Two partially completed configurations can now exist each of which requires configurable elements of the other configuration in order to be fully loaded. A deadlock situation has occurred, which is illustrated in FIG. 18. Configuration A and configuration B are to be configured. The CT has already loaded the crosshatched part of configuration A and configuration B. Configuration A still requires the light double shaded area of configuration B for completion and configuration B still requires the dark double shaded area of configuration A for completion. Since neither configuration is fully completed and thus functional, the termination state in which one of the two configurations would be removed does not occur for either of the two configurations. Both configurations are waiting the for the release of the configurable elements still needed.

In the present method a deadlock is prevented in that the CT detects the states of all configurable elements prior to processing the FILMO and then allows no more changes or ignores the changes that occur until the sequence is completed. In other words, either the states of all configurable elements are saved prior to processing the FILMO or a status change is prevented while the FILMO is being processed. One possible technical implementation is the use of a register in each configurable element in which the status prior to processing the FILMO is saved. The CT only works on the basis of the states detected and not with the current states of the configurable elements. This ensures that each command (KW) to be processed is faced with the same state of the configurable elements (CELs). This step does not rule out that one or more configurable elements switch to the "reconfigurable" state while the FILMO is being processed. This change, however, is not immediately visible to the CT during processing, but only when the next run begins.

Configuration Sequences

In order to configure certain algorithms, it is absolutely necessary to strictly observe the order in which the KW are written in the CEL. For example, it is recommended that the bus system be configured first before a CEL is connected to a bus system, so that the CEL is not connected to a bus used by another routine. In other words, a CEL is only configured if the respective bus links have been previously configured.

In the method according to the present invention, a fixed sequence is observed as follows:

Configuration words (KWs) whose execution is decisive for the configuration of the subsequent KWs are especially marked (and referred to as KWR below). If the configuration of such a KWR fails, all subsequent KWs within the respective configuration routine (KR) are written to the FILMO and are not executed in this run. Even when running through the FILMO, all KWs located in the sequence behind a KWR whose configuration failed are not executed in the current run.

Cache Procedure

The CT has a hierarchical structure, i.e., there are several CT levels in a module. The arrangement is preferably a tree structure (CT tree). An external configuration memory (ECR), containing all KRs is assigned here to the root CT, while the configurable elements (CELs) which call up the individual KRs are assigned to the leaves. The configurable elements are assigned to the mid-level CTs of the same hierarchical level. A local internal memory is assigned to each CT. This memory is partially cleared when there is no more space for new KRs to be stored or when this is explicitly requested by a special CT command (REMOVE). The memory is cleared one KR at a time using a delete strategy such that in the ideal case only those KRs are deleted that are no longer requested or are explicitly identified in the REMOVE command. The number of KRs deleted individually is such as to free the exact amount of memory space required to write the new KRs to be loaded into the memory. As a result, as many KRs as possible remain in the memory to optimize the cache effect.

The advantage is that the each CT subordinate to any desired CTx and thus located further up in the CT tree does not request a KR stored in the CTx from the external configuration memory ECR but obtains it directly from CTx. This results in a cache structure over several levels. The data transmission overhead in the CT tree, in particular the required ECR memory bandwidth, is considerably reduced.

In other words, each CT buffers the KRs of the CT below it. This means that the lower level CTs obtain the required KRs directly from those above them, and no memory access to the external ECR is necessary. Only if a required KR is not available in one of the higher level CTs must the KR be loaded by accessing the ECR. This results in a particularly efficient hierarchical cache structure for KRs.

This structure also results in delete strategy options which however should be determined empirically, depending on the application. These options include:

deleting the oldest entries deleting the smallest entries deleting the largest entries deleting the entries retrieved least often.

Basic Principles of the Ct Hierarchies

In order to achieve a cache effect, CTs are connected together to form a hierarchical tree structure. A bus system (inter-CT bus) connecting an upper node (CT) to a plurality of lower nodes (CTs) is located between the individual nodes (CTs). Lower nodes (CTs) request data from the upper nodes (CTs); the upper nodes then send data to the lower nodes. The lower nodes exchange status information using the networks between the higher nodes which therefore must resolve the addresses.

Ct Hierarchies and Addressing

CT hierarchies are arranged so that a binary tree can be used for addressing the individual CTs. This means that the least significant address bit identifies the individual leaves of the tree and each additional address bit selects the next higher hierarchical level. Thus, each CT has a unique address.

The following table shows how the individual address bits are assigned to the respective levels:

| 3 | 2 | 1 | 0 |   | Address Width |
|---|---|---|---|---|---------------|
| — | — | — | * | Level 0: Leaves | 1 |
| — | — | * | * | Intermed. Level 1 | 2 |
| — | * | * | * | Intermed. Level 2 | 3 |
| * | * | * | * | Intermed. Level 3 | 4 |
|   |   |   |   | ... |   |

\* = address bits used
— = address bits not used

If a higher level CT is assigned to a group of CTs, multiple address bits of the group are combined accordingly.

The following table shows how the individual address bits are assigned to the respective levels; a group with 8 CTs is located on level 0. (Address bit 2-0):

| 5 | 4 | 3 | 2...0 |  | Address Width |
|---|---|---|---|---|---|
| — | — | — | * | Level 0: Leaves | 3 |
| — | — | * | * | Intermed. Level 1 | 4 |
| — | * | * | * | Intermed. Level 2 | 5 |
| * | * | * | * | Intermed. Level 3 | 6 |
|   |   |   |   | ... |   |

\* = address bits used
— = address bits not used

The binary tree can have an unidimensional or multidimensional structure by having one binary tree for each dimension.

A certain CT (TARGET) is addressed in that the initiating CT (INITIATOR) either provides the exact target address or uses the relative TARGET address.

The evaluation of a relative address is described in more detail below.

Example of a relative address field for a two-dimensional addressing:

| 15 | 14 | 13 | 12 | 11 | 10 | 9 | 8 | 7 | 6 | 5 | 4 | 3 | 2 | 1 | 0 |
|---|---|---|---|---|---|---|---|---|---|---|---|---|---|---|---|
| Higher CT | Broadcast | ± Y Address ||||||| ± X- Address |||||||

Bit 15 is set when the CT of the next higher hierarchical level is to be selected.

Bit 14 identifies broadcasts, i.e., selects all CTs.

The X/Y addresses provide the address of the TARGET based on the address of the INITIATOR.

The addresses are "signed" (plus or minus) integers. The TARGET is determined by adding the Y/X addresses of the address field to the current address position. Each level has a certain address width. The adders correspond to this width.

Overrun or underrun during addition means that the addressed CT is not below the current node and the address request is forwarded to the CT above it (the next higher node).

If no overrun or underrun occurs, TARGET is below the current node. The address bit calculated on the current level (see tables) selects the CT located directly below the current node. The next lower CT (node) is selected from this CT using the correspondingly calculated address bit.

Prioritizing Access in Ct Hierarchies

Access to the inter-CT bus is managed by an arbiter. All lower nodes have the same priority. The upper node has a higher priority. Therefore, an access transmitted from a higher node downward or one that has already covered a long distance from the INITIATOR is prioritized over other accesses.

Basic Structure of a CT

The following description of the CT provides an overview of the individual components. The detailed description of the main groups is given below.

The core of a CT is the control state machine (CTS) which controls all configuration routine (KR) processing. The garbage collector (GC) which controls the removal of KR from the memory (CTR) of the CT; the FILMO which assumes the management of the KWs still to be processed, and the LOAD state machine which controls the loading of KRs are assigned to the CTs.

The memory (CTR) is designed as a conventional read-write memory where all technically possible implementations may be used, and is used for local storage of KRs for the respective CT and the CTs subordinate to it. As a special case, the memory (CTR) can also be designed as a ROM, EPROM, EEPROM, flash ROM, or the like, in order to provide the module with a fixed, ASIC or PLD-type (see Background information) function.

In order to generate the CTR addresses, four pointers configured as loadable counters are used:
1. Free Pointer (FP). Points to the first free memory location after the last KR in the CTR.
2. Garbage Pointer (GP). Points to an entry to be removed by the garbage collector (GC) from the CTR.
3. Move Pointer (MP). Points to the memory location in the CTR from which a valid configuration word (KW), not to be removed, i.e., an entry of a KR, is to be copied/moved to the entry defined by the GP.
4. Program Pointer (PP). Points to the KW currently being executed by the CTS.

KWs are forwarded to the respective CELs via an output interface (OUT). The CELs acknowledge (ACCEPT) the receipt of the KW, provided they are in a reconfigurable state. If a KW is not acknowledged (REJECT) it is temporarily buffered in a FIFO-like memory (FILMO) to be written again to the addressed CEL at a later time without using the program pointer.

The CTS receives, via trigger signals, a request to process a KR. The trigger signals pass through a mask, i.e. a filter, which filters out (masks out) undesirable triggers. A mask can be designed according to the related art using an AND gate, which links a trigger with an AND enable signal. The triggers are converted into binary signals via a prioritized round-robin arbiter (SCRR-ARB). A prioritized round-robin arbiter combines the advantage of the democratic character of a round-robin arbiter with the recognition of the next enable in a cycle, i.e., the advantage of a priority arbiter.

The masked triggers are switched as an address to a first lookup table (LUT1), i.e., a memory that assigns the ID of the respective KR to the trigger incoming as an address and outputs it over the data lines.

In a second lookup table (LUT2) the ID of the KR is assigned to the address of the memory location of the KR in the CTR. The second lookup table is used not only for assigning trigger signals, but commands using an ID as a parameter also use the LUT2 for address assignment.

The assignment of the trigger signals to the respective IDs is entered into LUT2 via the "REFERENCE" command to be described later. LUT2 is managed, i.e., the IDs are assigned to the addresses in CTR, automatically by the CTS and the GC.

To better understand the CT, a possible basic set of commands is illustrated below:

1. BEGIN <ID>

BEGIN <ID> denotes the start of a configuration routine. <ID> provides the unique identification number of the configuration routine.

2. STOP

STOP denotes the end of a configuration routine. At this point the configuration table (CT) terminates the processing of the configuration routine. The garbage collector (GC) terminates the removal of entries of this configuration routine.

3. EXECUTE <ID>

Jumps to the start (BEGIN <ID>) of a configuration routine. If this routine is not present in the CT memory, it is requested from the next higher CT, or loaded from the memory.

4. LOAD <ID>

Requests the KR <ID> from the next higher CT.

5. REMOVE <ID>

Calls the GC in order to remove the configuration routine <ID> from BEGIN <ID> to STOP from the CT memory and pre-write the subsequent configuration routines to the point where no memory hole is created by the removed configuration routine.

6. PUSH <FORCED> <ADDRESS> <DATA> <EXIT>

Writes the configuration data <DATA> to the <ADDRESS> register. If <FORCED> is set, data is written even if the RECONFIG flag of the respective target register is not set. <EXIT> is used to indicate a KWR which interrupts further execution of the subsequent KWRs in the event of a REJECT.

7. MASK <SR> <TRIGGER>

Sets or resets the trigger mask using <TRIGGER> as a function of <SR> (Set/Reset).

8. WAIT <UNMASKED> <TRIGGER>

Stops the processing of the configuration routine and waits for <TRIGGER>. If <UNMASKED> is set, there is a response to the expected trigger regardless of the state of the trigger mask.

9. TRIGGER <TRIGGER> <CT#>

Sends the binary value of a trigger to the higher level CT addressed by CT#.

10. GETBUS/GETCTS

Establishes a connection to the inter-CT bus.

11. LOOSEBUS/LOOSECTS

Terminates the connection to the inter-CT bus.

12. REFERENCE <TRIGGER> <ID>

Writes the value <ID> into the LUT2 at the address <TRIGGER>, whereby a certain configuration routine (KR) is assigned to a trigger signal.

The commands EXECUTE, LOAD, REMOVE, PUSH, MASK, WAIT, TRIGGER, REFERENCE are only valid within the BEGIN—STOP brackets. The commands are not executed outside these brackets.

A configuration routine (KR) has the following structure:
BEGIN <ID>;
. . .
valid commands
. . .
STOP;

Indirect Addressing (Referencing)

The cache principle of the CT allows a KR to be buffered in a CT, the KR being used by a plurality of different lower-level CTs or CELs.

If the lower-level units access the external interface of the module (e.g., RAM, periphery), it becomes necessary to store different addresses or parts of the external interface. This would make the contents of the required individual KRs fundamentally different. Caching is no longer possible.

Indirect referencing provides a remedy. For this purpose, special KR (hereinafter referred to as IKR) are used, which contain and set the required external parameters. Other different KRs may be called up via triggers on different hierarchical levels. The actual KR is called up starting at the end of an IKR. The IKR are not cachable, however, while the KR called up are all uniform and are therefore cachable. It is advisable that the size of the IKR be reduced to the absolute minimum, i.e., only the external and different parameters and the call up of the uniform KRs.

An indirect configuration routine (IKR) is structured as follows:
BEGIN <ID>;
. . .
xxx; valid commands where only external peripherals are to be activated,
TRIGGER <ID>; start, stop, or load requests to peripheral processes
. . .
GOTO <ID> Jump to uniform KRs
STOP;

Special Cases:

1. WAIT_FOR_BOOT

This command is only valid at the first address of the CTR. During the boot sequence, the complete boot KR is initially written into the CTR, but not the start sequence of the boot KR BEGIN <0>. In its place (at address 1) is WAIT_FOR_BOOT which is set automatically after a RESET. WAIT_FOR_BOOT is not overwritten with BEGIN <0> and the CTS does not begin processing the boot KR until the entire boot KR has been written to the CTR.

WAIT_FOR_BOOT should not occur within a program.

2. BOOT <CT ID>

BOOT <CT ID> marks the CT in which the following boot KR should be written. No BEGIN follows after BOOT <CT ID>, the boot KR is not terminated by STOP, but by a subsequent BOOT <CT ID>. A STOP ends the boot sequence.

BOOT <CT ID> should not occur within a program.

Boot Sequence

After a RESET, the CT of the uppermost hierarchical level (ROOT CT) loads the boot KR into the CTs of the lower hierarchies. For this purpose, there is a jump to a fixed address (BOOT ADR) in the external configuration memory (ECR) assigned to the ROOT CT. The ROOT CT executes this jump and arrives at the boot sequence. This is structured as follows:
BOOT <CT ID0>; COMMAND; COMMAND; . . .
BOOT <CT ID1>; COMMAND; COMMAND; . . .
BOOT <CT IDn>; COMMAND; COMMAND . . .
STOP;

During the boot sequence the complete boot KR is initially written into the CTR starting at address 2 of the CT defined by <CT ID>. The start sequence of the boot KR (BEGIN <0>) is not written to address 1. In its place is WAIT_FOR_BOOT which is automatically set after a RESET. STOP is not written to the end of the boot KR in the CTR, overwriting WAIT_FOR_BOOT with BEGIN <0> until the entire boot KR has been written into the CTR and the ROOT CT has reached the next BOOT <CT ID>. The CTS starts processing the boot KR.

Loading a Configuration Routine

There are three basic mechanisms for requesting a configuration routine in addition to the boot KR:

1. Execution of a LOAD <ID> by the CTS
2. Execution of an EXECUTE <ID> by the CTS, the KR with the respective ID not being available in the CTR.

3. Occurrence of a trigger which is translated into an <ID> whose respective KR is not available in CTR, via LUT1.

The sequence is the same in all three cases:

The ID of the requested KR is provided as an address to LUT2. LUT2 checks whether a valid address exists in CTR. If it does not exist, i.e., <ID> points to the value 0 in LUT2, load <ID> is sent to the CTS.

Subsequently CTS requests the <ID> of the respective KR from the hierarchically higher-level CT. This request reaches the higher-order CT in the form of a trigger and is evaluated by it accordingly.

The higher-order CT transmits the requested KR to the requesting CT. The data is written, starting at the address to which FREE-POINTER (FP) points, into the CTR, the FP being incremented by one after each write access.

When FP reaches the upper limit of the CTR, the garbage collector (GC) is called up to remove the lowermost KR within the CTR and to compress the CTR. The FP is reset. This sequence continues until the KR to be loaded fits completely into the CTR.

Jump Table in the Configuration Memory

The configuration memory assigned to ROOT CT contains all the KR that must be loaded for an application. In the external configuration memory (ECR) there is a jump to the boot configuration routine at a fixed address (ADR BOOT). At another fixed address range (LUT ECR) of any desired length which is, however, predefined within an application there are jumps to the individual KRs. The <ID> of each KR is used as an address in ECR where the start address of the respective KR is located; thus KRs are addressed indirectly:

ID→LUT ECR→KR

Modifying the Kr in the Configuration Memory

The KR with the ID <A> is to be modified. The HOST initially writes the new KR for the ID <A> to a free memory location in the ECR. The ID <A>, together with the new address of the KR, is written in the configuration memory from the higher-level unit (HOST) into a ROOT CT register provided for that purpose. The ROOT CT sends the command REMOVE <A> to all CTs below it. Subsequently, when a STOP is reached or during IDLE cycles, i.e., as long as no KR is being executed, all CTs remove the KRs related to this ID from the CTR and set LUT2 at address <A> to "NoAdr," which means there are no valid address entries for ID <A> in LUT2. If the ID <A> is requested again, the missing entry ("NoAdr") at the location <A> in LUT2 forces each CT to request the KR <A> from the ECR again.

The FILMO

A KR is composed basically of the command PUSH, which writes new configuration words to a certain address. If a configuration word of the type KW cannot be written because the configurable element (CEL) addressed is not ready to receive a new configuration (REJECT), the configuration word is written into a memory hereinafter referred to as FILMO instead of to the configurable element (CEL) addressed. The subsequent commands are processed normally until a configuration word cannot be written again; it is then written into the FILMO.

If a configuration word of the type KWR cannot be written because the configurable element (CEL) addressed is not ready to receive a new configuration (REJECT), the configuration word is written into a memory hereinafter referred to as FILMO instead of to the configurable element (CEL) addressed. All subsequent commands to the end of the KR are written directly into the FILMO, rather than to the CEL.

The entire FILMO is run through in IDLE cycles and before each execution of a new KR. Each word of the FILMO that is read out, beginning with the oldest data word is to be sent to its addressed element according to the known FIFO principle; the addressed element must be ready to receive the configuration word. If the data words can be written from the beginning (i.e., the addressed configurable elements (CELs) are ready), the entry is removed from the FILMO by the FIFO principle. If a configuration word cannot be written, it is skipped and is not removed from the FILMO. Contrary to FIFO, the data after the skipped configuration word continue to be read. The configuration words written after a skipped configuration word can, depending on the implementation of the FILMO, be 1. marked as written and not deleted from FILMO; configuration words marked as written are no longer read during subsequent runs or are immediately deleted if a skipped configuration word is no longer located in front of them; or 2. deleted from the FILMO; the configuration words before and after the deleted configuration word are preserved. The subsequent words must be shifted forward (up) or the previous words must be shifted backward (down) for deletion, the order of the configuration words being preserved in all cases.

If a new KR is executed, the configuration words (KW) which could not be written by the CTS to the addressed elements (CELs) are appended again to FILMO, i.e. the KW are written to the end (in the reading direction) of the FILMO. If the FILMO is full, i.e., there are no free entries for configuration words, the execution of the KR is stopped. The FILMO is run through until a sufficient number of configuration words could be written and a corresponding number of free entries have been created, whereupon the KR continues to be processed.

The FILMO is a FIFO-like memory which is always run through linearly starting from the oldest entry; contrary to a FIFO, however, entries are skipped (First In Linear Multiple Out).

Function of the Configuration Table State Machine (Cts)

The configuration table state machine (CTS) is responsible for controlling the CT. It executes the commands of the KR and responds to incoming triggers. It manages the FILMO by reading the FILMO during IDLE cycles and before executing a KR.

It responds to the signals illegal <TRG> (Illegal Trigger, see FIG. 1, 0102) and load <ID> generated by the LUT structure load <ID> is generated when a cache miss exists in LUT2 (0105) or the KR/IKR referenced by ID has been marked as deleted (0107). It responds to the control signals of the higher level CT.

An example of implementation for processing the commands is illustrated in FIGS. 2 through 7.

Control Signals to Higher Level Cts illegal <TRG> (0102)

shows to the higher level CT that an unknown trigger <TRG> has occurred.

load <ID> (0105/0107)

requests the higher level CT to load the <ID>.

trigger <TRG> <CT#> (0108)

sends a trigger <TRG> to the higher level or to the addressed CT <CT#>.

Control Signals from Higher Level CTs remove <ID> (see FIG. 15, 1513)

requests the CT to delete the <ID>.

write_to_FP <data> (see FIG. 2, 0205)

sends the data to the CT. The data is appended to the end of the data in the memory.

Function of the Garbage Collector (Gc)

The CTR has two problems:
1. If a LOAD or EXECUTE command or a trigger refers to an ID whose KR is not present in the CTR, the KR must be re-loaded. Sometimes however there is not enough space available in the CTR to load the requested KR.
2. If a REMOVE <ID> occurs, the respective KR must be removed from the CTR. This creates a gap unless the KR is located at the end of the CTR. When a new KR is loaded, the gap may not be completely filled again or the gap may be too small for the new KR. This results in fragmenting of the CTR. The function of the garbage collector is to remove KR from the CTR in order to create space for new entries AND to reorganize the CTR after the removal of entries so that all remaining KR are located in succession in the memory as a contiguous block and the freed memory blocks are located at the end of the CTR as a contiguous block.

Thus new KR can be re-loaded in an optimum manner and without loss of memory space.

Evaluating Trigger Pulses

Each CT has a link to a plurality of trigger signals belonging to its respective hierarchical level, which are combined to form a bus. Incoming triggers are evaluated via a mask, i.e. only the enabled trigger signals are forwarded. The enabled trigger signals are buffered in a sample register synchronously with the system clock (sampled). An arbiter selects one of the stored trigger signals and converts the signal into a binary vector. The selected trigger signal is deleted from the sample register. The binary vector is forwarded to a first lookup table (LUT1) which translates the binary vector into the identification number (ID) of the configuration routine (KR) to be called up. The ID is translated into the address of the KR in the CT memory (CTR) in a second lookup table (LUT2). The CT state machine (CTS) sets its program pointer (PP) to this address and begins the execution of the KR. The prerequisite is that each trigger enabled via the mask has a corresponding entry in LUT1. Otherwise an error condition is forwarded to the CTS (illegal trigger); each ID="NoAdr" is evaluated as a non-existing entry. "NoAdr" is a token selected depending on the implementation.

If there is no entry in LUT2, i.e., the KR of the respective ID is not in the CTR, a load request is sent to the CTS (load <ID>).

Sending Trigger Pulses to the Higher Level CT

In addition to the interface described above to a higher level CT for loading KR, there is an additional interface for exchanging freely definable commands, in particular, however, trigger vectors. A CT sends either a command to all the other CTs (BROADCAST)

or a command to any addressed CT (ADDRESSED).

The "Triggervector" command represents a binary value that refers to an entry in the LUT2 of the receiving CT.

It is necessary to send trigger vectors in order to start a KR within an IKR in an additional CT, in order to activate the periphery or the memory, for example.

In order to forward trigger vectors to a higher level CT, there are two mechanisms:
1. A bit indicating whether the content of the memory is regarded as a KR ID or as a binary value for a trigger pulse is supplied to LUT1. If a trigger pulse is present, the data content of LUT1 is sent directly to the higher level CT as a trigger.
2. The binary value of a trigger can be indicated with the TRIGGER command which is sent directly to the higher level CT. (As an alternative, IDs can also be transmitted directly instead of a trigger value).

In order to start a KR in another CT via trigger vectors, a synchronization procedure must be created in order to prevent a deadlock. The procedure must make sure that only one KR within a certain group of CTs starts other KRs in other CTs within this group. Starting several KRs at the same time may result in a deadlock among the CTs, similar to the deadlock on the CEL level described above.

In principle such a procedure runs as follows:

A KR is structured as follows:

. . .

GETCTS/GETBUS

TRIGGER <ID>, <CT#>

TRIGGER <ID>, <CT#>

. . .

LOOSECTS/LOOSEBUS

. . .

The "GETCTS" command within a KR of the CT (INITIATOR) indicates that signals are sent to other CTs (TARGET) in the following. With Trigger <ID>, <CT#> the ID of a KR to be started is sent to the CT having the unique ID CT#. The trigger is initially sent to the directly higher level CT, which sends the trigger according to the CT# to a lower level CT within its CT space or to its higher level CT (see CT hierarchies). When the command reaches the TARGET, the latter acknowledges receipt.

When the command runs through a CT, a priority ID of the command is incremented by one. If the forward request of a command encounters another request within a CT, the command having the lowest priority is rejected. Thus a) it is ensured that only one command propagates at any one time within an overlapping system and thus only one KR is started, which prevents deadlock as required; b) it is ensured that the command that has propagated least far is rejected, which may result in enhanced performance.

After a command has been rejected, all previous commands within the GETCTS/LOOSECTS are also rejected, i.e., INITIATOR sends the DISMISS signal to all TARGETs and the execution of the KR starts again after a wait time upon GETCTS.

The acknowledgments of all triggers within a GETCTS—LOOSECTS command segment are sent to the INITIATOR CT. Processing of the next command continues with each incoming acknowledgment.

When the LOOSECTS command is reached, INITIATOR sends the GO signal to all TARGETS. This starts the execution of the KR having the ID transmitted by the trigger by the TARGET CTs.

After the occurrence of a trigger, TARGETs change to a state in which they wait for the occurrence of a GO or DISMISS signal.

For better implementability, a slightly modified procedure is also presented:

A bus system (inter-CT bus) is located between the CTs in a group of a hierarchical level. This bus system connects all CTs of the group and a CT of the next higher level group.

The bus system is arbitrated by a CT through the GETBUS command which is functionally similar to GETCTS. The commands are forwarded via the bus system to the CTs of the same group. If the addressed CT# is not within the group, the higher level bus is automatically arbitrated by the higher level CT and the command is forwarded. The arbitrated buses remain assigned to INITIATOR and thus blocked for all other CTs until either a reject occurs or the LOOSEBUS command frees the bus. LOOSEBUS is comparable to LOOSECTS. Before executing the LOOSEBUS command, the GO signal is sent to all involved CTs. This is accomplished either through the LOOSEBUS command or through a special command that precedes it. Commands, in particular triggers, are also processed according to the basic procedure described above. A reject occurs if a bus system cannot be arbitrated. The CTs of a certain level have the same priority for arbitration; the higher level CT has a higher priority. When a command is sent via the inter-CT bus, the command remains active until the addressed CT accepts (ACCEPT) or rejects (REJECT) the command.

The Prioritized Round-robin Arbiter

The prioritized round-robin arbiter (single-cycle round-robin arbiter SCRR-ARB) has a clock synchronous structure, i.e. for each (positive or negative depending on the implementation) cycle flank (TF1) it delivers a result. The incoming signals (ARB-IN) pass through a mask (ARB-MASK) which is managed by the arbiter itself by the procedure described below. The output signals of the mask are supplied to a priority arbiter (ARB-PRIO) according to the related art. The arbiter delivers a result (ARB-OUT), synchronized with the system clock, for each cycle flank (TF1), i.e., the binary value of the highest-priority signal after the mask (ARB-MASK). A signal (VALID) which indicates whether the binary value is valid or invalid is assigned to the result. Depending on the implementation of the priority arbiter, it is possible that the same binary value is generated when the signal 0 is present and when no signal is present; in this case VALID indicates that the result is invalid if no signal is present. This signal is 1. output as the result of the arbiter and
2. sent to a decoder which decodes the binary values as shown in the following table for a three-bit binary value as an example. (The coding procedure can be adapted to any desired binary value according to this principle):

| Binary Value (ARB OUT) | Decoding (ARB DEC) | Note |
|---|---|---|
| 111 | 0111 1111 | |
| 110 | 0011 1111 | |
| 101 | 0001 1111 | |
| 100 | 0000 1111 | |
| 011 | 0000 0111 | |
| 010 | 0000 0011 | |
| 001 | 0000 0001 | |
| 000 | 1111 1111 | Reset state and when binary value (ARB OUT) invalid |

A register (ARB REG) which receives the decoded values (ARB DEC) of the decoder at a cycle flank (TF2) that is the inverse of TF1 is assigned to the decoder. ARB DEC is fed back to the mask (ARB MASK) and enables the individual input signals (ARB IN).

The functional sequence in the arbiter is as follows:
1. After a RESET, all ARB IN are enabled via ARB MASK, since ARB DEC sets all signals to "enable".
2. The highest priority ARB IN set (for example signal 7 (binary 111) has the highest priority and 0 (binary 000) the lowest priority in the above table) is output as a binary value.
3. Via ARB DEC the signal is blocked, as are all the other inputs that may have had a higher priority, but are not set.
4. The following steps 5 and 6 are repeated until signal 0 (binary 000) is reached or no signal is present after ARB MASK. Then ARB DEC (see decoding table) enables all signals through ARB MASK via ARB DEC again and the sequence starts at step 2.
5. The ARB IN set that now has the highest priority is output as a binary value.
6. Via ARB DEC the signal is blocked, as are all the other inputs that may have had a higher priority but are not set. (Continues with step 4)

Thus it is achieved that all input signals are handled with the same priority and one of the input signals (ARB IN) is decoded as a binary signal and output (ARB OUT) in each clock cycle. ARB REG can be provided with an enable input (EN) which allows the contents of the register to be changed only at TF2, when a corresponding signal is present. The result is that a binary vector is not output in each cycle, but is output instead as a function of an enable by EN and TF2. The input is needed for synchronization when the downstream circuit cannot perform the processing in one clock cycle, but needs multiple cycles before accepting the next binary vector.

Sometimes it is recommended that the arbiter consider a series of signals as having a higher priority, while the majority of signals have the same priority. This is necessary, for example, in the case of the previously described procedure for forwarding signals between CTs. In order to give a signal a higher priority, the link of the ARB PRIO having the highest priority is not masked, i.e., it bypasses the mask (ARB MASK). Thus the signal is treated preferentially.

Structure of a Microcontroller-based CT

Contrary to the previous descriptions, a CT can also be implemented to have a microcontroller architecture.

It can be easily seen that the basic functions such as trigger control, lookup tables LUT1 and LUT2, as well as the inter-CT communication and writing the KW to the CEL can be readily accomplished by a microcontroller. Only the structure of an efficient FILMO represents a problem which is mainly manifested in the performance that can be achieved. Therefore the structure of the FILMO will be described separately.

Structure of the FILMO

The FILMO is not designed as a separate memory. Instead, the conventional program memory is extended to include FILMO functionality. For this purpose, an additional bit (FILMO BIT) which indicates whether or not the corresponding KW has been written into the CEL is assigned to each KW. If the FILMO BIT is set, the corresponding KW is not executed. When a KW is written into the memory, the FILMO BIT is reset. All KRs within a CT are connected via a chaining list (FILMO LIST) in the order in which they were called up by triggers or LOAD <ID>. A KR remains in the FILMO LIST until it is fully executed, after which it is removed from the list. The FILMO LIST is run through according to the FILMO procedure and thus represents a direct substitute for the FILMO memory.

(For the sake of completeness we shall note that contrary to the original FILMO procedure no KR may occur twice in the list. If a KR that is still in the FILMO LIST is called up, its execution must be delayed until it is removed from the FILMO LIST.)

The structure of a FILMO memory location is as follows:

| FILMO BIT | KW |
|---|---|

Commands

The microcontroller supports the following commands that have a direct influence on the FILMO:

| | |
|---|---|
| PUSH | write a KW to a CEL |
| PUSHSF | write a KW to a CEL and set the FILMO BIT if the KW has been accepted (ACCEPT) |
| PUSHRET | write a KW to a CEL and return (RETURN) from the subroutine if the KW has not been accepted by the CEL (REJECT). This command is used when subsequent KW in the KR are dependent on the configuration of this KW (ACCEPT); their configuration is prevented by the return from the KR until PUSHRET is successful (ACCEPT). |
| PUSHNR | write a KW to a CEL only if no REJECT occurred previously within the KR. Like PUSHRET, PUSHNR is also used to handle dependencies in the order in which the KWs are configurated. |

Garbage Collector

As described previously, a garbage collector (GC) is used to remove KRs that are no longer needed. The GC is started either when there is insufficient space in the memory for loading a new KR and IDs must be removed; or when a KR is explicitly deleted by the REMOVE command with the indication of the ID of the KR to be deleted.

In order to configure the GC run as simply as possible, all KRs are connected via a chained list. GC runs through the list and removes the KRs that are no longer needed by overwriting them with other KRs and adjusting the list entries accordingly. All the remaining KR in the memory are shifted so that the memory gap created by the KR to be deleted is closed and a larger contiguous free space is created at the end of the memory.

Structure of a KR

One possible basic structure of a KR is shown in the following table:

```
jmp START;
length
garbage - previous
garbage - next
FILMO - previous
FILMO - NEXT
CACHE - statistics
KR - statistic
START;
...
ret;
```

At the beginning of the KR, a jump occurs over the following header to the start of the command sequences. It follows the double-chained list for the garbage collector in which all KR are linked to one another. "length" indicates the length of the KR. This information can be used for Block-Move commands according to the related art which are used when the KR have to be moved in the memory (Garbage, Load, etc.).

The FILMO is formed in the following double-chained list; only those KRs that contain KWs which have not yet been written to the CEL are connected to one another.

Statistics on the condition of the cache follow, containing, for example, the number of KR calls (the value is incremented by one for each call), the age (can be measured using the number of GC runs over the KR; the value is incremented by one for each GC run), etc. The GC can evaluate these statistics when a KR must be removed for reasons of memory space. Considerable advantages result for the caches from these statistics. Thus, for example, the microcontroller can be programmed depending on the cache algorithm used according to the requirements of the application so that 1. the oldest/newest KR
2. the smallest/largest KR (see the "length" entry)
3. the least often/most often called KR is deleted from the cache when free memory is needed. Of course, additional appropriate status information can be stored. Such a selective caching is not possible with the cache structures known today. In particular, freely programmable cache algorithms are not supported in caches according to the related art.

In conclusion, there are KR statistics containing, for example, the number of not yet configured (REJECT) or configured (ACCEPT) KWs. At the same time, the address of the first KW yet to be configured can be stored. This has the advantage that in the case of a FILMO run a jump can be made directly to the KW and the complete KR does not have to be run through, which results in a considerably enhanced performance.

In conclusion, it should be noted regarding the KR that the chained lists are preferably built up by entering the previous/next ID, since thus the absolute memory addresses can be easily shifted by the GC. Only relative jumps instead of absolute jumps should be used within a KR in order to avoid problems when loading the KR and during GC runs, since the absolute addresses are modified in those cases.

For the sake of completeness it should also be mentioned that, according to the above-described principle, the FILMO is run through prior to executing a new KR (upon a trigger or command even from another CT) and the status of the CEL (reconfigurable or not) is saved prior to running through the FILMO, also when a microcontroller is used.

FIGURES

The figures described below show the management of configuration data according to the method presented, with reference to an example of implementation:

FIG. 1: address generation procedure within the lookup tables

FIGS. 2, 3a, 3b, 3c, 4a, 4b, 5, 6, 7: processing of the commands and function of the state machines.

FIG. 8: Structure of the SCRR-ARB

FIG. 9: Structure of the LUT1 and LUT2

FIG. 10: Structure of the pointer arithmetics and the CTR

FIG. 11: Structure of a FILMO

FIG. 12a: Hierarchical arrangement of the CTs

FIG. 12b: Sending a trigger between the CTs

FIGS. 12c, 12d: Method for sending a trigger vector

FIG. 13: Calling up a KR by multiple IKR

FIG. 14: Structure of the LUT1 of a ROOT CT

FIG. 15: Structure of the HOST control of a ROOT CT

FIG. 16a, 16b: Illustration of the LUT and ECR principle

FIG. 17: Sequence control of a CT of mid-level hierarchy and of a ROOT-CT

FIG. 18: Deadlock problem during the configuration of a two-dimensional array

FIG. 19: Illustration of the FILMO principle

FIG. 20a, 20b, 20c, 20d: Basic principle of the inter-CT communication

FIG. 21: Example of implementation of the inter-CT communication according to the GETCTS method FIG. 22: Example of implementation of the inter-CT communication according to the GETBUS method FIG. 23: Bus structure of the inter-CT bus FIG. 24a, 24b, 24c, 24d: Addressing within CT hierarchies FIG. 25: GARBAGE list FIG. 26: FILMO list FIG. 27: FILMO function within a KR FIG. 28: Storing the states prior to the execution of a KR or the FILMO.

FIG. 29: Circuit for saving status information

A valid ID (0103) is forwarded to LUT2. IDs provided within commands, i.e. through an operand (0104), are sent directly to LUT2. LUT2 translates an incoming ID to the address of the KR/IKR within the CTR. If the KR/IKR is not stored in CTR (there is no cache) the "miss" signal is generated (0105). If the translated address of the KR/IKR is marked with the "NoAdr" token, it is indicated with "NoEntry" (0107) that the address has been deleted. "Miss" and "NoEntry" indicate that translation into an address internal to CTR is not possible. On the basis of this signal the LOAD state machine loads the KR/IKR having the corresponding ID from a higher level CT.

If a valid address is available, it is forwarded to the pointer arithmetics of the address generator (0106). An incoming binary trigger vector is translated in LUT1 either into an ID or into another trigger vector; in this case the trigger vector is output (0108).

Figure 2:
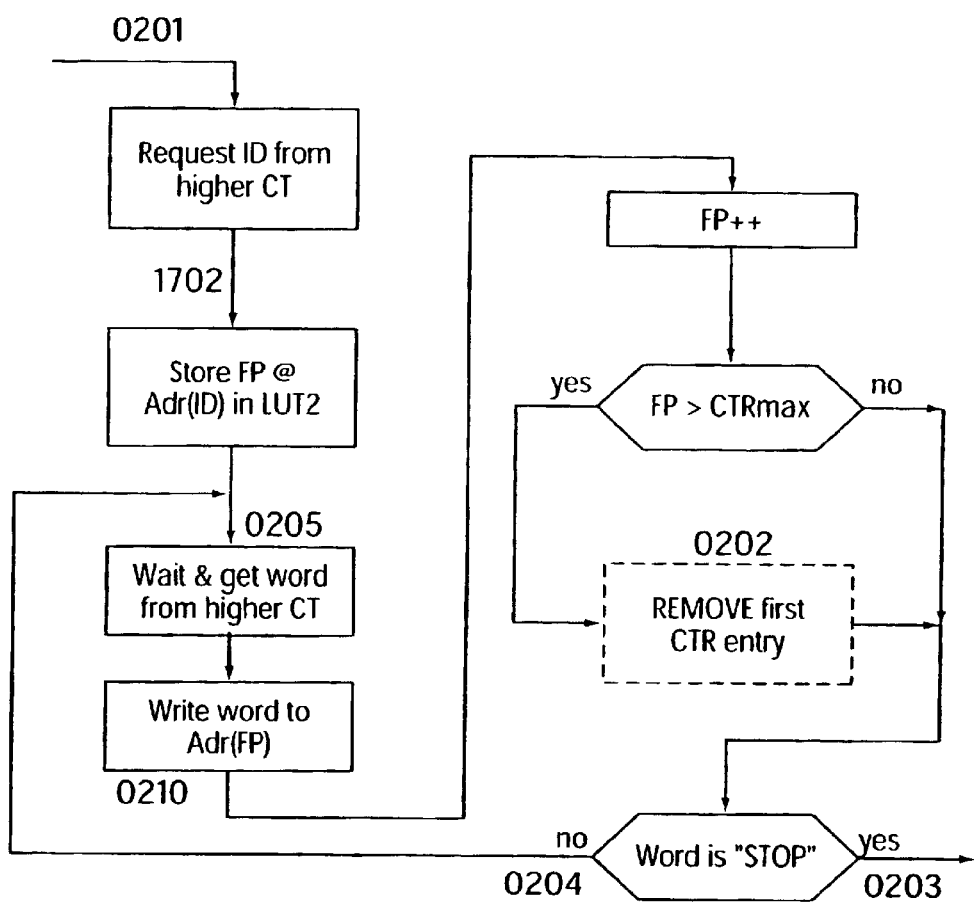

FIG. 2 shows the sequence when loading a KR/IKR. The ID (0201) of the KR/IKR to be loaded is initially sent to the higher level CT. Then the value of FreePointer (FP) is entered in LUT2 at the location of the entry for the requested ID. FP points to the entry after the last entry used for a KR/IKR in the CTR. This is the first entry, on which the KR/IKR to be loaded is stored.

The state machine waits for a data word from the higher level CT. As soon as the word is available, it is written to the location referenced by FP. FP is incremented. If FP points to an entry after the end of the CTR, the first entry in the CTR is removed in order to create room (0202); FP is updated. If the data word sent by the higher level CT is "STOP," the loading procedure is interrupted (0203); otherwise the state machine continues to wait for a new data word (0204).

Figure 3A:

FIG. 3a shows the "MASK" command. The operand of the command is written into the MASK register. The MASK register is located at the input of the trigger signals before LUT1 and masks out invalid triggers.

Figure 3B:
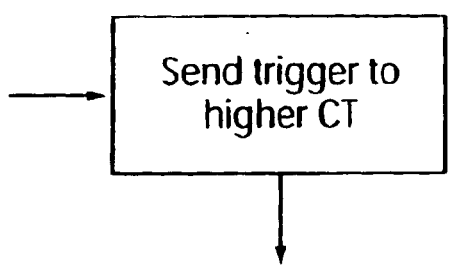

In FIG. 3b, the operand of the command is sent to the other CTs as a trigger vector by the "TRIGGER" command.

Figure 3C:
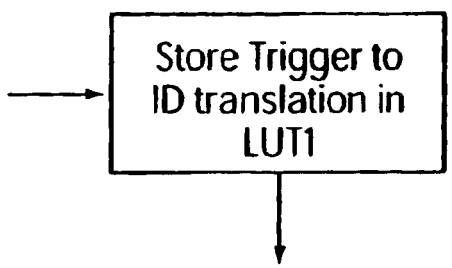

In FIG. 3c, the translation of a trigger into the corresponding KR/IKR ID is written into LUT1 using the "REFERENCE" command.

Figure 4A:
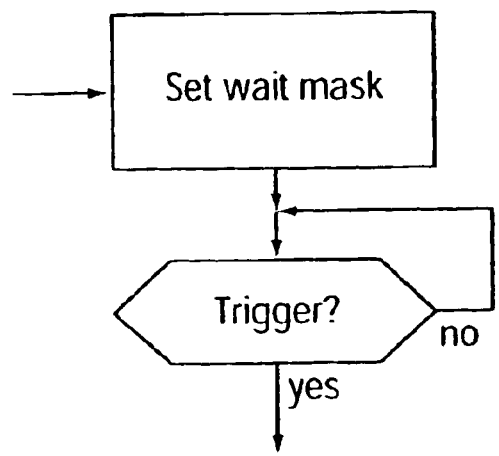

FIG. 4a shows the "WAIT" command. The operand of the command is written into the WAITMASK register. All triggers except for the one/ones expected and therefore enabled in WAITMASK are ignored. Only upon the occurrence of the trigger does the system return to the program flow.

Figure 4B:
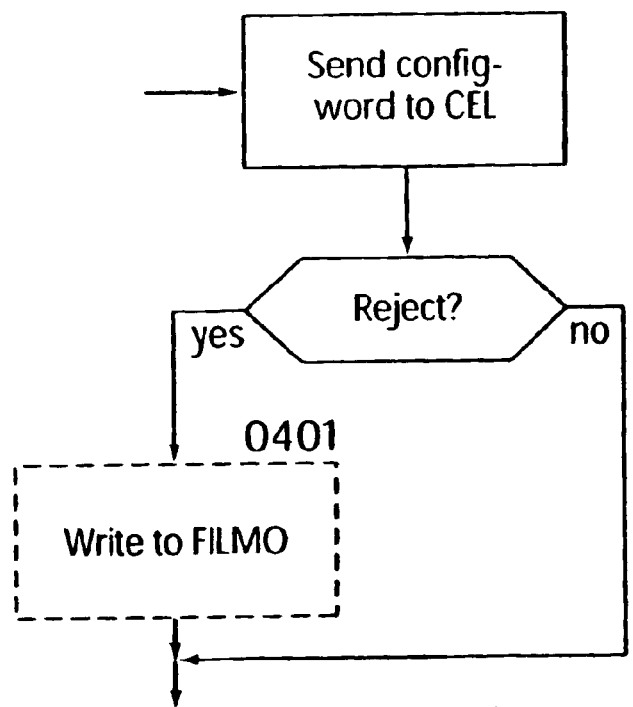

FIG. 4b shows the "PUSH" command. The configuration word is sent to the addressed configurable element (CEL). If the CEL does not accept the configuration word, for example, because the CEL is in the "non-configurable" state, the configuration word is written into the FILMO (0401).

Figure 5:
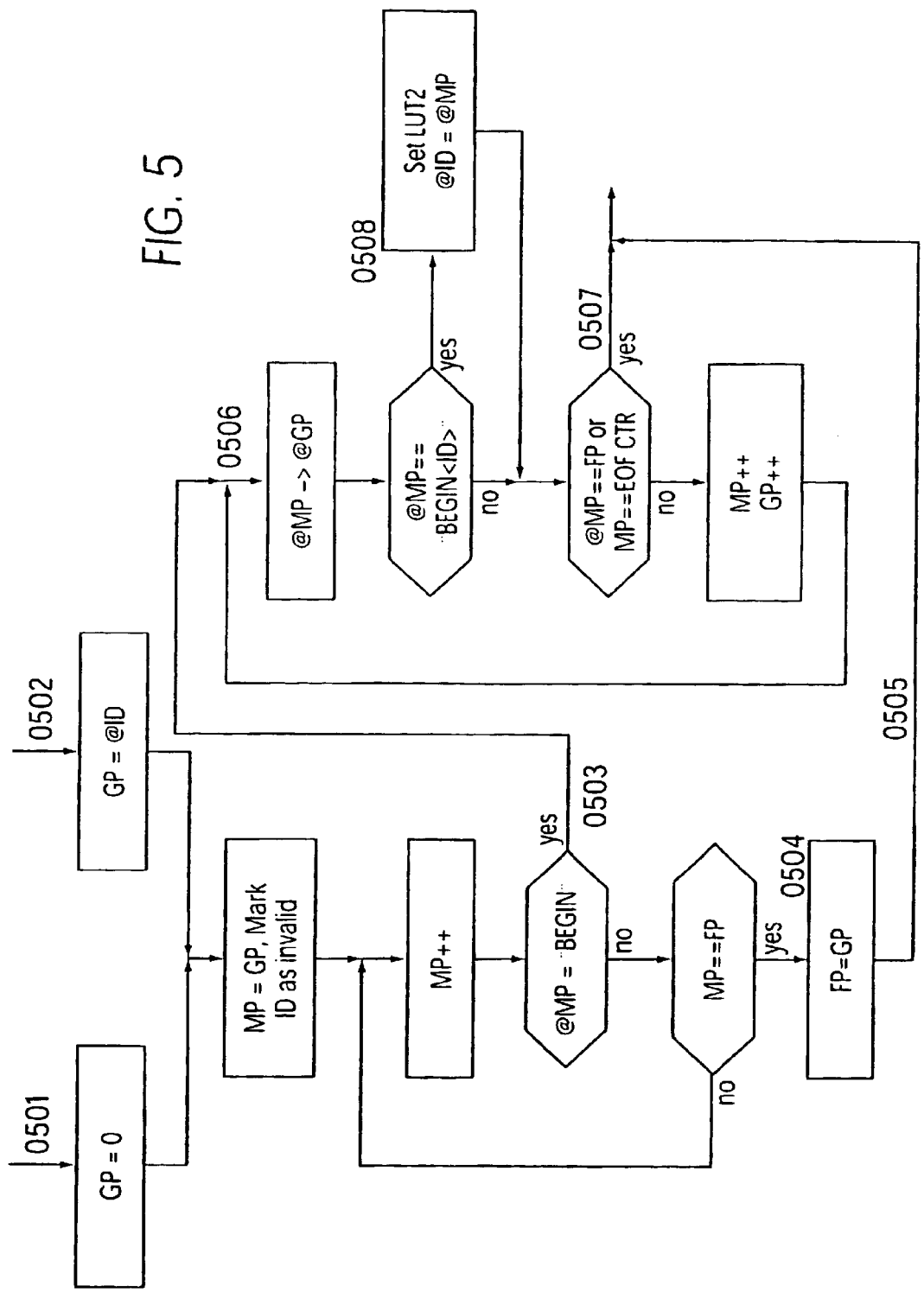

FIG. 5 shows the sequence of a "REMOVE" command. There are two call variants:
1. The first KR/IKR located in the CTR is removed from the CTR. Address 0 of the CTR is assigned to the Garbage-Pointer (GP).
2. A specific KR/IKR defined by its ID is removed from the CTR. The first address of the KR/IKR to be removed from the CTR is assigned to the GarbagePointer (GP) (0502).

The MovePointer is loaded with the value from the GP. GP and MP refers to a "BEGIN <ID>" command in the CTR even if the first KR/IKR is to be removed from the CTR. The relevant ID is marked as invalid in LUT2. MP is incremented until the "BEGIN <ID>" of the next KR/IKR located in the memory is reached (0503), OR MP is equal to FreePointer (FP), which means that the KR/IKR to be removed is the last one in the CTR (0504).

In this case, FP is loaded with the value from GP, whereby the memory locations occupied by the KR/IKR to be deleted are marked as free; the "REMOVE" function is terminated (0505).

Otherwise ("BEGIN <ID>" is reached (0506)) the data referenced by MP is copied to the memory location referenced by GP. MP and GP are incremented. This procedure continues until MP reaches the end of CTR or the position of FP (0507). If during the sequence a memory location containing "BEGIN <ID>" is referenced by MP, the entry for the respective ID is overwritten in LUT2 with MP (0508); thus the correct memory location is output in the case of a lookup.

Figure 6:
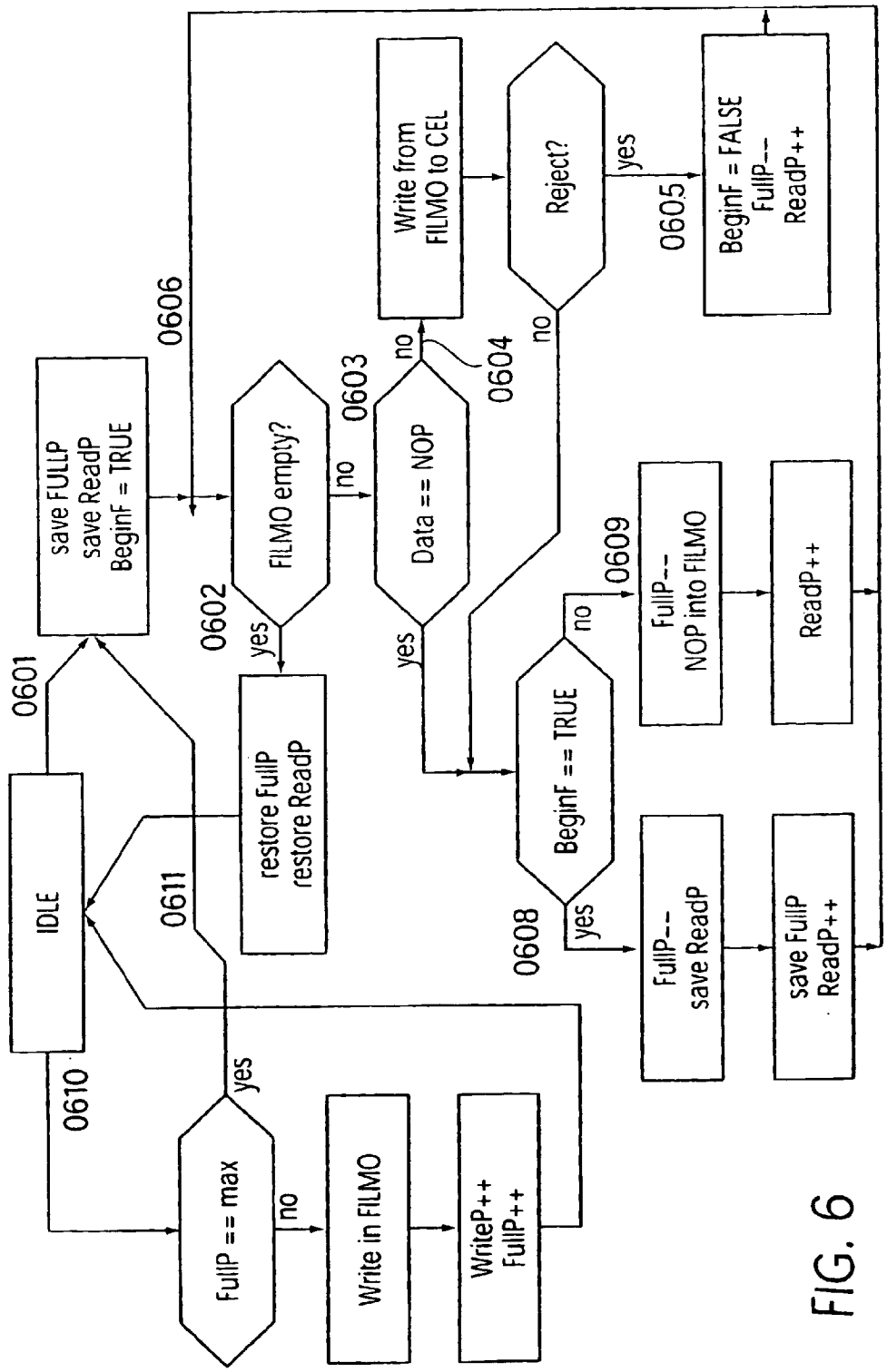

FIG. 6 shows the sequence diagram of the FILMO. A FILMO contains three pointers:
1. WriteP: the write pointer of the FILMO RAM;
2. ReadP: the read pointer of the FILMO RAM;
3. FullP: the status pointer representing the "filling status" of the FILMO RAM that prevents overrun or underrun.

A one-bit register "BeginF" indicates whether the current read access is at the beginning of the FILMO RAM (TRUE), i.e. there are no deleted entries between the read pointer and the beginning of the FILMO RAM; or the read pointer is in the middle of the FILMO RAM (FALSE), i.e. there are entries used between the read pointer and the beginning of the FILMO RAM. Furthermore, there are two registers for storing the states of ReadP and FullP. It is necessary to save both registers upon the occurrence of the first undeleted entry, because a subsequent read access to the location of this entry must be begun with the readout. On the other hand, ReadP and FullP must be modified during the current read sequence in order to obtain the next read addresses, or to establish the end of the FILMO RAM. The beginning and the end of the memory cannot be established using a zero address or a maximum address due to the structure of the FILMO as a FIFO-like structure ("ring memory"). Two sequence paths originate from the base state:
1. Read Path (0601)

FullP and ReadP are saved in the registers. The processing loop begins:

BeginF is TRUE.

If FullP is equal to 0, ReadP and FullP are read back from their registers (0602) and the state machine jumps back to its base state.

Otherwise (0603) it is tested to determine whether the entry in the FILMO to which ReadP is pointing is equal to "NOP," i.e., whether this is an entry marked as deleted in the middle of the FILMO. If this is not the case (0604) it is attempted to write the entry into the configurable element (CEL) If this is not successful (REJECT, 0605), because CEL is not reconfigurable, BeginF is set to FALSE, FullP is decremented, and ReadP is incremented. The state machine jumps to the beginning of the processing loop (0606).

If the write of the entry to CEL (0607) is successful or the entry is an NOP, BeginF is tested: BeginF==TRUE (0608): there are no undeleted entries before this one. FullP is incremented, ReadP is saved in the associated register in order to secure the new beginning of the FILMO. FullP is saved in order to secure the current data set; ReadP is incremented.

BeginF==FALSE (0609): FullP is incremented and the current entry in the FILMO RAM is overwritten with NOP, i.e. the entry is deleted. ReadP is incremented.

In both cases the state machine jumps to the beginning of the processing loop.

2. Write Path (0610)

It is tested whether the FILMO RAM is full by checking FullP for the maximum value. If this is the case (0611), a jump is made to the read path in order to create room.

Otherwise the data word is written into the FILMO RAM and WriteP and FullP are incremented.

Figure 7:
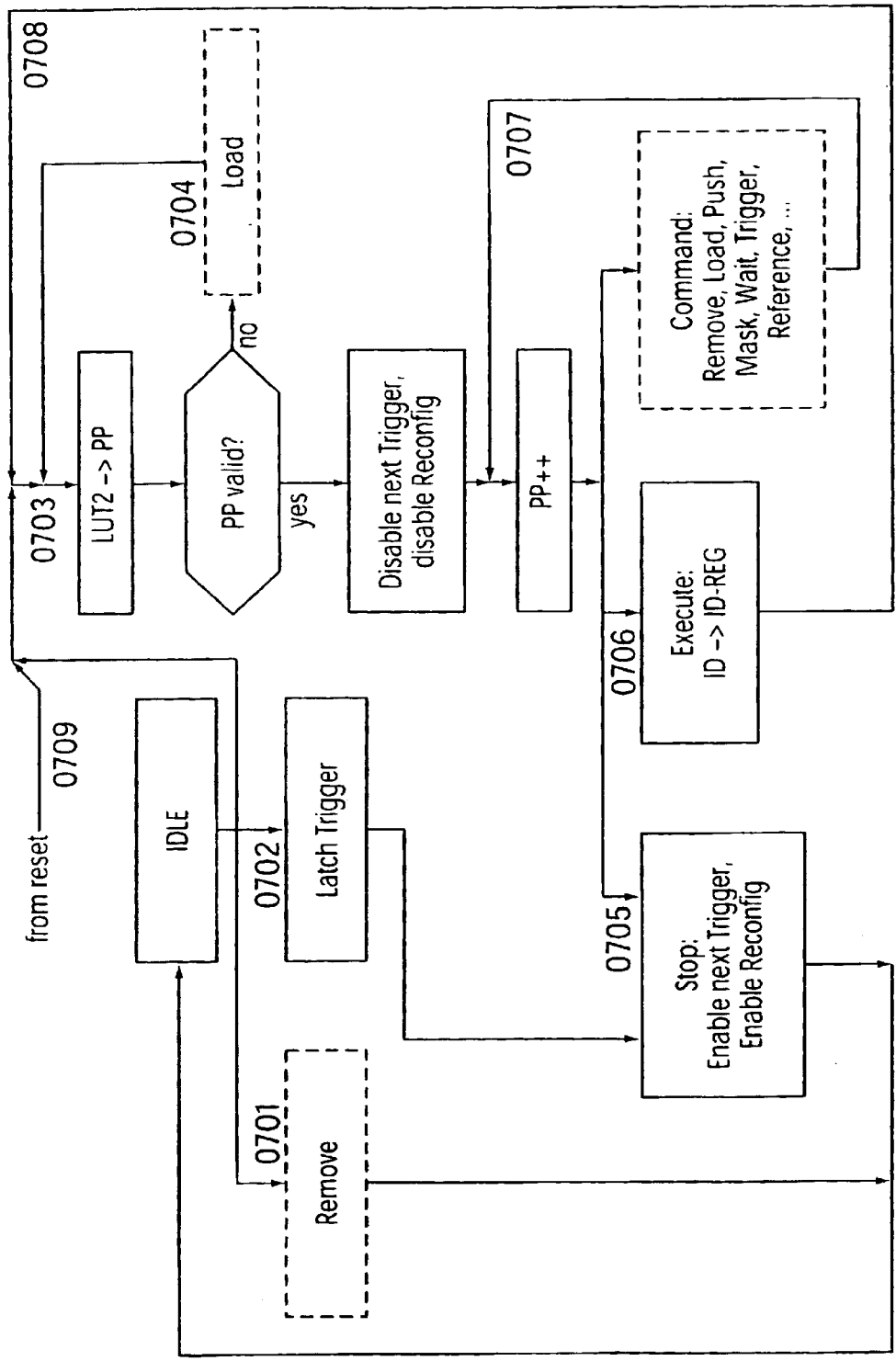

FIG. 7 shows the sequence in the main state machine. The base state (IDLE) is exited as soon as a 1. REMOVE command from the higher level CT occurs (0701): the REMOVE command is executed and the state machine returns to IDLE.
2. A trigger signal for generating a trigger occurs between the CTs (0702):
   The trigger is output.
   The state machine jumps to the "STOP" command and then back to IDLE.
3. A trigger Signal for Executing a KR/IKR <ID> Occurs (0703):
   The ProgramPointer (PP) is loaded with the address generated by LUT2. If the address is invalid, i.e. no entry is available for the KR/IKR to be loaded, it is loaded (0704) and the PP is reset.
   The Execution Loop Begins:
   PP is incremented (this causes the BEGIN <ID> command to be skipped in the first loop pass), the occurrence of additional triggers is suppressed, RECONFIG is blocked. The commands are executed and a jump is made to the beginning of the execution loop (0707).
   The "STOP" command is executed separately (0705). The trigger and RECONFIG are enabled again and the state machine jumps to IDLE.
   The "EXECUTE" command is also executed separately (0706). The ID provided in EXECUTE <ID> is written into the ID REG. PP is reloaded and the KR/IKR provided via ID is executed (0708).
   After resetting the CT, the base configuration is loaded into the CTR and a jump is made directly to the execution of the basic configuration (0709).

Figure 8:
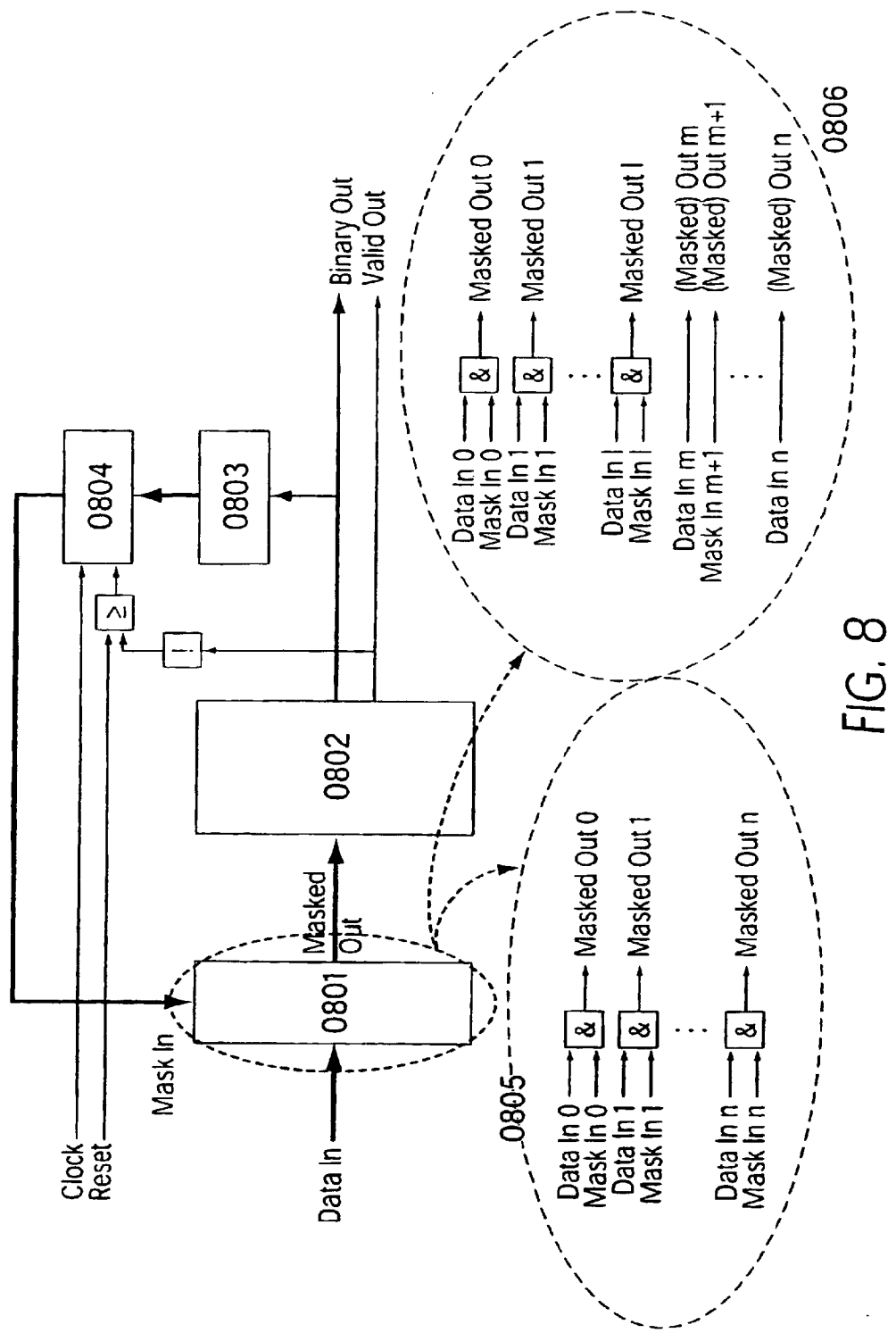

FIG. 8 shows the structure of an SCRR ARB. The signals to be arbitrated go via DataIn to a mask (0801), which lets through or blocks a contiguous part of the signals according to the known table. A conventional priority arbiter (0802) according to the related art arbitrates a signal from those let through and delivers its binary vector (BinaryOut) together with a valid/invalid identifier (ValidOut) (also according to the related art) as an output of the SCRR-ARB.

This signal is decoded according to the known table (0803) and sent to a register for clock synchronization (0804). The DataIn mask is sent via this register. The register is controlled either by a clock signal or by a Next signal (Enable EN) which queries the next valid binary vector. In the case of a reset or if the indication of the ValidOut identifier is invalid, the register is switched so that the DataIn mask lets all signals through.

The structure of the mask is shown in 0805. In 0806 the mask is illustrated again, signals DataIn 0—DataIn 1 having the same priority according to the SCRR principle while DataIn m—DataIn n have a higher priority.

Figure 9:
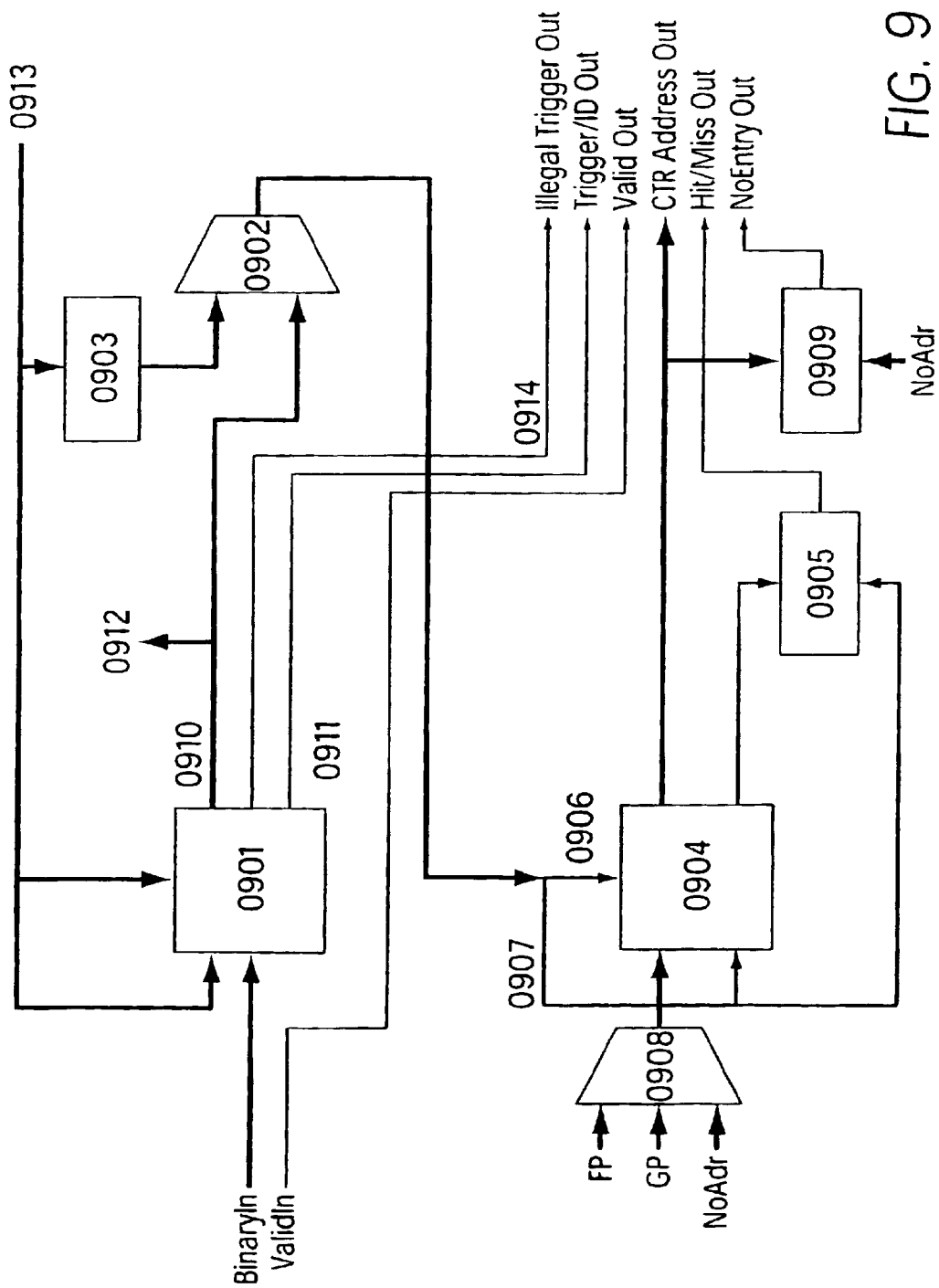

FIG. 9 shows the LUT structure. The binary vector (BinaryIn) of the arbitrated trigger is supplied to the address input of LUT1 (0901). LUT1 translates the binary vector either into a valid trigger in order to forward the latter to another CT or into a valid ID. Both are output via 0910. 0911 shows whether this is a trigger or an ID.

If no translation of the incoming binary vector is entered in LUT1 via the "REFERENCE" command, the "Illegal Trigger" signal 0914 is generated via a bit entry or a comparator upon a certain token (e.g., "VOID").

A trigger is sent to external CTs via 0912; IDS are further processed via the multiplexer (0902). 0902 switches either the data output of LUT1, which provides a valid ID, or the ID register (0903) of the CT to the address input of LUT2 (0904). 0904 has a cache-like structure, i.e. the less significant part (0906) of the data output of 0902 is switched to the address input of 0904, while the more significant part (0907) is switched to the data input of 0904. The data output belonging to 0907 is compared to 0907 by a comparator (0905). The advantage of this procedure is that 0904 does not have to have the depth to translate all IDs, but may be considerably smaller. Like a conventional cache, only some of the IDs are translated, it being possible to establish in the LUT2 with the help of 0907 whether the selected ID corresponds to the one specified by LUT1. This corresponds to a cache/TAG procedure according to the related art.

A multiplexer 0908 is assigned to a second data input of 0904; depending on the operation, this multiplexer provides the FreePointer (FP, LOAD operation), the GarbagePointer (GP, REMOVE operation) or an invalid identifier/token (NoAdr, REMOVE operation) for storage at LUT2. Both pointers refer to memory locations in the CTR; "NoAdr" indicates that no entry exists for the appropriate ID; the entry has been deleted. This is determined at the data output by comparing the data with the "NoAdr" token via comparator 0909. The following is forwarded to the state machine:

the occurrence of a binary vector, via "ValidIn" (see FIG. 8).

the information of whether a trigger or an ID results from the translation in LUT1 (0911, "Trigger/ID Out"). Triggers are forwarded to other CTs via 0912; IDs are processed in their own CTs and forwarded to LUT2.

the result of 0905 indicating whether the corresponding ID is stored in 0904 ("Hit/Miss Out").

the result of 0909 indicating whether the respective ID points to a valid address in the CTR ("NoEntry Out").

The address generated by 0904 is forwarded to the CTR ("CTR Address Out").

LUT1 is loaded via the "REFERENCE" command with the translation of the incoming binary vector to a trigger or an ID. The operands of the command are sent to LUT1 via the 0913 bus. The ID register (0909) is loaded via the same bus.

Figure 10:
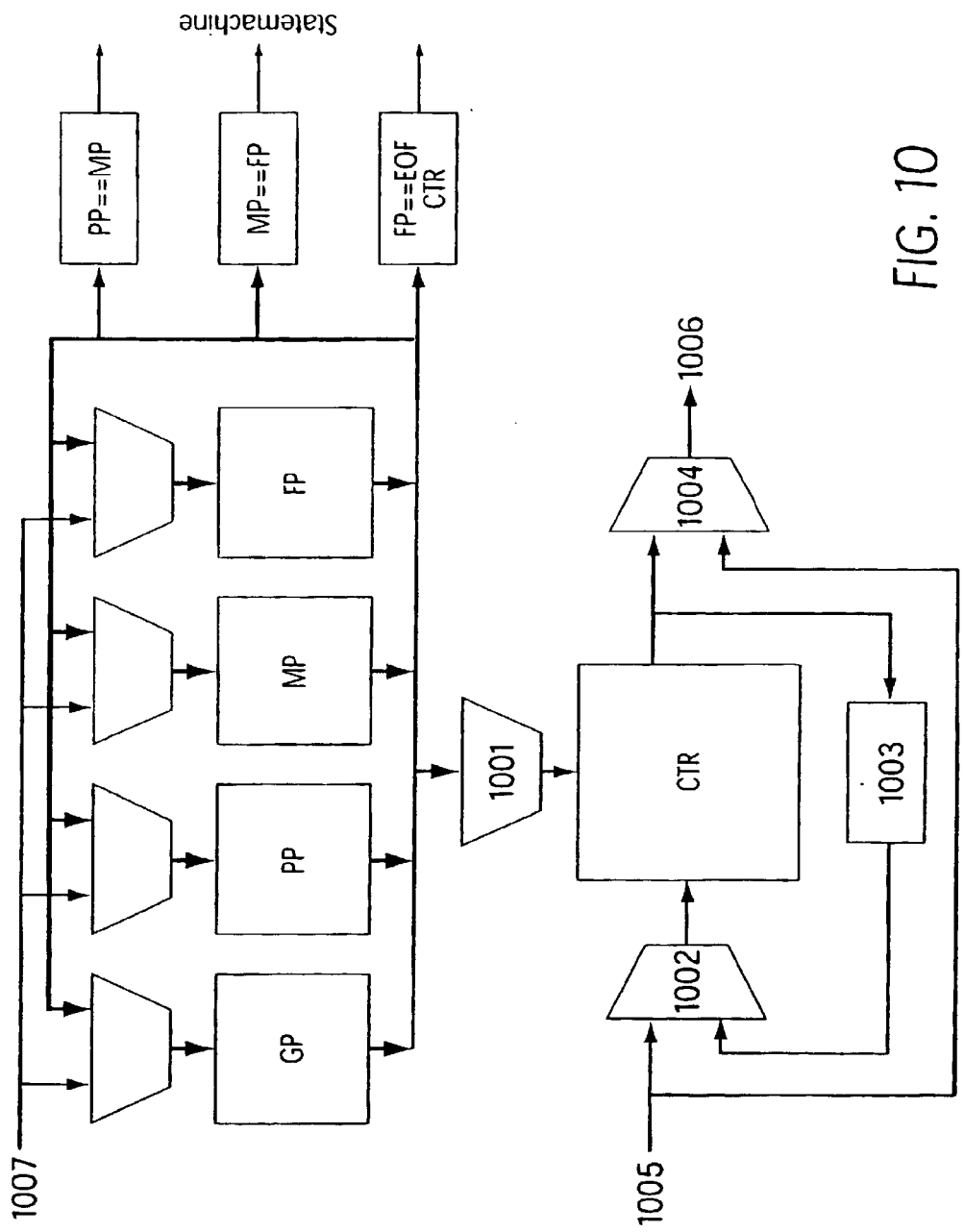

FIG. 10 shows the pointer arithmetics of the GarbagePointer (PG) [sic], ProgramPointer (PP), MovePointer (MP) and FreePointer (FP). Each pointer has a separately activatable loadable up/down counter. Each counter can be loaded with the value of each other counter, if necessary, as well as with the output of LUT2 (1007).

It is determined via the comparator whether
1. PP is equal to MP
2. MP is equal to FP
3. FP is equal to the maximum position in CTR. The results are used for controlling the state machine.

One of the pointers is sent to the CTR address input via a multiplexer (1001). The data arrives at the CTR via a multiplexer (1002) either from the higher level CT (1005) or from a register (1003). The data from the higher level CT or the CTR is forwarded to the state machine and the FILMO (1006) via a multiplexer (1004). If a REMOVE command occurs, the data is sent from the higher level CT directly to the state machine via 1004, while otherwise the commands are sent from the CTR to the state machine. Register 1003 is used for storage and feedback of commands, shifted from one address to another during one pass of the Garbage Collector, to the CTR input.

Figure 11:
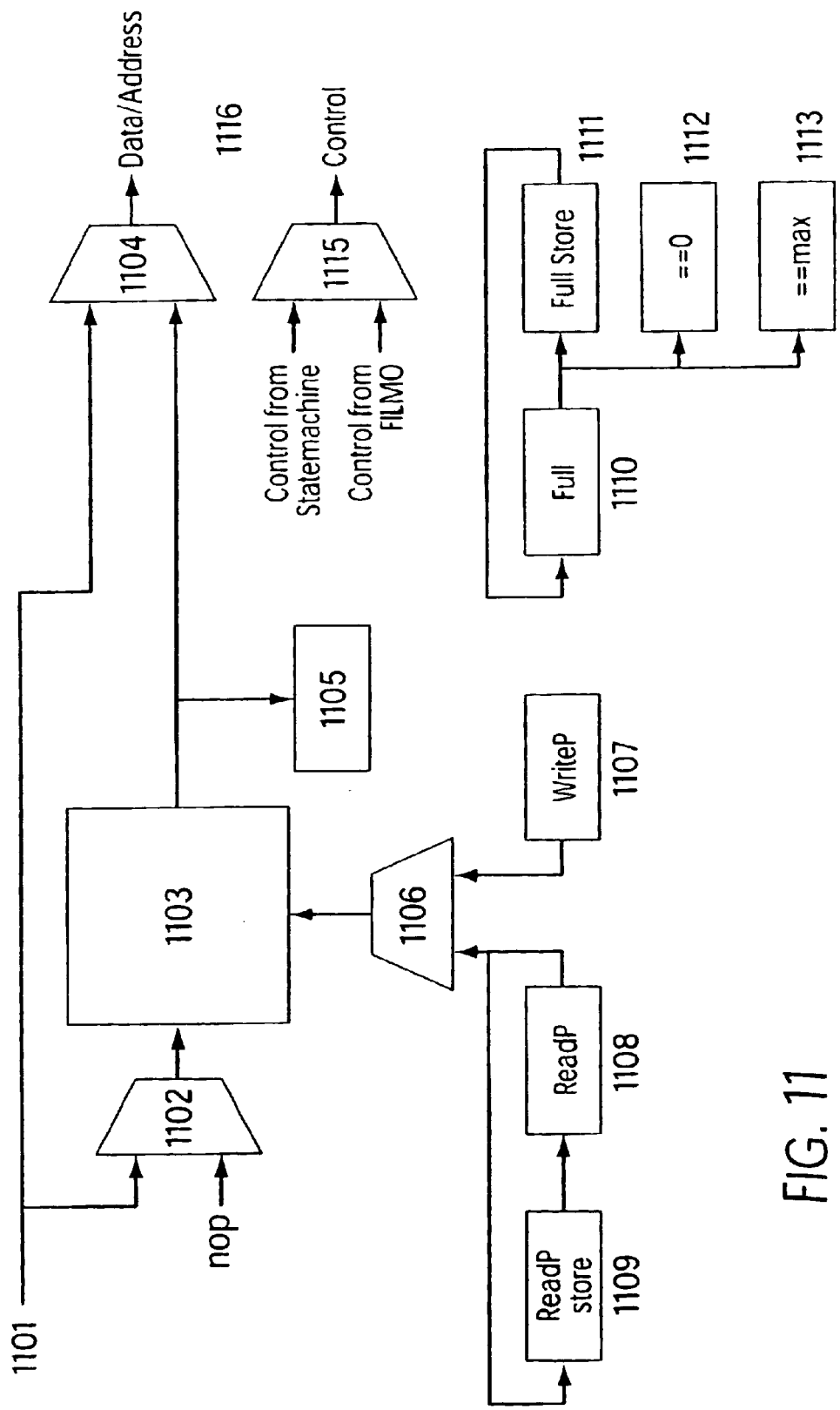

The structure of a FILMO is illustrated in FIG. 11. The data arrives from CTR (1101) in FILMO and it is either written into the FILMO RAM (1103) via the multiplexer (1102) or sent to the configurable elements (1116) via the multiplexer (1104). If data is deleted in 1103, a "NOP" token is written after 1103 via 1102. The "NOP" token is recognized by the comparator (1105) at the data output and a write to the configurable elements is prevented. Either the write pointer WriteP (1107) or the read pointer (1108) is sent to the address input of 1103 via multiplexer 1106. The read pointer is saved in register 1109 in order to a allow a reset (see FIG. 6).

The "Full" fill status counter (1110) of 1103 is stored in register 1111 for resetting according to FIG. 6. Two comparators test whether 1103 is empty (1112) or full (1113). It is selected via multiplexer 1115 whether the control signals of the state machine (from 1101) or of the FILMO are sent to 1116.

FIG. 12*a* shows the hierarchical structure of the CTs. All CTs obtain their data from the ROOT CT (1201) and the ECR assigned to it (1204). One or more CTs exist for each implementation level in a module. Each CT is responsible for managing its level and the lower-level CTs. It is not necessary for all branches of the tree to have the same depth. For example, there may be fewer levels for controlling the periphery (1202) of a module than for controlling the operating units (1203). Data transfer takes place in the form of a tree. Each CT operates as a cache for all the lower-level CTs.

FIG. 12*b* shows the trigger flow between the CTs. While data flow takes place in the form of a tree, the trigger flow is undetermined. Each CT can send a trigger to each other CT. In general, trigger exchange only takes place from the leaves (1203) in the direction of the ROOT CT (1201). Occasionally, however, transfer may also take place in the opposite direction.

Figure 12C:
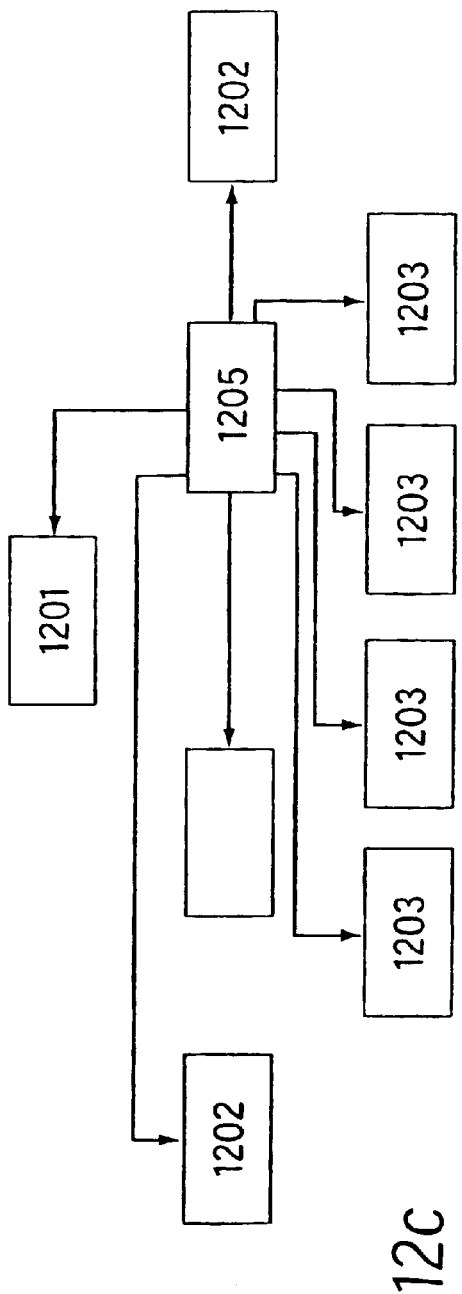

FIG. 12*c* shows a trigger vector broadcast, with 1205 sending a trigger vector to all CTs.

Figure 12D:
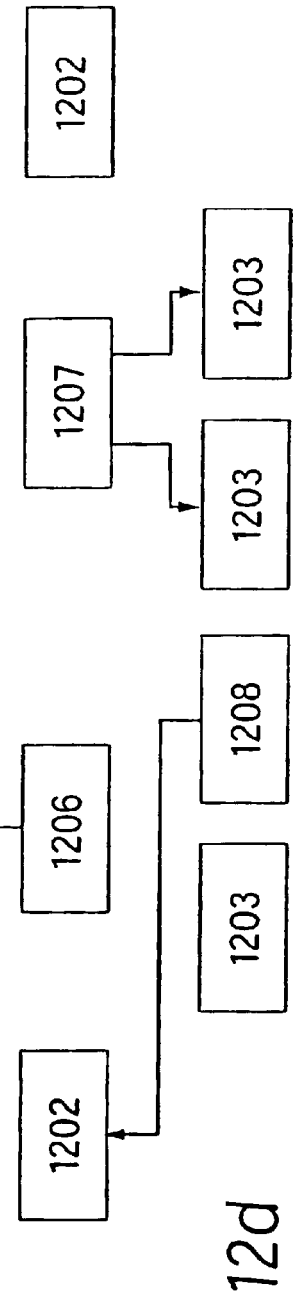

FIG. 12*d* shows a HIGHER trigger vector which 1206 sends to the higher level CT. 1207 sends a LOWER trigger vector to all the lower-level CTs. 1208 transmits a directly addressed (ADDRESSED) trigger vector to a certain CT which is not directly connected to 1207.

Figure 13:
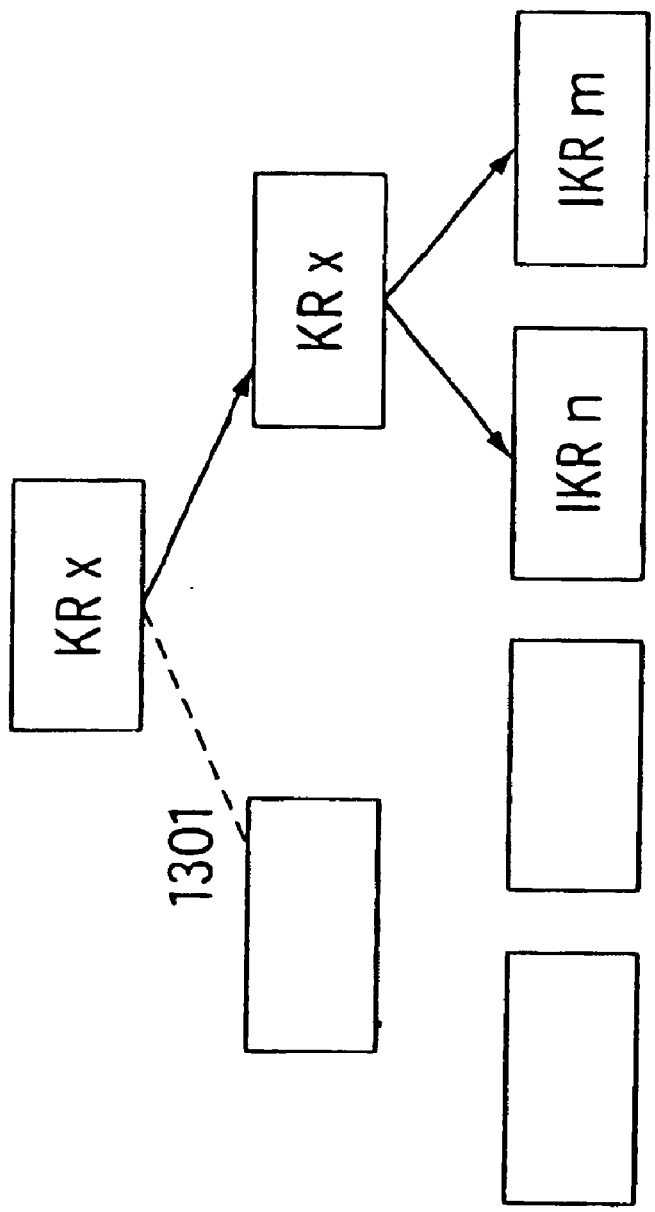

In FIG. 13 two independent IKR n and m request a common KRx cached in the higher level CT. It is indicated that this KR is cached by the entire branch and is also available in an adjacent branch (1301) via a common CT.

Figure 14:
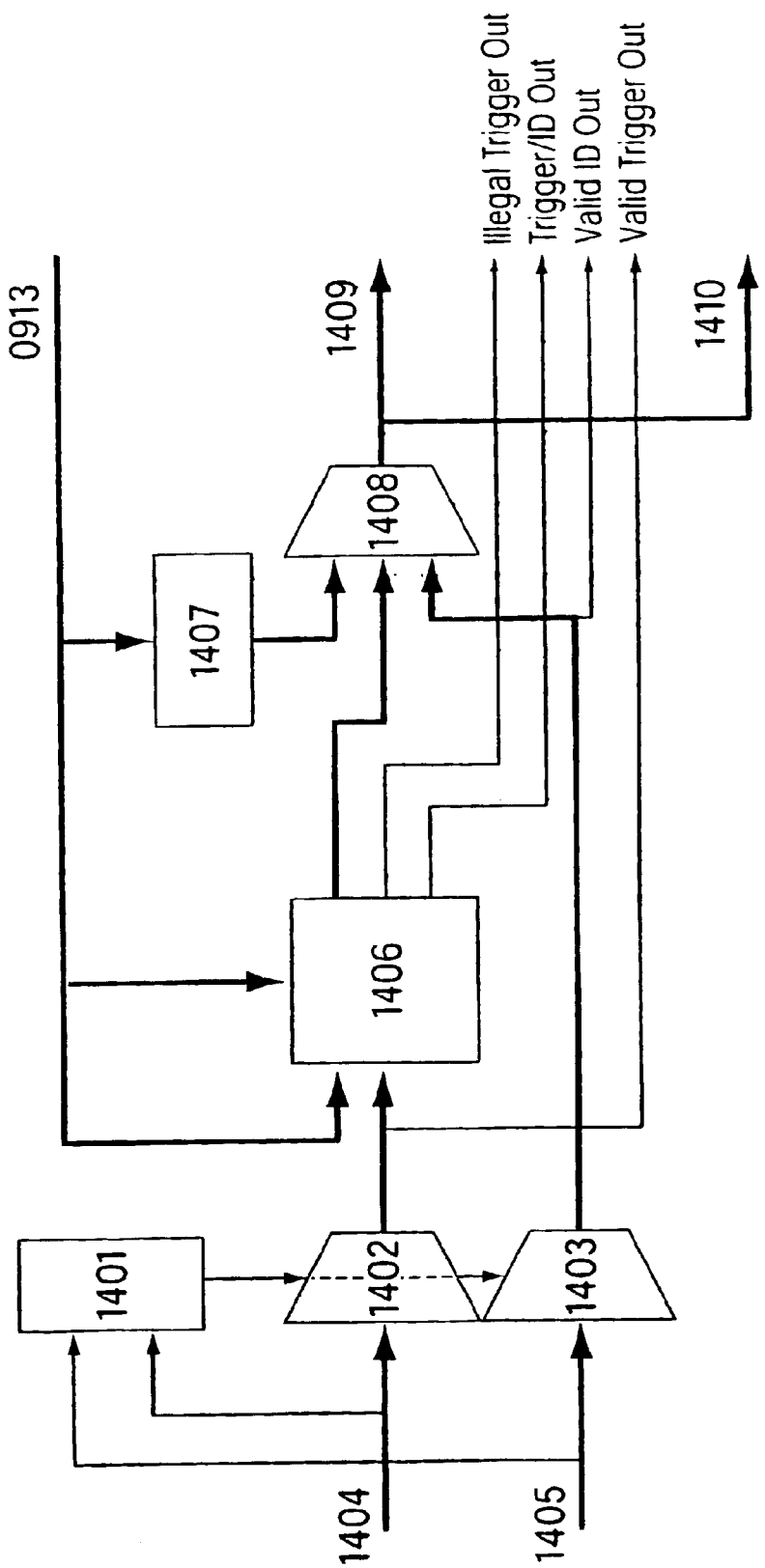

FIG. 14 shows an LUT system, modified with respect to FIG. 9, used in ROOT CTs and CTs of the middle hierarchical levels. The basic difference with respect to the CTs described so far is that, instead of individual trigger signals, ID vectors and/or trigger vectors must be managed by the CT. A handshake signal (RDY) is assigned to each vector to indicate the validity of the vector, which are sent to an arbiter (1401). One of the trigger vectors (1404) or one of the ID vectors (1405) is selected via the multiplexers (1402, 1403). Trigger vectors go directly to the address input of LUT1 (1406), which is otherwise wired according to FIG. 9. The ID register (1407) is also wired according to FIG. 9. Contrary to FIG. 9, multiplexer 1408 has three inputs (see 0902). The multiplexer is activated by arbiter 1401, in addition to the state machine. ID vectors are directly forwarded to LUT2 via 1403 over the additional input. Bus 1409 is used for this purpose. (In principle, IDs can be directly switched to LUT2 via a multiplexer (1408) even in the case of CTs according to FIG. 9. The IDs can then be sent without translation directly from the CEL to the LUT2.) "Trigger/ID Out" is generated according to FIG. 9. A "ValidIn" signal which is forwarded onto a "Valid Out" according to FIG. 9 does not exist. Instead, depending on the arbitration by 1401, a "Valid Trigger Out" is generated for trigger vectors and a "Valid ID Out" is generated for ID vectors in order to inform the state machine on how the processing is to take place.

Figure 15:
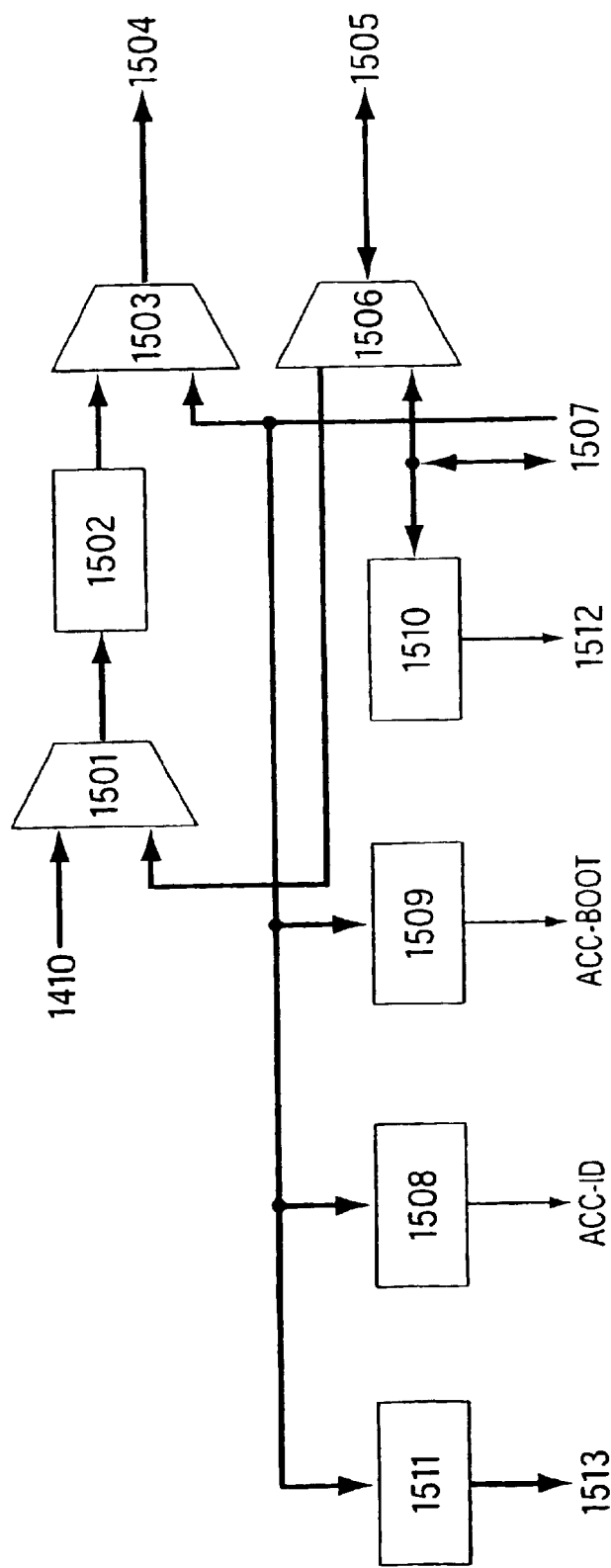

Bus 1409 is connected to another unit via 1410; this unit only exists in ROOT CT and is described in FIG. 15.

A ROOT CT requires, in addition to the normal CT functions, an interface to the external configuration memory (ECR), as well as the required address generator and units for managing access to the ECR.

Figure 16:
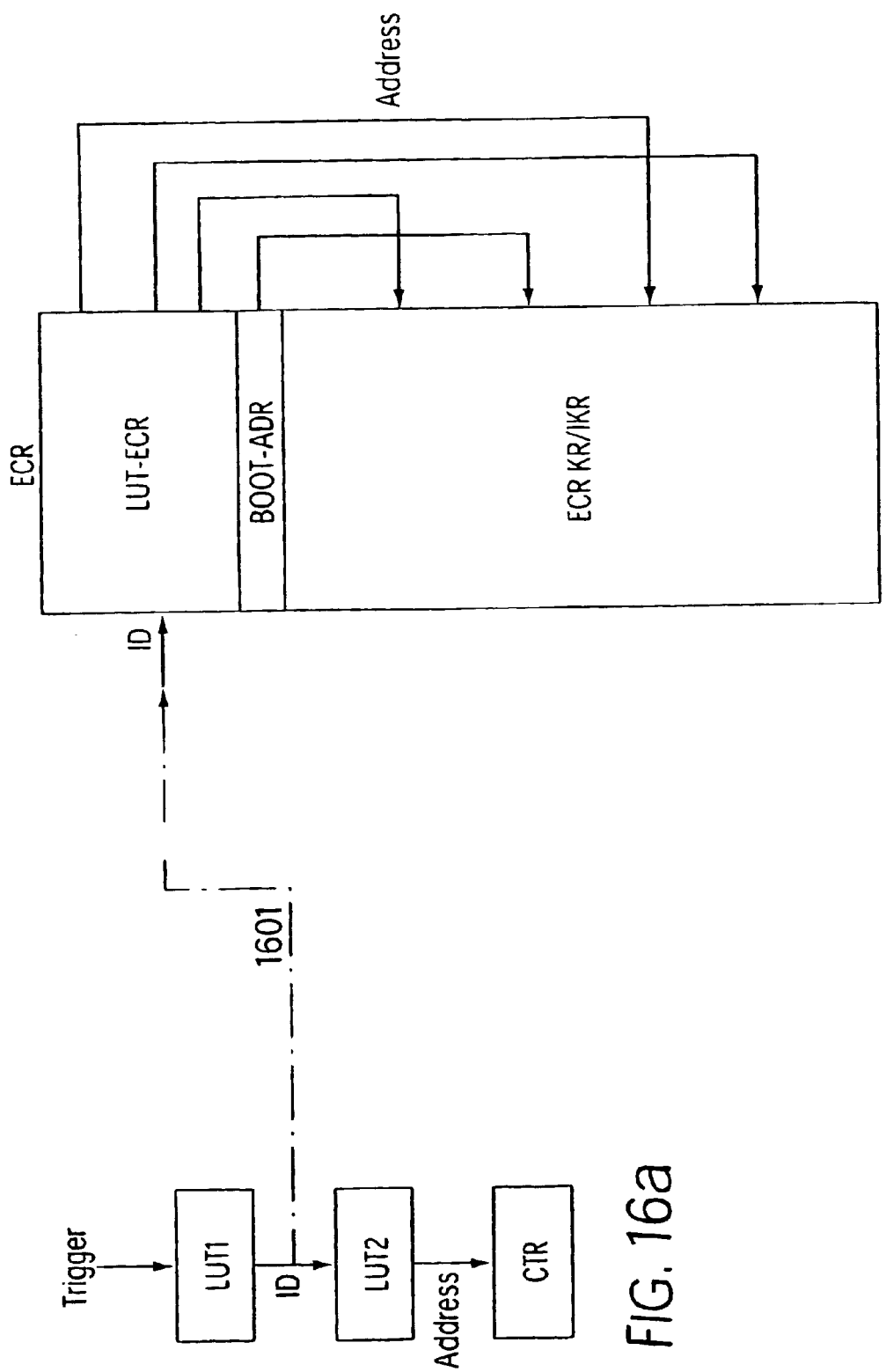

A conventional CT translates the trigger vectors received in LUT1 to an ID and the ID in LUT2 to a memory location in the CTR (see FIG. 16*a*). A ROOT CT translates an ID within the ECR, upon access to the ECR, to an address in the ECR where the KR/IKR referenced by ID begins. For this purpose, a memory range is established in the ECR, whose size corresponds to the possible number of IDs (for example, if an ID is 10 bits wide, $2^{10}$=1024 possible IDs result, i.e., 1024 entries are reserved in the ECR). In the following examples, this memory range is located at the lower end of the ECR and is referred to as LUTECR in order to emphasize the similarity with LUT2. The translation of a trigger to an ID takes place according to the known CTs in LUT1 (1601). For greater clarity, FIG. 16*b* illustrates access to the ECR.

In FIG. 15 an ID goes to multiplexer 1501 via bus 1410 of FIG. 14. The ID is written into loadable counter 1502 via 1501. The output of 1502 goes, via a multiplexer 1503, to the address bus (1504) of the ECR. The translation of the ID into a memory address goes via databus 1505 through a multiplexer/demultiplexer (1506) to 1501, which loads 1502 with the memory address. Subsequently the data words of the corresponding KR/IKR are read from the ECR via the LOAD ECR state machine (see FIG. 17) and written into the CTR, 1502 being incremented after each read sequence, until the "STOP" command is read.

The higher level HOST writes KR/IKR into the ECR via 1503/1506 through interface 1507. The state machine (CTS) arbitrates whether the HOST or the ROOT CT has access to the ECR.

After resetting the module, a base configuration (BOOT KR) must be loaded. For this purpose, a fixed memory address (BOOT ADR) is introduced which points to the first memory location of the BOOT KR. The memory location 0$h$ is recommended as the BOOT ADR if the IDs start with 1; otherwise $2^{ID}$ or some other memory location can be used.

In the exemplary embodiment, $2^{ID}$ is used.

The ROOT CT performs a lookup in order to load the BOOT KR at the location BOOT ADR if a BOOT KR is loaded. The ROOT CT writes the data after 1502 in order to load the BOOT KR from there until a "STOP" command occurs.

A monitoring unit within the ROOT CT assumes the synchronization of the HOST with the module. This takes place as follows:

The addresses small $2^{ID}$ are monitored by 1508, i.e., when the HOST accesses these addresses, a signal (ACC ID) is sent to the state machine (CTS).

BOOT ADR is also monitored via 1509 and sends an ACC BOOT signal to the state machine (CTS).

The state machine (CTS) responds as follows:
- if HOST writes to the BOOT ADR, this causes BOOT KR to load.
- if HOST writes the data word 0 (1512) to the BOOT ADR, this is confirmed via comparator 1510 and causes the module to stop.
- if the HOST writes to a small $2^{ID}$ address, the address is loaded into the REMOVE register (1511). Since the address corresponds to the ID (see ECR LUT), the ID of the modified KR/IKR is positioned in 1511. The REMOVE <ID> command for immediate execution is sent to all CTs (1513). The CTs then delete the KR/IKR of the corresponding ID from their CTR, i.e., LUT2. Upon the subsequent call up of the KR/IKR, the CTs must necessarily load the new KR/IKR from the ECR.

Figure 17:
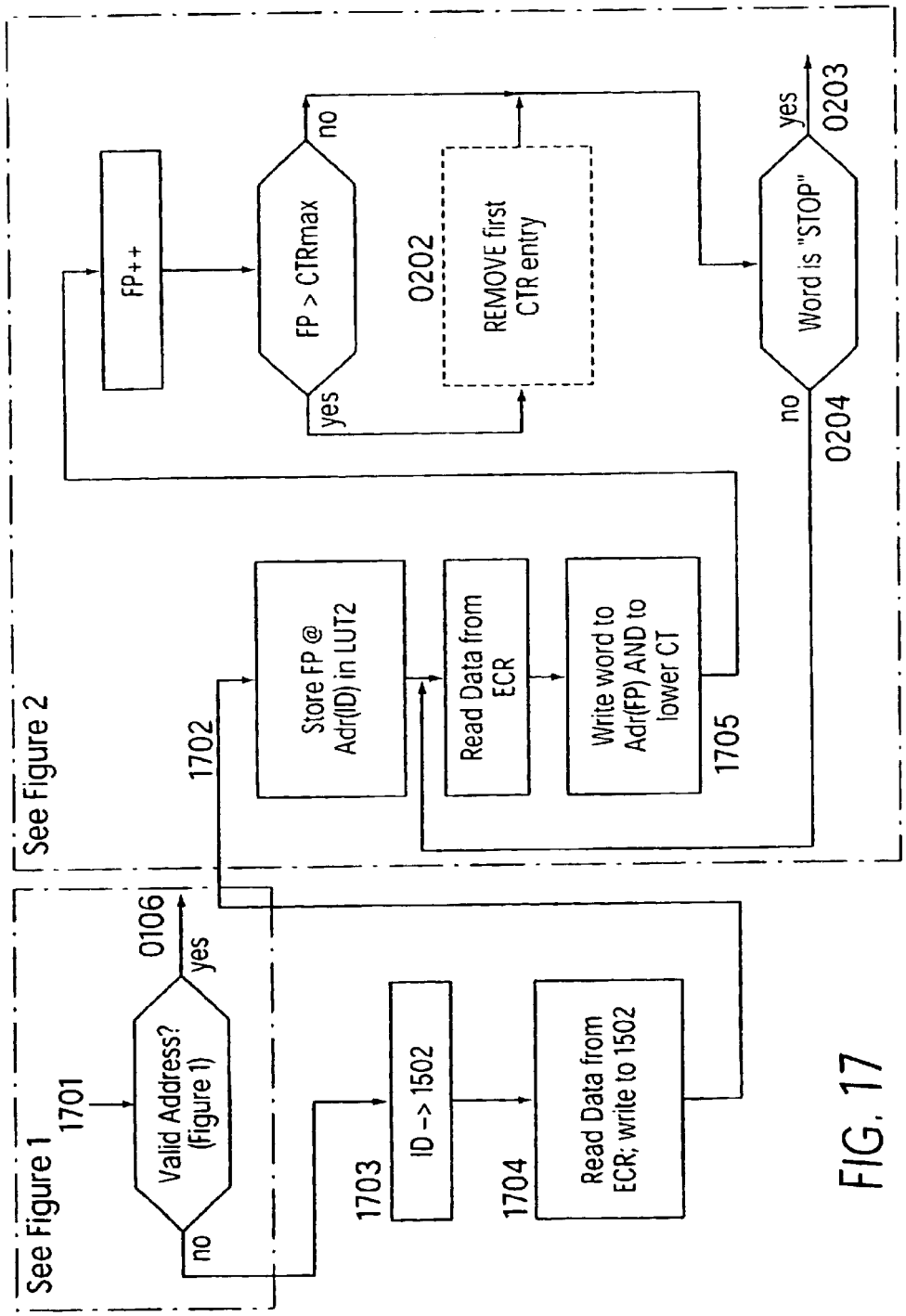
Figure 18:
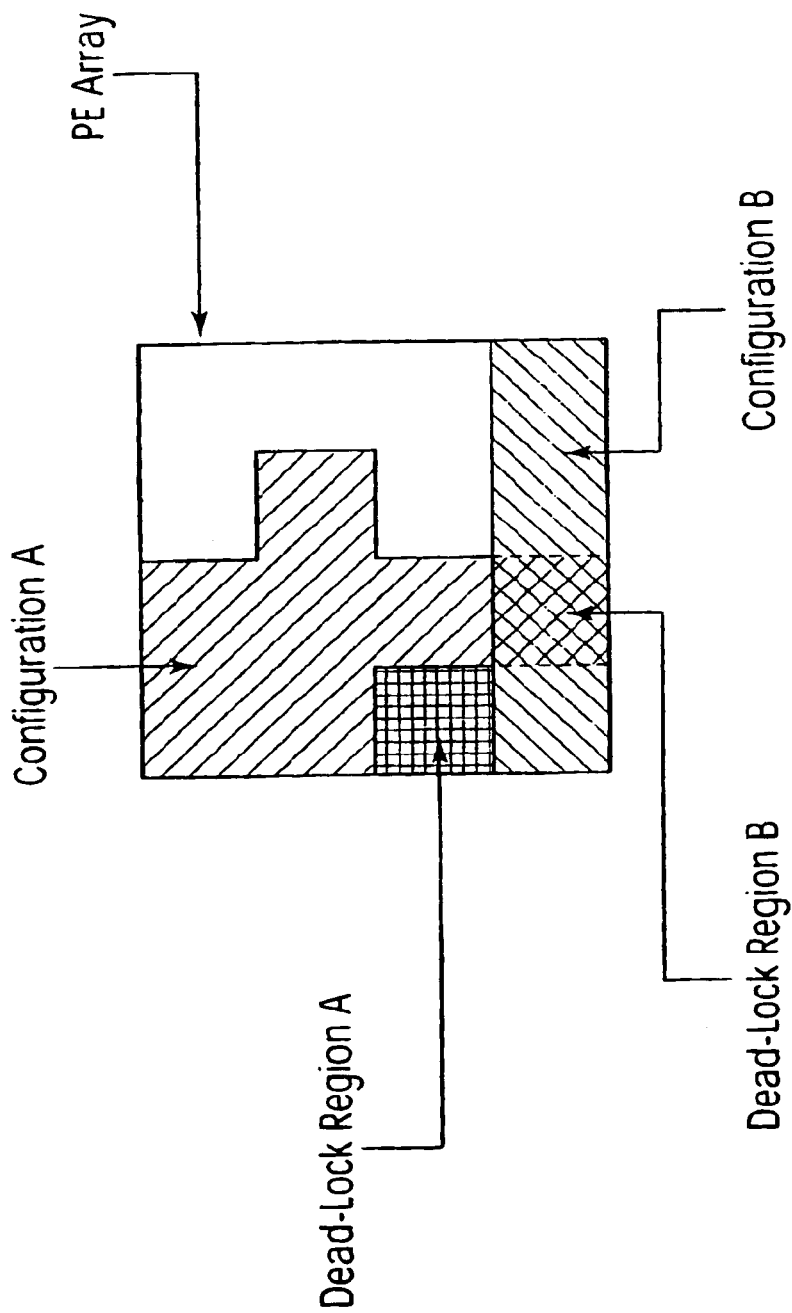

FIG. 17 shows the sequence in a ROOT CT when a KR/IKR is loaded from the ECR. If an ID is not found in the internal CTR (see FIG. 1, 1701), the ID is written into counter 1502 (1703). An access to the ECR having the address in 1502 delivers the base address of the KR/IKR. This is written into 1502 (1704). A LOAD according to FIG. 2 takes place (1702). The data is read from the ECR (1705) instead of a higher level CT and is not only written into the CTR of the same CT, but is also sent to the lower-level CT (1706).

Figure 1:
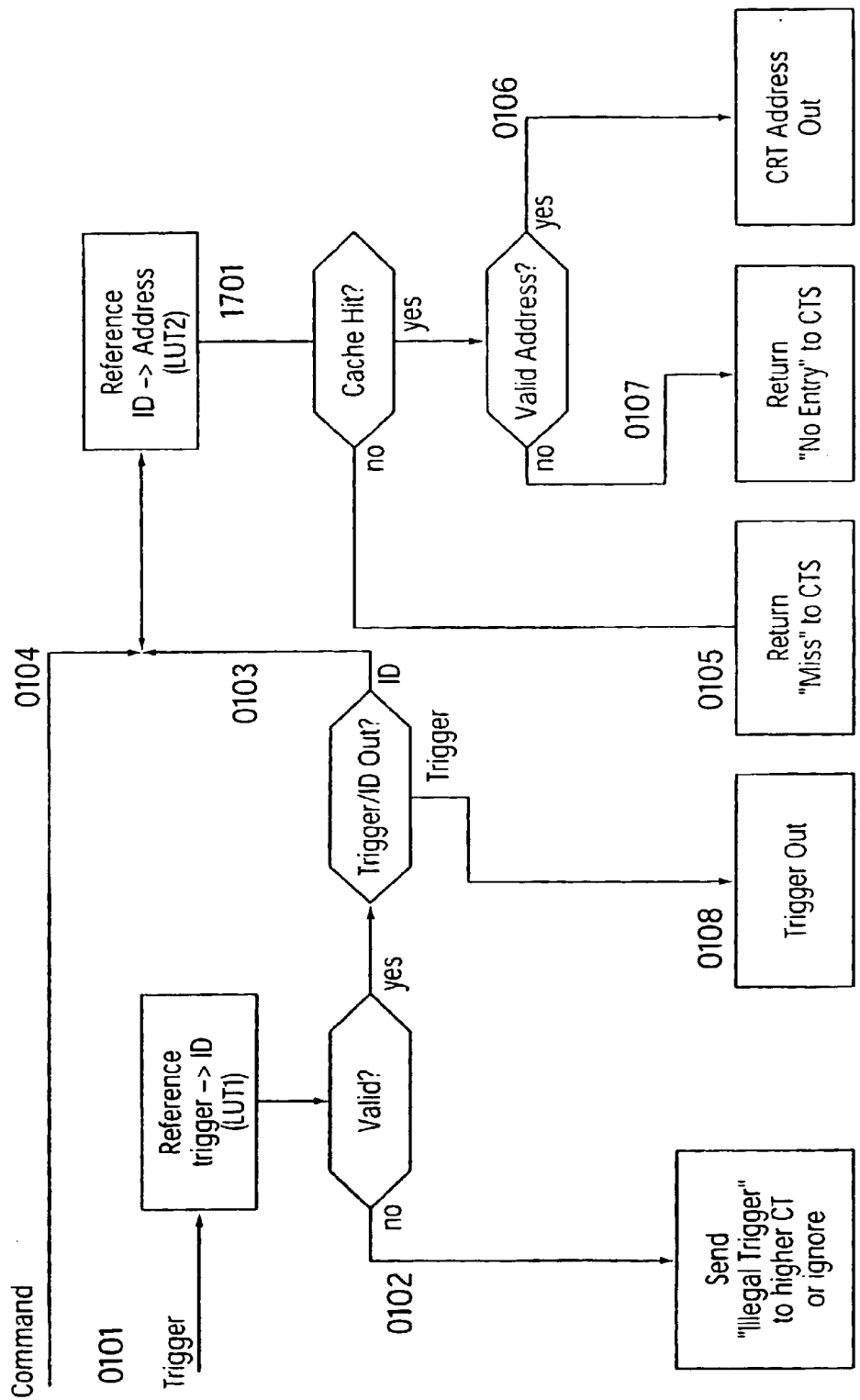
FIG. 1 shows the sequence of the CTR address generation within a CT. An incoming binary trigger vector (0101) is translated into a valid KR or IKR ID in LUT1. If no valid ID exists, an "Illegal Trigger" signal is generated (0102), which indicates that the trigger is not known in LUT1. The signal can be forwarded to the higher level CT as an error message or ignored. The translation of "triggers" according to "ID" is entered into LUT1 using the "REFERENCE" command.

In a mid-hierarchical level CT, the translation of the triggers takes place as in FIG. 1, with the exception that trigger vectors and ID vectors are handled according to FIG. 14. The KR/IKR are loaded according to FIG. 2, with the exception that the data words are not only written into the CTR of the same CT (0210), but are also sent at the same time to the lower-level CT.

Figure 19:
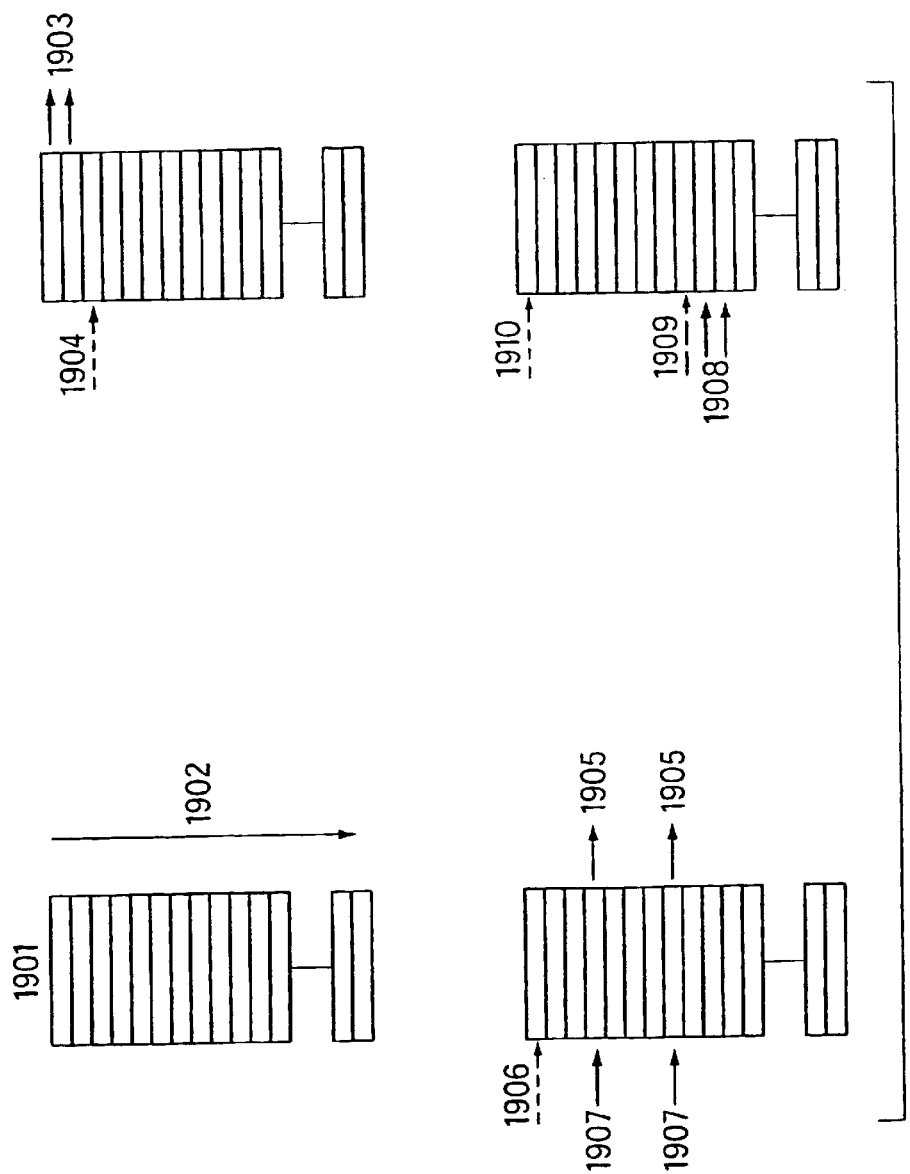

FIG. 19 illustrates the FILMO principle. The FILMO (1901) is always run through from the beginning to the end during read and write accesses (1902). If entries are written and deleted from the beginning of the FILMO (1903), the read pointer is shifted to the first undeleted entry (1904). If entries are written from the middle of the FILMO (1905), the read pointer remains unchanged (1906), and the entries are marked with "NOP" (1907). If data is written into the FILMO (1908), it is appended to the end of it after the last entry (1909). The read pointer (1910) remains unchanged.

Of course, a CT may also be designed with a single memory which includes LUT1, LUT2, and CTR. However, control is more complex in this case. The CTs have a design similar to that of ROOT CT, which already integrates LUT2 and the CTR in the ECR. A description of these CTs is unnecessary for understanding the procedure.

If a CT is used as a cache system for data, triggers are introduced for writing data into the CTR. The data is written from a CEL into the CTR. The necessary changes are trivial; the FILMO is no longer required.

In caching data, the problem of data consistency arises. It can be circumvented by using a method according to German Patent Application 42 21 278 A1 in order to identify the data and its validity at the individual hierarchical levels. If data is requested for executing a read-modify-write cycle (RMW cycle), the data is marked at all hierarchical levels as INVALID using an additional entry in the CTR/ECR. The unique ID of the KR/IKR using the data can be inserted in the entry for this purpose. The data cannot be used by any KR/IKR having another ID until the KR/IKR using the data has written back the data (see write-back method according to the related art) and deleted its ID.

Figure 20A:
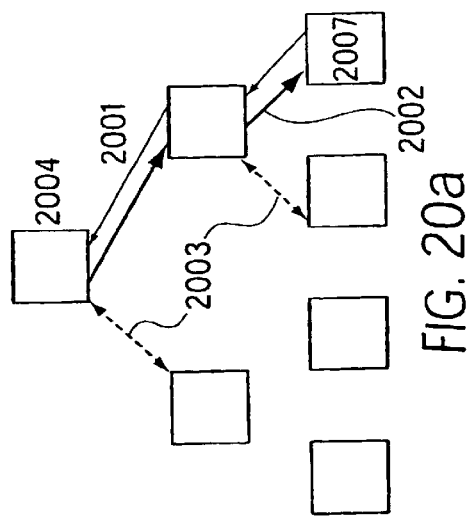

FIG. 20 Shows One Embodiment:

In FIG. 20a CT 2007 requests data from the higher level CT, which in turn requests data from ROOT CT 2004; the ID of the requesting KR/IKR (2001) is transmitted with the data request. The data (2002) is sent to 2007. All other subsequent accesses are rejected (2003).

Figure 20B:
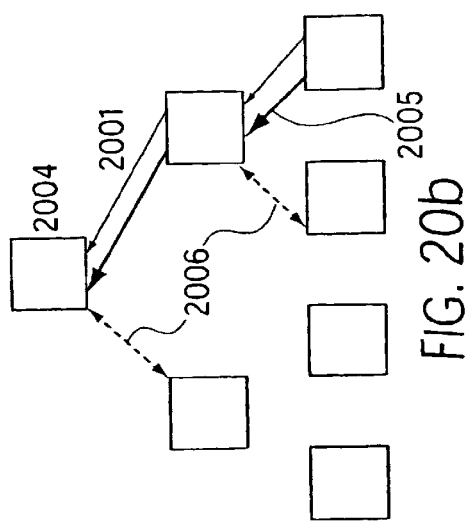

In FIG. 20b the data is written back (2005); other subsequent accesses are accepted again (2006).

Figure 20C:
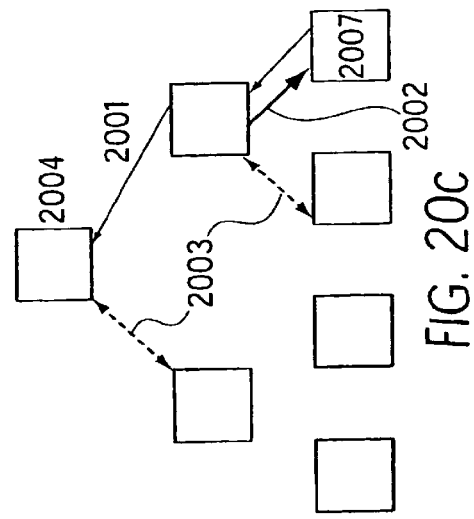
Figure 20D:
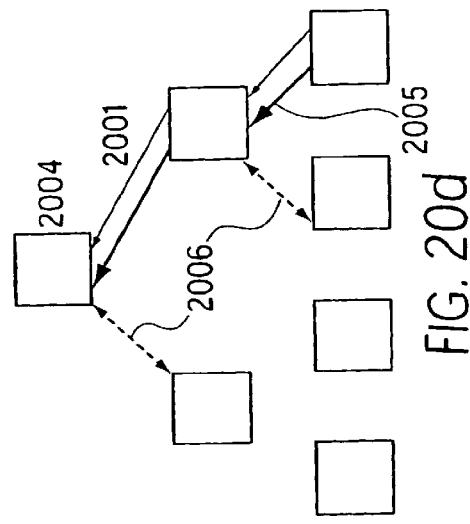

In FIG. 20c data is requested from a mid-hierarchical level CT, which has the data and sends its to 2007. The ID for blocking the data is sent to all CTs in that hierarchy (2001). When the data is written back (Write-Back) in FIG. 20d, the data is written to all CTs of that hierarchy and the ID is deleted.

Figure 21:
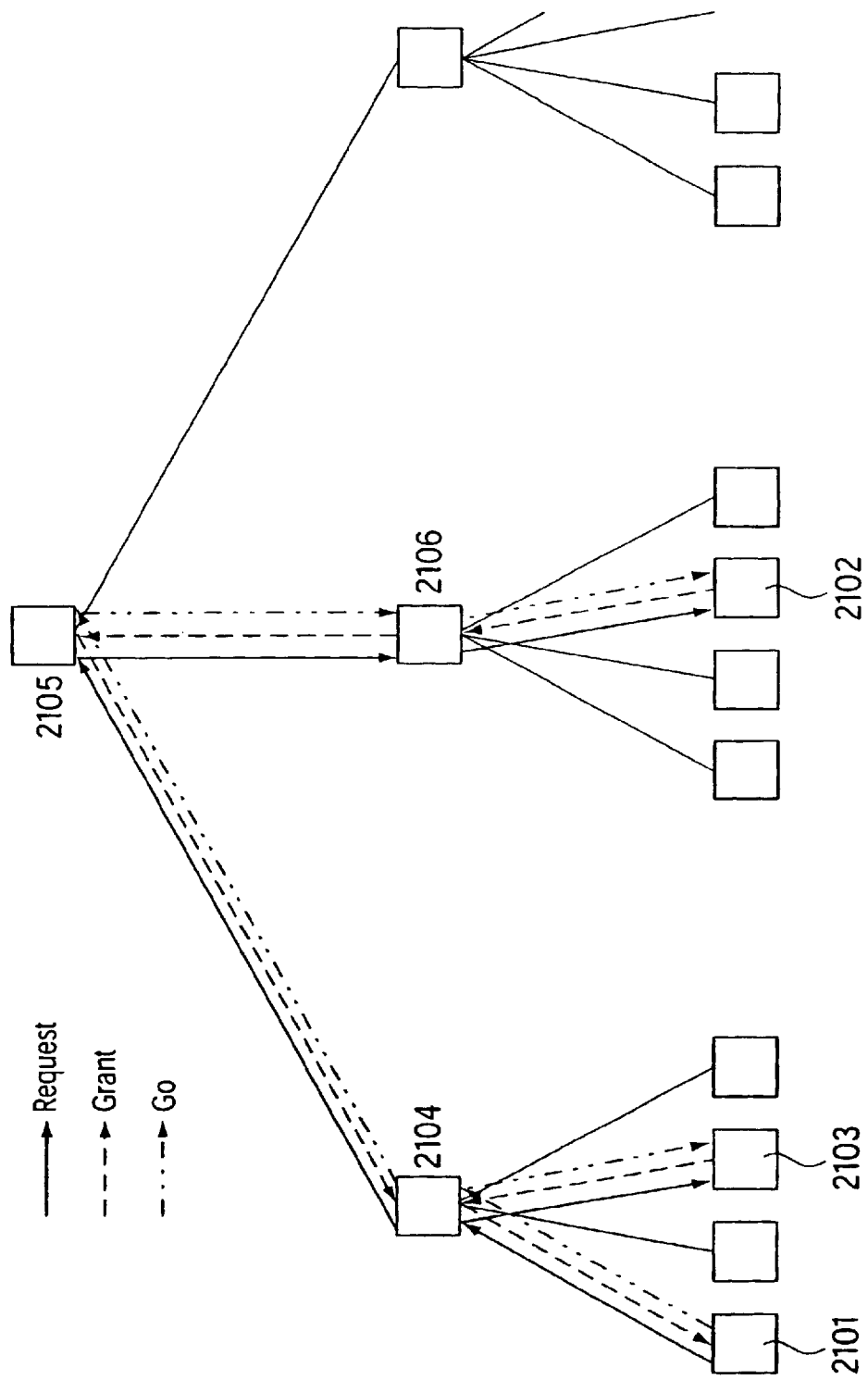

FIG. 21 shows the communication of an INITIATOR CT (2101) via a plurality of intermediate CTs (2104, 2105, 2106) with a TARGET CT (2102), as well as direct communication without the intermediary levels with a TARGET CT (2103) by the GETCTS/LOOSECTS method.

2101 establishes a link to 2103. After successfully establishing the link, 2101 receives a GRANT from 2103 as an acknowledgment. Subsequently 2101 establishes the link to 2102 via 2104, 2105, 2106. The link to 2102 is not acknowledged (GRANT) until 2102 is reached.

If the link cannot be established because one of the buses is busy, a REJECT is sent to 2101, and 2101 interrupts the sequence. This means that the link to 2103 is also interrupted and a REJECT is sent to 2103.

However, if 2102 acknowledges the link with GRANT, 2101 sends a GO command to 2103 and 2102 to acknowledge the successful establishment of the bus link and the synchronization to 2103 and 2102 at the same time. Data or commands can be transmitted through this protocol synchronously and without deadlocks, since GO ensures that all TARGETs correctly receive the commands.

Figure 22:
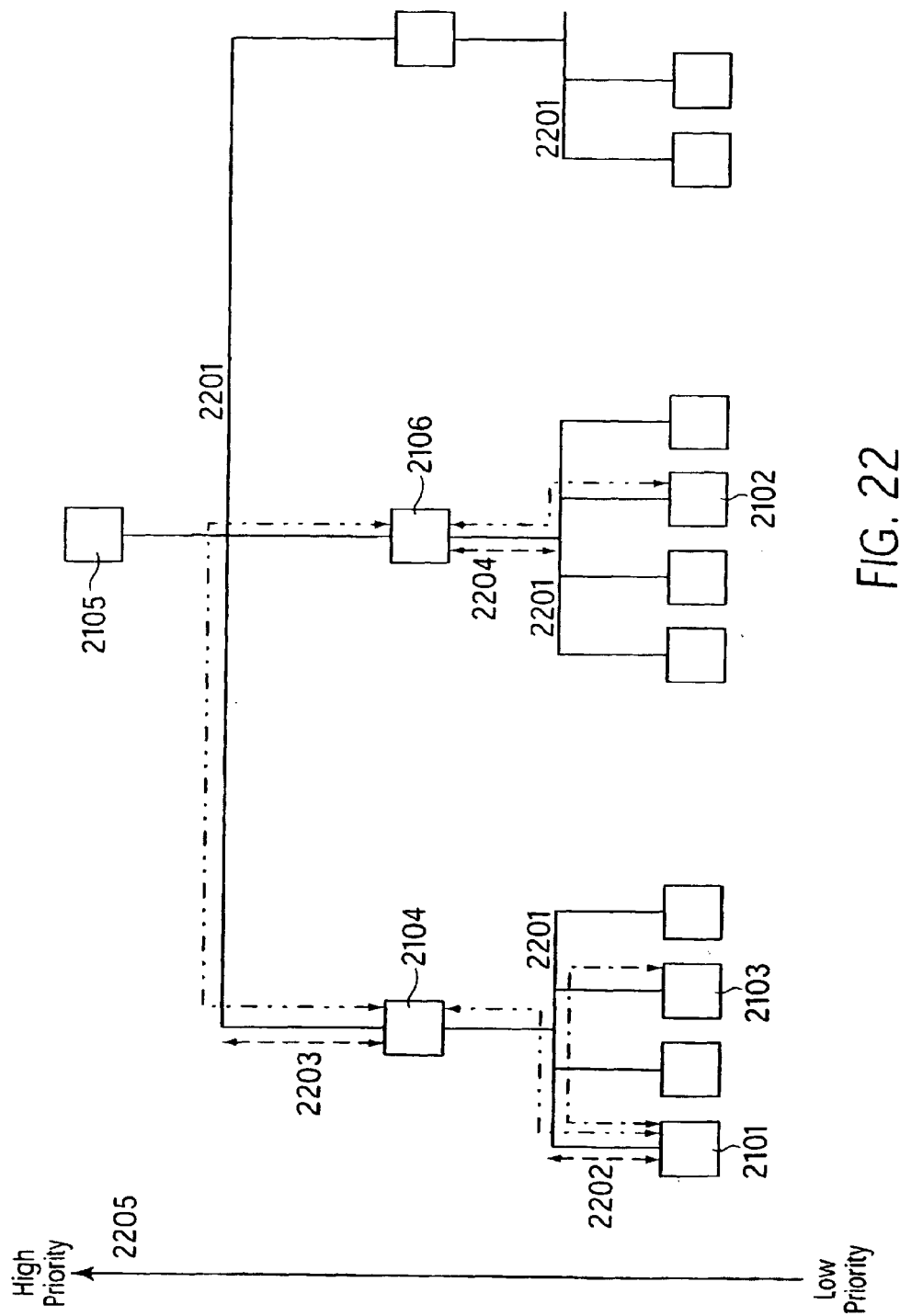

FIG. 22 shows the sequence of the inter-CT communication by the GETBUS/LOOSEBUS method. While in the method according to FIG. 21 the higher level CTs have the controlling and prioritizing task, control is assumed here by the inter-CT buses (2201).

A link to 2103 is established by the fact that the INITIATOR CT (2101) requests its local inter-CT bus (2202). Requests are acknowledged if the bus is free (ACCEPT) or rejected if the bus is busy (REJECT). Subsequently it sends the address of 2102 to the bus. According to the addressing plan, the bus control recognizes that the address is outside the local bus addresses and establishes a link to its local bus (2203) via the higher level CT 2104. As the address of 2102 is within its address range, the link to the local bus is established by 2102 (2204) via 2106. Since 2101 is now the sole bus master of all the buses required for the data communication, it is ensured that problem-free and deadlock-free communication takes place, since the communication channels are blocked for all the other CTs. 2102 and 2103 also cannot use the buses, since, in their TARGET role, they can only receive commands and can only send data themselves upon request by the INITIATOR (2101).

As soon as the communication is terminated, the buses are freed by a signal from 2101.

If 2101 encounters a busy bus during the establishment of the link, a REJECT is sent to 2101, and 2101 frees the bus systems again and attempts to establish the link at a later time. If multiple CTs request the same bus at the same time, the higher level CT has a higher priority (2205). This prevents a link that has reached an advanced stage in being established and already runs over multiple levels from being interrupted by a still very local bus buildup.

An extended protocol makes it possible in the case of a REJECT to free only those buses that are required by the bus buildup having a higher priority. This can considerably enhance performance, since not all links have to be established anew at a later time.

Figure 23:
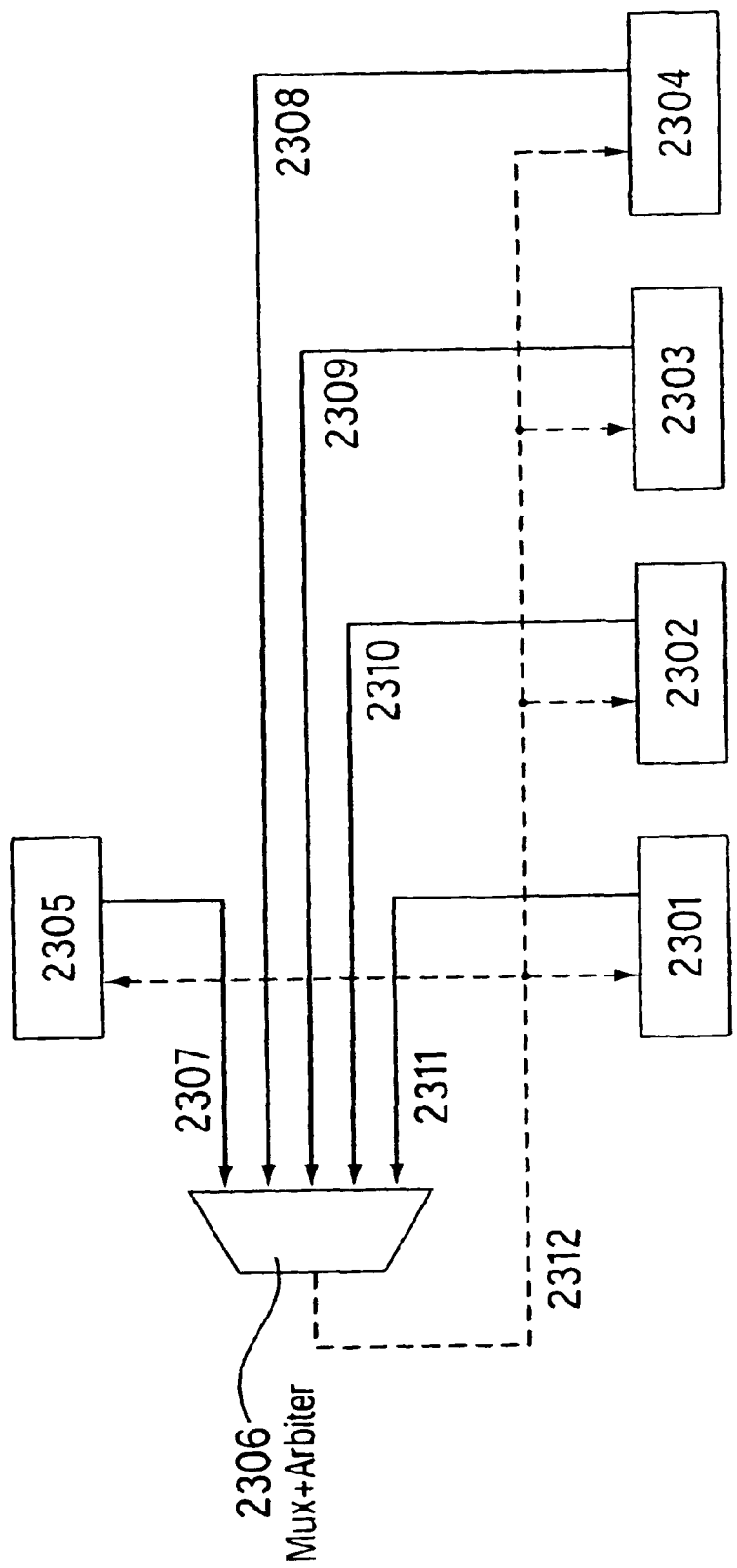

The structure of the inter-CT bus for the method according to FIG. 22 is shown in FIG. 23. CTs 2301–2304 are connected, together with higher level CT 2305 (interface 2307), to inter-CT bus 2312 via their interfaces (2308–2311). Connection to the inter-CT bus takes place via a round-robin arbiter which provides 2308–2311 with the same priority and 2307 with a higher priority; it activates a multiplexer to connect the buses (2306). A state machine which evaluates the control signals (e.g. establish/remove links, ACCEPT, REJECT, etc.) is assigned to the arbiter.

FIG. 24 shows the structure of the address plan of a unidimensional CT tree. The rectangles symbolize a CT. The address of the CT has been entered. "–" identifies irrelevant address bits, which are not evaluated; the relevant address bits are given as binary 0 or 1; "*" stands for any desired address bit. It can be easily seen that this design can also be used for multidimensional trees by projection in which case each of the given addresses represents one of the axes; in other words, a corresponding separate address system exists for each axis.

Figure 24A:
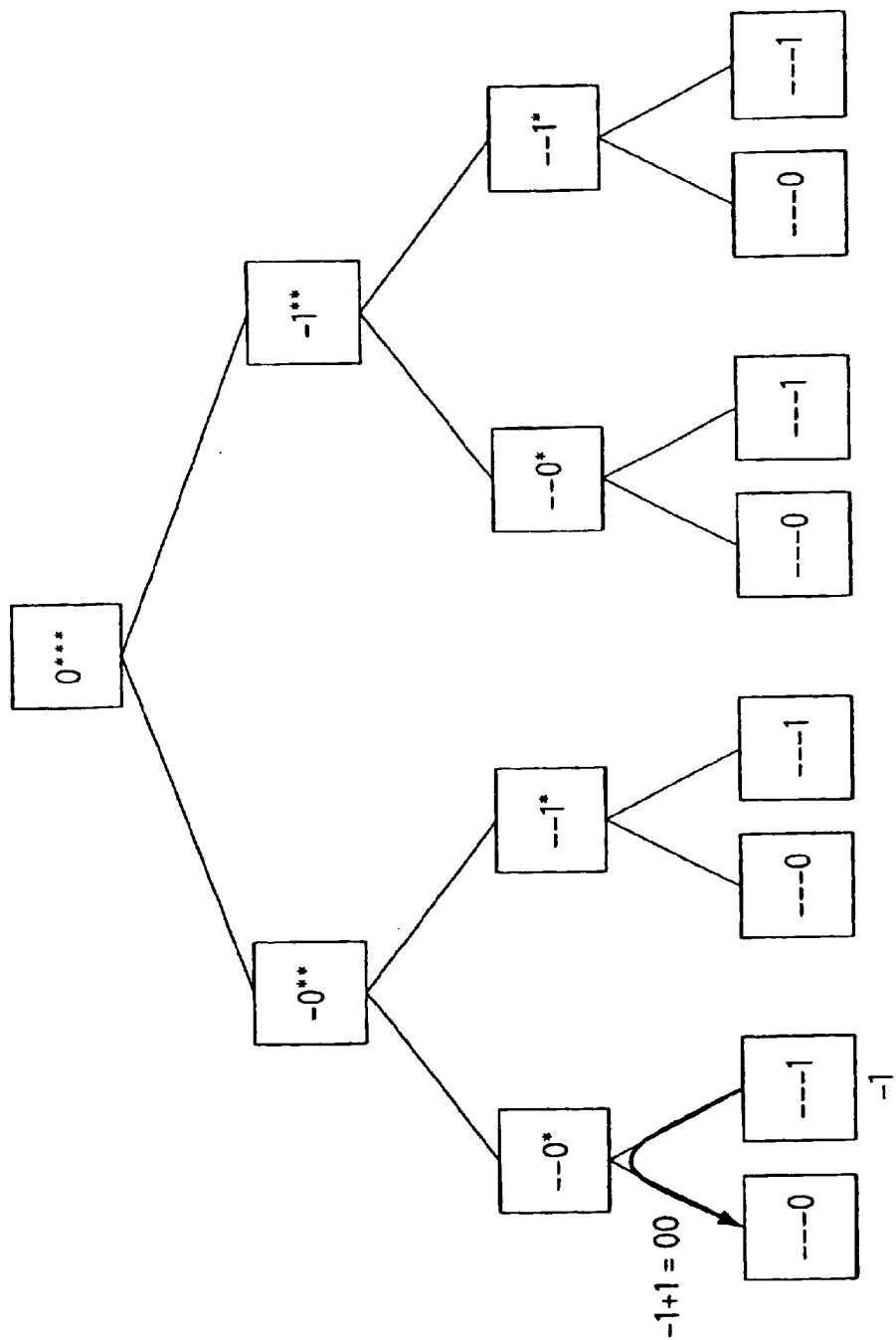

FIG. 24a shows the addressing from CT 0001. The relative address –1 is specified. By calculating –1+1=00 ("relative motion"+"address of the INITIATOR CT on current level"), the CT 0000 connected to the same local bus can be calculated.

Figure 24B:
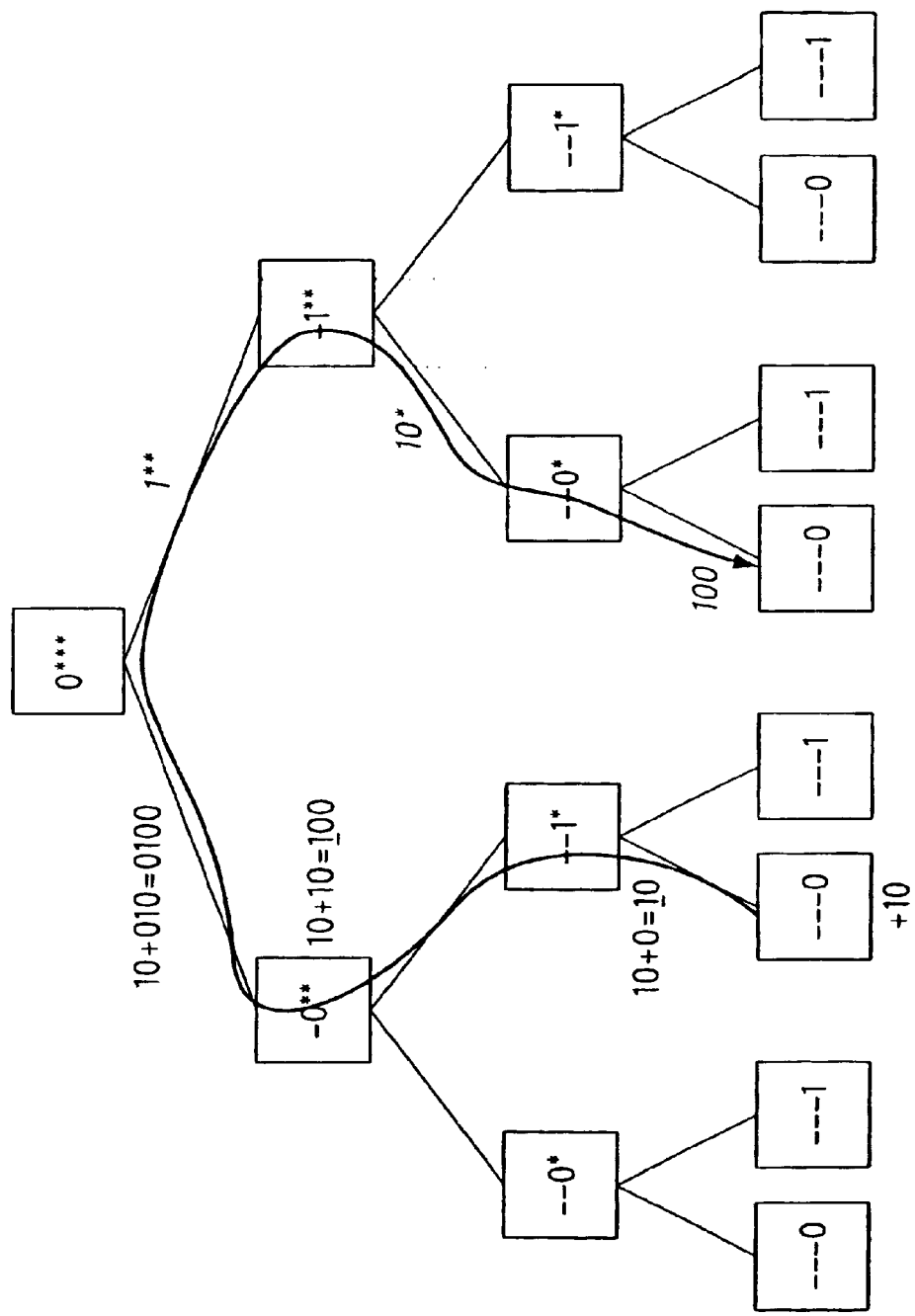

In FIG. 24b, CT 0010 calls up the relative address +10. The calculation 10+0=10 ("relative motion"+"address of the INITIATOR CT on current level") provides the carryover 1, since the address range of the lowermost local bus is exactly one bit wide. Therefore the next higher bus is selected. This address calculation with 10+10=100 ("relative motion"+"address of INITIATOR CT on current level") again provides a carryover, since its address range (2 bits) is exactly one bit larger than the address range of the lowermost bus. On the next higher level no carryover occurs with the calculation 10+010=0100 so that the third bit (from the left) addresses path 1** having the next lower level; the second bit (from the left) addresses path 10* of the next lower level and, finally, the last bit selects the TARGET CT.

Figure 24C:
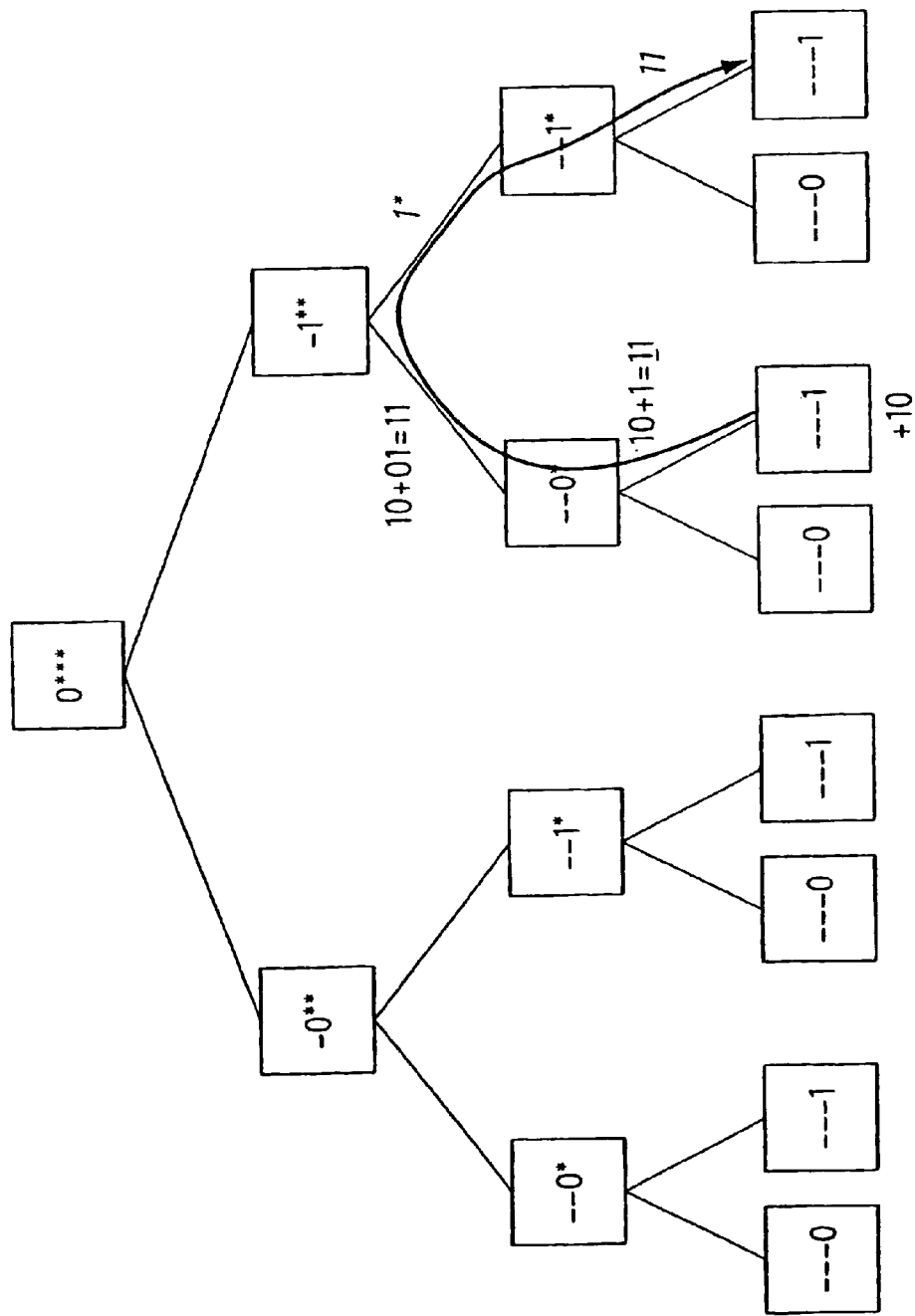
Figure 24D:
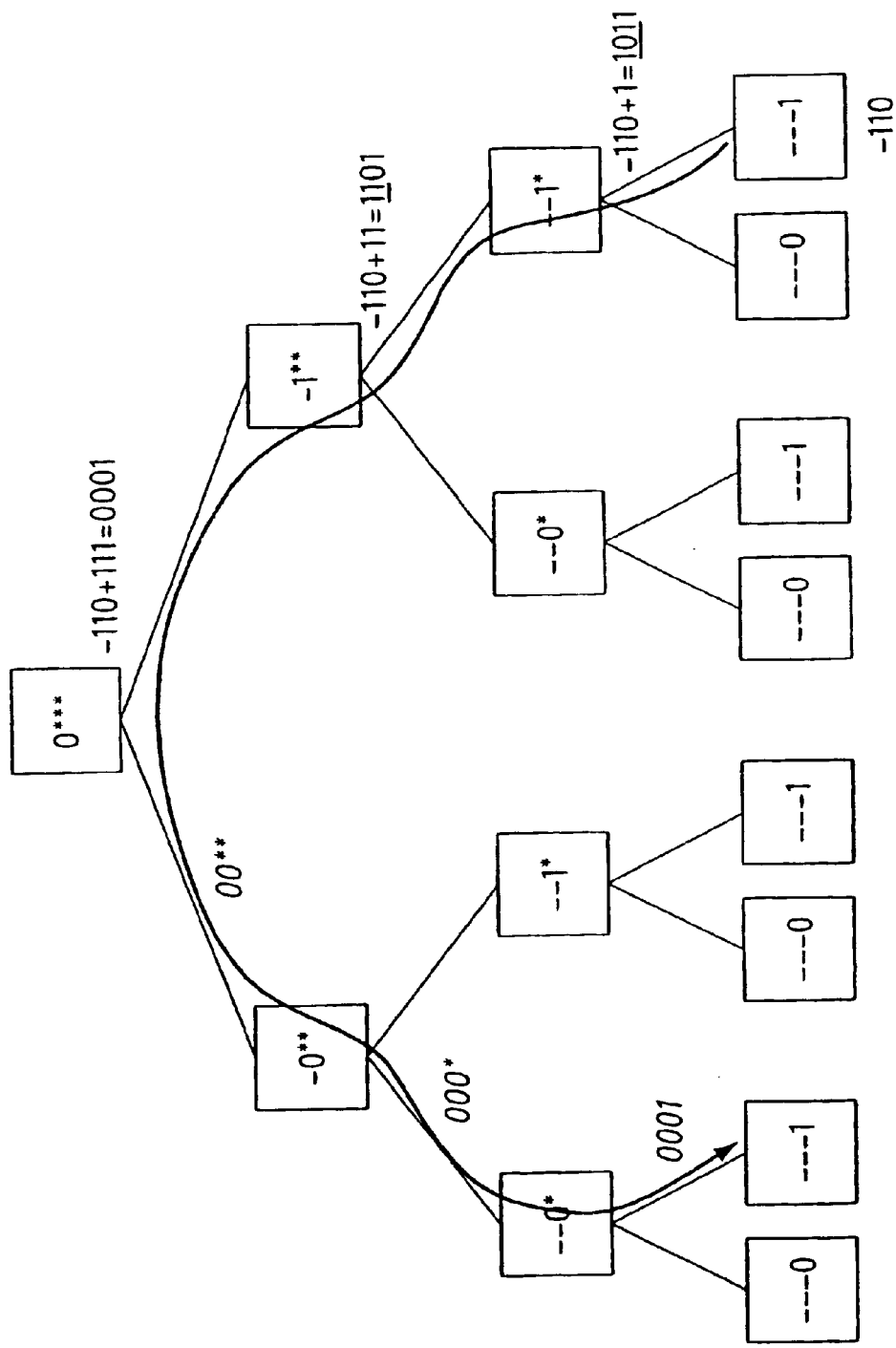

FIG. 24c shows the known method over two levels in the positive direction, and FIG. 24d shows the method over three levels in the negative direction with a negative overrun.

Figure 25:
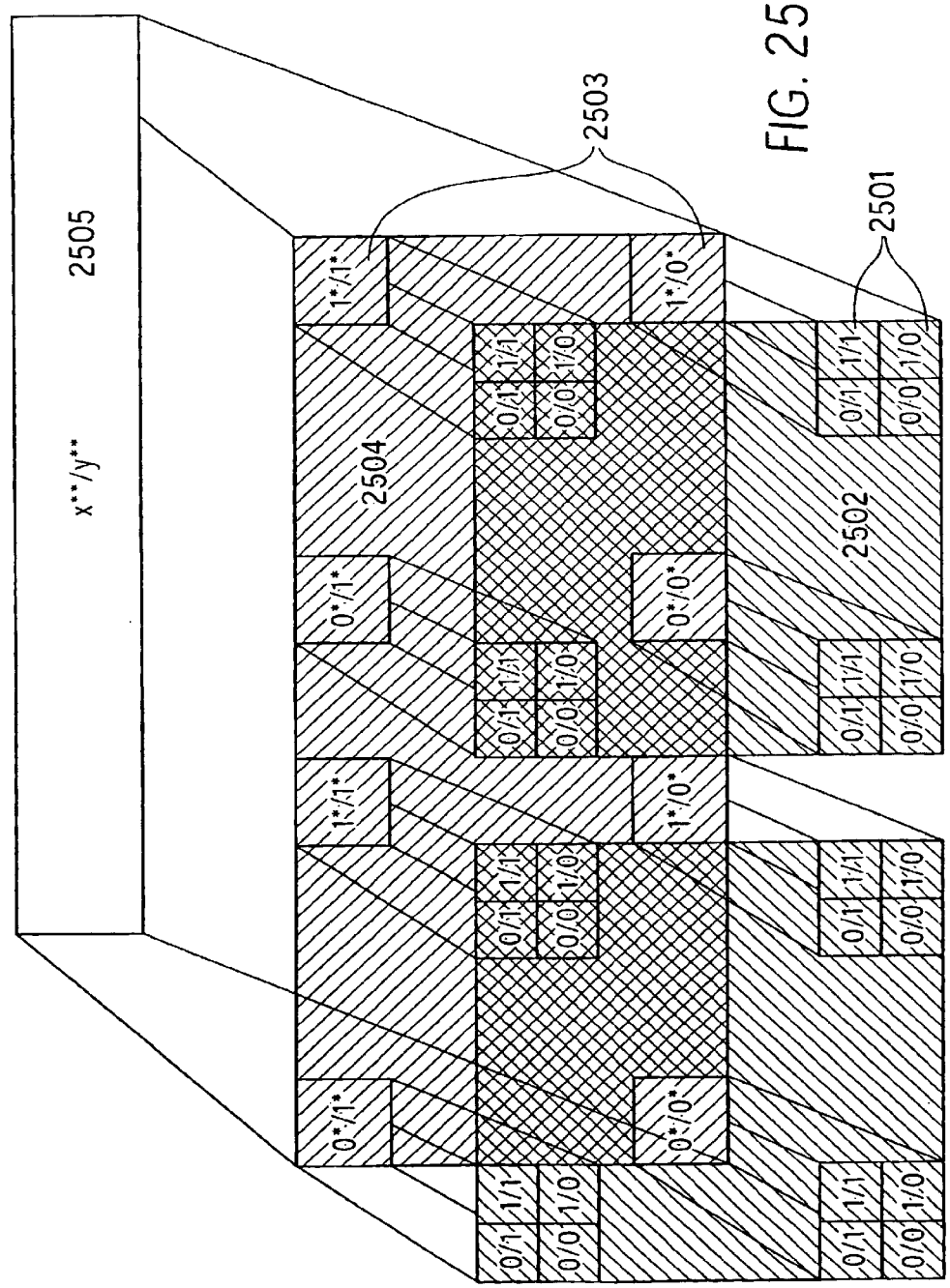
Figure 26:
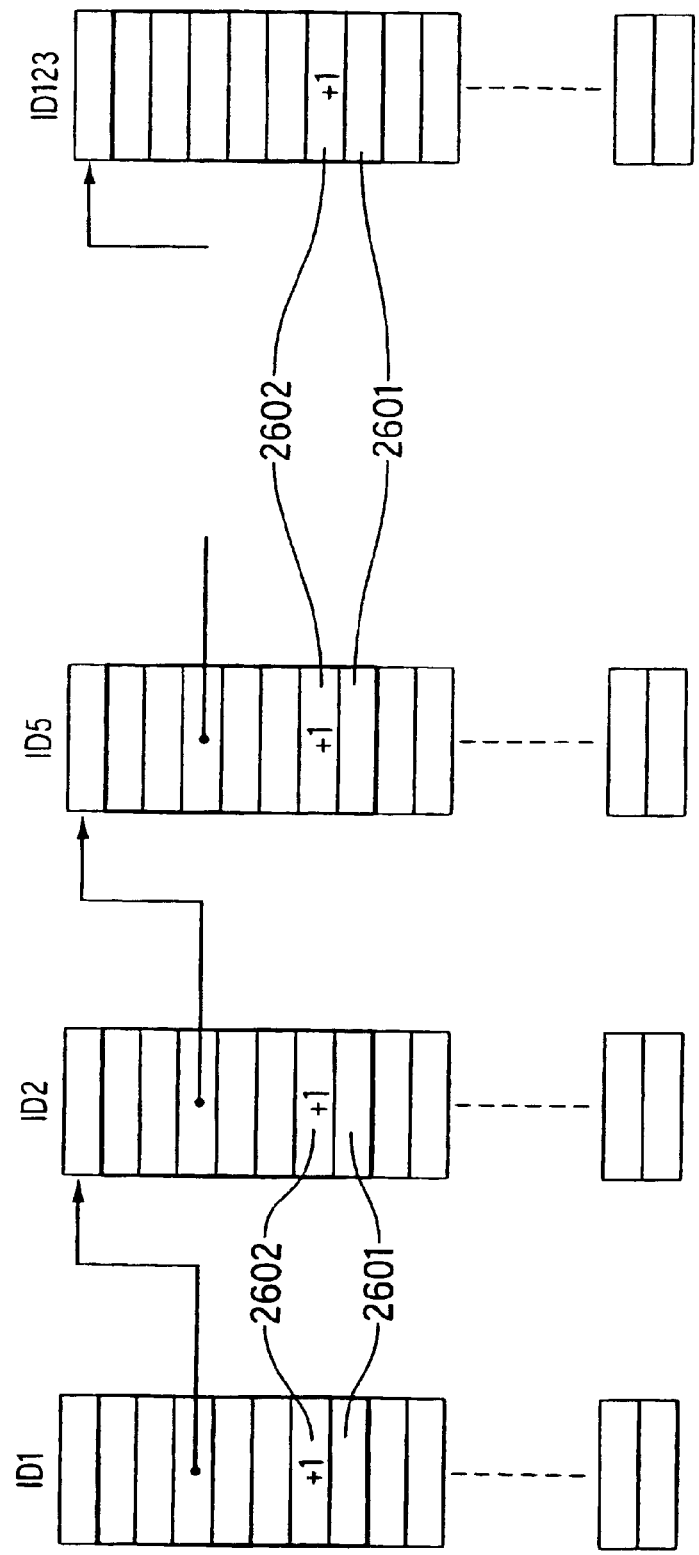

FIG. 25 shows the structure of a two-dimensional CT tree. The CTs (2501) are located on the lowermost level (2502) in a two-dimensional arrangement. The address of the dimension is provided in the respective CT with x/y. The next higher level (2504) is above 2502. Each of its CTs (2503) controls a group of four CTs of the level 2502. The address space of the CTs at 2504 is one bit wider; * identifies the address bits of level 2502 which are irrelevant for the selection of the CTs at 2504. ROOT CT 2505 is one level above 2504. Its address is again one bit wider; the meaning of * is equivalent FIG. 26 shows the linkage of the garbage collector in the case of the microcontroller implementation. All KRs are linked to one another via the header entries (garbage-previous/garbage-next). When the garbage collector runs through the list, the age of the KR is documented for the cache statistics (2602) by incrementing the entry by (+1). The garbage collector looks for the KR statistics entry (2601) which shows whether the KR still exists in the FILMO list. In this case KR should not be deleted by the GC since it still contains unconfigured KWs. As an alternative, this test could also run via the FILMO-next and FILMO-previous entries.

Figure 27:
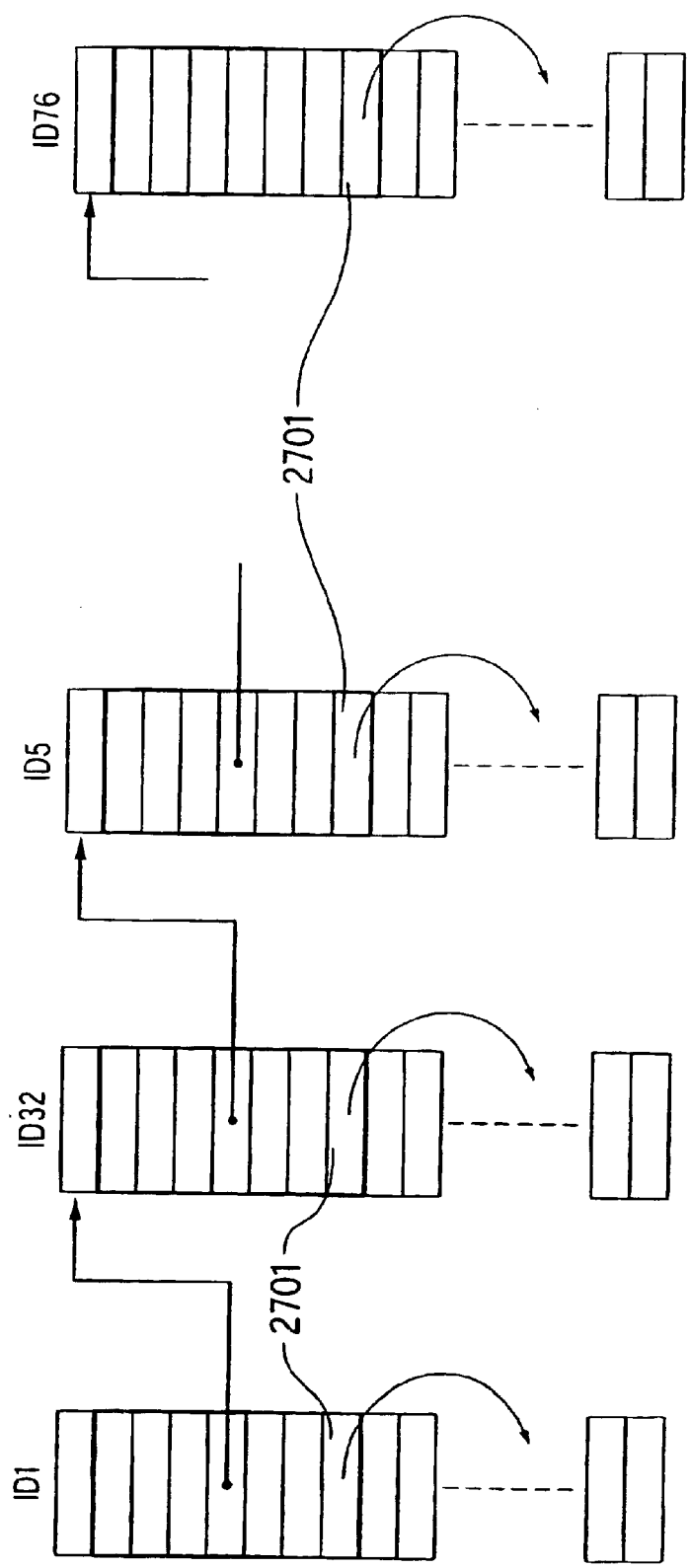

FIG. 27 shows the linkages of the FILMO list. The linkage can be completely different from that in the garbage list (FIG. 26). The KRs are linked via FILMO-previous and FILMO-next. The KR statistics (2701) entries point to the first not yet configured KW in the respective KR. A FILMO run is structured so that the KR is started in the first ID. After execution, the position of the unexecuted KW is written after 2701. If KR has been completely executed, the KR is removed from the linked FILMO list, but remains in the memory. Then a jump is made over the FILMO list, to the next KR which is also processed.

Figure 28:
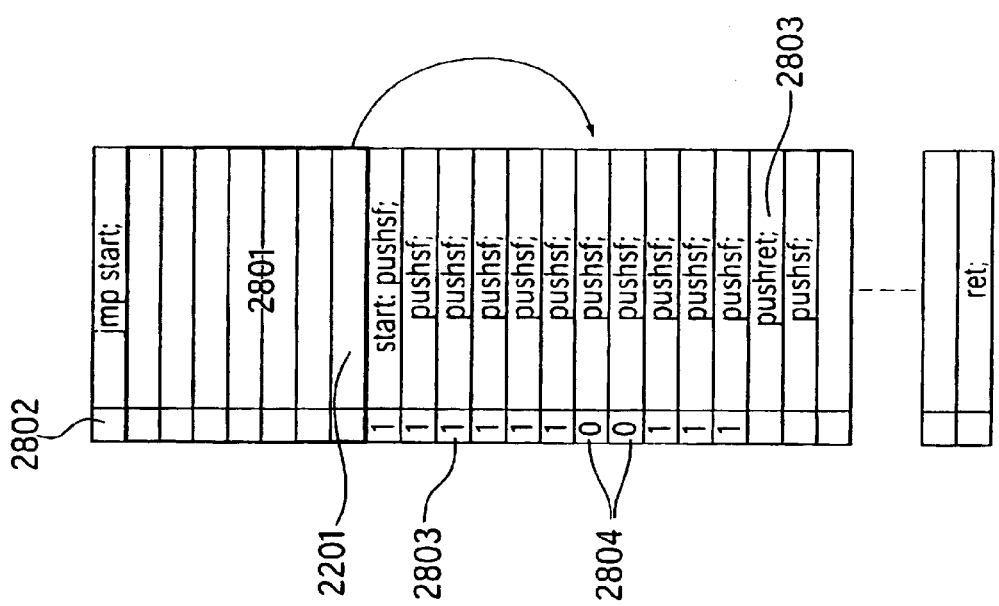

FIG. 28 illustrates the structure of a KR in the case of microcontroller control. At the beginning there is a jump command, which jumps behind the header (2801) of the KR. The FILMO bit (2802) is assigned to each KW. A 1 (2803) shows that the KW has been accepted (ACCEPT) by the CEL and is no longer executed in the next run. A 0 (2804) shows a REJECT; the KW must be executed again in the next run. The optional KR statistics (2701) point to the first KW marked with 0. If PUSHRET (2805) receives a REJECT, the processing of the KR is interrupted here and set up again in the next run either at the first KW or to the location at which 2701 points. Otherwise the KR is terminated properly at its end 2806.

Figure 29:
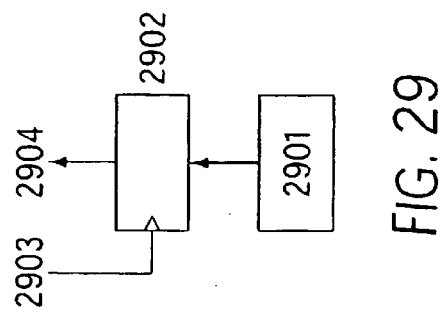

FIG. 29 shows the circuit for saving the status information of a CEL prior to running through the FILMO or starting a KR. The status information goes from the CEL (2901) to a register (2902). Prior to running through the FILMO or starting a KR, the CT sends an enable signal (2903) to 2902. Then the status information is accepted and forwarded to the CT (2904). 2904 remains constant until the next transmission from 2903.

Definition of Terms

ACCEPT Signal showing that the addressed CEL is in a configurable state and accepts the transmitted KW.

Block commands (such as BLOCK-MOVE) Commands that shift a plurality of data (a block) in the memory or between the memory and the periphery. The origination address of the data to be shifted, the target address of the data, and the length of the data block are provided.

Broadcast Sending of information to a plurality of receivers.

Data receiver The units(s) that further process(es) the results of the CEL.

Data transmitter The units(s) that make(s) data available to the CEL as operands.

Data word A data word has a bit array of any desired length. This bit array represents a processing unit for a system. Both commands for processors or similar modules and pure data can be encoded in a data word.

Deadlock State in which no data processing is possible due to mutual blockage.

DFP Data flow processor according to German Patent/ Offenlegungsschrift 44 16 881.

DPGA Dynamically configurable FPGAs. Related art.

Elements Umbrella term for all types of standalone units that may be used as pieces in an electronic module. Thus, elements include:
- configurable cells of all types
- clusters
- RAM blocks
- logic
- arithmetic units
- registers
- multiplexers
- I/O pins of a chip Event An event can be evaluated by a hardware element in any manner that is fitting for the application and can trigger a conditional action as a response to this evaluation. Thus, events include, for example:
- clock cycle of a computer system
- internal or external interrupt signal
- trigger signal from other elements within the module
- comparison of a data flow and/or a command flow with a value
- input/output events
- expiration, overrun, reset, etc. a counter
- evaluation of a comparison.

FIFO First-in first-out memory according to the related art.

FILMO Modified FIFO from which linear data is read. The read pointer is not restricted to the beginning of the memory.

FPGA Programmable logic-module. Related art

F-PLUREG Register in which the function of the CEL is set. The OneShOT and Sleep modes are also set. PLU writes into the register.

Fragmentation Fragmentation of the memory into a plurality of often small and therefore useless memory ranges.

Garbage collector Unit for managing the memory. Prevents fragmentation.

H level Logical 1 level depending on the technology used.

HOST A computer on a level higher than the module or component.

IDLE cycle The cycle in which a state machine performs no processing. Basic state of a state machine.

INTER-CT BUS Bus system between the CTs of one level and a higher level CT (or CT group).

INITIATOR CT which initiates access to an inter-CT bus.

Pointer pointer to an address or a data word.

Configurable element (KE) A configurable element represents a unit of a logic module which can be set for a special function via a configuration word. Configurable elements are therefore all types of RAM cells, multiplexers, arithmetic logical units, registers, and all types of internal and external interconnection descriptions, etc.).

Configurable cells (CEL) See logic cells.

Configuring Setting the function and interconnection of a logical unit, an (FPGA) cell, or a CEL (see Reconfiguring).

Configuration data Any number of configuration words.

Configuration routine (KR) Multiple configuration words combined to form an algorithm.

Configuration memory The configuration memory contains one or more configuration words.

Configuration word (KW) A configuration word has a bit array of any desired length. This bit array represents a valid setting for the element to be configured so that a functional unit is obtained.

Load logic Unit for configuring and reconfiguring the CEL. Structured by a special microcontroller adapted to its function.

Logic cells Configurable cells used in DFPs, FPGAs, DPGAs, which perform simple logical or arithmetic operations according to their configuration Lookup table Known method for translating data.

LUT1 Lookup table which translates a trigger to an ID and determines whether the trigger is assigned to a valid ID.

LUT2 Lookup table which translates an ID to the address of the respective KR in the local memory and determines whether the KR is available in the local memory.

L level Logical 0 level, depending on the technology used.

Mask Bit combination providing the valid signals within a plurality of signals.

Prioritizing Determining a sequence order.

RECONFIG Reconfigurable state of a CEL

RECONFIG trigger Setting a CEL into the reconfigurable state.

REJECT Signal which shows that the addressed CEL is in a non-configurable state and does not accept the KW sent.

REMOVE <ID> 1. Command within a KR to remove the KR referenced by its ID.

2. Command of a higher level CT via a separate interface or handshaking to a lower level CT to delete the KR referenced by its ID.

RESET Resetting a module or an entire computer system into a certain basic state.

ROOT CT CT of the highest hierarchical level having direct access to the external configuration memory.

Round-robin arbiter Arbiter running in a circle that always assigns the lowest priority to the last-arbitrated signal.

State machine

Sync signals Status signals generated by a configurable element or an arithmetic unit and forwarded to other configurable elements or arithmetic units to control and synchronize data processing. A sync signal can also be sent back to the same configurable element or arithmetic unit with a time delay (stored).

TARGET CT which is a target of an access to the inter-CT bus.

Trigger Synonym for sync signals.

Reconfiguring Reconfiguring any desired number of CELs while any number of other CELs continue to perform their own functions (see configuring).

Linked list Data structure linked together via pointers according to the related art.

Cells Synonym for configurable elements.

State machine Logic capable of assuming different states. The transitions between the states depend on different input parameters. These machines are used for controlling complex functions and are known from the related art.

What is claimed is:

1. A method for reconfiguring a multi-dimensional configurable cell arrangement, comprising:

transmitting a new reconfiguration instruction by a reconfiguration unit to at least one of a plurality of reconfigurable cells, wherein the reconfiguration unit has a memory for storing reconfiguration instructions for cells that are in a non-reconfigurable state, and wherein the reconfiguration unit transmits the new reconfiguration instruction to the at least one cell upon a condi tion that a reconfiguration instruction for the at least one cell is not stored in the memory;

in response to the new reconfiguration instruction:
reconfiguring the at least one cell according to the new reconfiguration instruction if the at least one cell is in a reconfigurable state; and otherwise transmitting reject information by the at least one cell to the unit; and in response to the reject information, storing the new reconfiguration instruction in the memory.

* * * * *

UNITED STATES PATENT AND TRADEMARK OFFICE
CERTIFICATE OF CORRECTION

PATENT NO. : 6,990,555 B2
APPLICATION NO. : 10/764159
DATED : January 24, 2006
INVENTOR(S) : Martin Vorbach et al.

It is certified that error appears in the above-identified patent and that said Letters Patent is hereby corrected as shown below:

Column 5, line 19, change "waiting the for the" to --waiting for the--;

Column 17, line 14, change "configurated" to --configured-- and

Column 19, line 63, change "WAITSMASK" to --WAITMASK--.

Signed and Sealed this

Twenty-sixth Day of December, 2006

JON W. DUDAS
*Director of the United States Patent and Trademark Office*